United States Patent
Kuhn De Chizelle et al.

(10) Patent No.: US 11,320,079 B2
(45) Date of Patent: May 3, 2022

(54) MODULAR CONFIGURABLE WELLSITE SURFACE EQUIPMENT

(71) Applicant: LIBERTY OILFIELD SERVICES LLC, Denver, CO (US)

(72) Inventors: Yann Patrick Kuhn De Chizelle, Houston, TX (US); John Robin Starr, Houston, TX (US); Rod William Shampine, Houston, TX (US); Richard L. Christie, Sugar Land, TX (US); Arturo Altamirano, Stafford, TX (US)

(73) Assignee: Liberty Oilfield Services LLC, Denver, CO (US)

( * ) Notice: Subject to any disclaimer, the term of this patent is extended or adjusted under 35 U.S.C. 154(b) by 168 days.

(21) Appl. No.: 16/073,527

(22) PCT Filed: Jan. 27, 2017

(86) PCT No.: PCT/US2017/015205
§ 371 (c)(1),
(2) Date: Jul. 27, 2018

(87) PCT Pub. No.: WO2017/132426
PCT Pub. Date: Aug. 3, 2017

(65) Prior Publication Data
US 2021/0123551 A1    Apr. 29, 2021

Related U.S. Application Data

(60) Provisional application No. 62/287,809, filed on Jan. 27, 2016.

(51) Int. Cl.
*F04F 13/00*    (2009.01)
*F16L 41/03*    (2006.01)
*E21B 43/26*    (2006.01)

(52) U.S. Cl.
CPC .......... *F16L 41/03* (2013.01); *E21B 43/2607* (2020.05); *F04F 13/00* (2013.01)

(58) Field of Classification Search
USPC .................................. 166/378; 417/64, 405
See application file for complete search history.

(56) References Cited

U.S. PATENT DOCUMENTS

| 3,431,747 A * | 3/1969 | Hashemi ................... C02F 1/22 |
| | | 62/123 |
| 3,554,085 A * | 1/1971 | Butterworth .............. F03C 1/14 |
| | | 91/239 |

(Continued)

OTHER PUBLICATIONS

International Search Report and Written Opinion issued in International Patent Appl. No. PCT/US2017/015205 dated Jul. 20, 2017; 23 pages.

*Primary Examiner* — Joseph A Dillon, Jr.
(74) *Attorney, Agent, or Firm* — Haynes and Boone, LLP

(57) ABSTRACT

A fluid manifold segment operable for detachably coupling with another instance of the fluid manifold segment to form a fluid manifold assembly. The fluid manifold segment may include a plurality of pressure exchangers each having a clean fluid inlet a clean fluid outlet, a dirty fluid inlet, and a dirty fluid outlet. The fluid manifold segment may further include a first fluid conduit having opposing end ports and intermediate ports, a second fluid conduit having opposing end ports and intermediate ports each fluidly connected with the clean fluid outlet of a corresponding pressure exchanger, a third fluid conduit having opposing end ports and intermediate ports each fluidly connected with the dirty fluid inlet of a corresponding pressure exchanger, and a fourth fluid conduit having opposing end ports and intermediate ports each fluidly connected with the dirty fluid outlet of a corresponding pressure exchanger.

10 Claims, 18 Drawing Sheets

(56) References Cited

U.S. PATENT DOCUMENTS

| | | | | |
|---|---|---|---|---|
| 3,554,090 | A * | 1/1971 | Wallace | F03C 7/00 91/496 |
| 4,450,711 | A * | 5/1984 | Claude | F16L 9/18 340/605 |
| 4,925,444 | A * | 5/1990 | Orkin | A61M 5/16827 123/DIG. 13 |
| 5,259,731 | A * | 11/1993 | Dhindsa | F04B 49/065 417/3 |
| 5,656,136 | A * | 8/1997 | Gayaut | E21B 33/068 166/302 |
| 5,797,452 | A * | 8/1998 | Martin | E21B 43/129 166/110 |
| 7,997,853 | B2 | 8/2011 | Pique et al. | |
| 8,839,867 | B2 | 9/2014 | Conrad | |
| 9,068,450 | B2 | 6/2015 | Guidry | |
| 9,810,033 | B1 * | 11/2017 | Shampine | E21B 21/08 |
| 10,961,823 | B2 * | 3/2021 | Shampine | E21B 47/06 |
| 10,975,677 | B2 * | 4/2021 | Shampine | E21B 43/261 |
| 10,995,773 | B2 * | 5/2021 | Hoffman | B01D 21/262 |
| 10,995,774 | B2 * | 5/2021 | Shampine | F04B 7/0023 |
| 2004/0031622 | A1 * | 2/2004 | Butler | E21B 21/001 175/5 |
| 2006/0037895 | A1 * | 2/2006 | Shumway | F04B 1/20 210/137 |
| 2006/0245909 | A1 * | 11/2006 | Stover | F04F 13/00 415/1 |
| 2007/0137170 | A1 | 6/2007 | Bross et al. | |
| 2008/0087253 | A1 * | 4/2008 | Cvengros | F02M 37/0041 123/457 |
| 2009/0185917 | A1 | 7/2009 | Andrews | |
| 2010/0014997 | A1 | 1/2010 | Ruiz del Olmo | |
| 2010/0196152 | A1 * | 8/2010 | Pique | F04F 13/00 415/208.1 |
| 2010/0212156 | A1 * | 8/2010 | Judge | E21B 43/121 29/888.02 |
| 2011/0154802 | A1 * | 6/2011 | Joshi | F02C 9/40 60/39.281 |
| 2012/0159939 | A1 * | 6/2012 | Xie | F16H 61/0025 60/327 |
| 2014/0000899 | A1 | 1/2014 | Nevison | |
| 2014/0041317 | A1 | 2/2014 | Pham et al. | |
| 2015/0050167 | A1 * | 2/2015 | Hirosawa | F04F 13/00 417/406 |
| 2015/0275602 | A1 * | 10/2015 | Kjosnes | E21B 21/001 175/25 |
| 2015/0292310 | A1 | 10/2015 | Ghasripoor et al. | |
| 2016/0032702 | A1 * | 2/2016 | Gay | F04F 13/00 137/14 |
| 2016/0084269 | A1 * | 3/2016 | Hauge | F04B 1/2035 417/64 |
| 2017/0130743 | A1 * | 5/2017 | Anderson | F15B 3/00 |
| 2017/0306987 | A1 * | 10/2017 | Theodossiou | E21B 43/126 |
| 2019/0145237 | A1 * | 5/2019 | Shampine | F04F 1/10 60/39.45 |
| 2019/0271331 | A1 * | 9/2019 | Shampine | E21B 21/06 |
| 2019/0277110 | A1 * | 9/2019 | Shampine | E21B 43/267 |
| 2019/0278306 | A1 * | 9/2019 | Shampine | E21B 33/13 |
| 2020/0392827 | A1 * | 12/2020 | George | G01N 11/00 |
| 2021/0060489 | A1 * | 3/2021 | Oklejas, Jr. | B01D 61/025 |
| 2021/0180617 | A1 * | 6/2021 | Boyko | F15B 11/02 |

\* cited by examiner

MODULAR CONFIGURABLE WELLSITE SURFACE EQUIPMENT

CROSS-REFERENCE TO RELATED APPLICATIONS

This application claims priority to and the benefit of U.S. Provisional Application No. 62/287,809, titled "Modular Configurable Wellsite Surface Equipment," filed Jan. 27, 2016, the entire disclosure of which is hereby incorporated herein by reference.

BACKGROUND OF THE DISCLOSURE

High-volume, high-pressure pumps are utilized at wellsites for a variety of pumping operations. Such operations may include drilling, cementing, acidizing, water jet cutting, hydraulic fracturing, and other wellsite operations. The success of the pumping operations may be related to many factors, including physical size, weight, failure rates, and safety. Due to high pressures and abrasive properties of certain fluids (i.e., dirty fluids), sealing components or other portions of the pumps exposed to such dirty fluids may become worn or eroded, which may result in severe damage and/or failures during pumping operations. Interruptions in pumping operations may reduce the success and/or efficiency of the pumping operations, effects of which may reduce hydrocarbon production of a well. In some instances, the pumping operations may have to be repeated at substantial monetary costs and loss of production time.

In some pumping operations, several pumps may be fluidly connected to a well via corresponding fluid conduits and at least one manifold. During such operations, the manifold distributes low-pressure dirty fluid from a mixer, blender, and/or other sources among the pumps and combines pressurized dirty fluid from the pumps for injection into the well. The manifold may have a large physical size and weight to satisfy intended fluid flow rates and operating pressures generated by the pumps. For example, the manifold may convey the dirty fluid at a pressure exceeding about 15,000 pounds per square inch (PSI) and a fluid flow rate exceeding about 1,500 gallons per minute (GPM). Such manifold may create a large footprint at the wellsite and may be difficult to customize for a particular job and/or transport to the wellsite.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus that includes a manifold assembly, the manifold assembly including multiple pressure exchangers, a first clean fluid conduit, a second clean fluid conduit, a first dirty fluid conduit, and a second dirty fluid conduit. The pressure exchangers each include a clean fluid inlet, a clean fluid outlet, a dirty fluid inlet, and a dirty fluid outlet. The first clean fluid conduit includes an inlet and multiple outlets. The second clean fluid conduit includes multiple inlets each in detachable fluid connection with the clean fluid outlet of a corresponding one of the pressure exchangers, and also includes an outlet. The first dirty fluid conduit includes an inlet and multiple outlets each in detachable fluid connection with the dirty fluid inlet of a corresponding one of the pressure exchangers. The second dirty fluid conduit includes multiple inlets each in detachable fluid connection with the dirty fluid outlet of a corresponding one of the pressure exchangers, and also includes an outlet.

The present disclosure also introduces an apparatus including a fluid manifold segment operable for detachably coupling with another instance of the fluid manifold segment to form a fluid manifold assembly. The fluid manifold segment includes multiple pressure exchangers each including a clean fluid inlet, a clean fluid outlet, a dirty fluid inlet, and a dirty fluid outlet. The fluid manifold segment also includes a first fluid conduit including opposing end ports and intermediate ports. The fluid manifold segment also includes a second fluid conduit including opposing end ports and intermediate ports each fluidly connected with the clean fluid outlet of a corresponding pressure exchanger. The fluid manifold segment also includes a third fluid conduit including opposing end ports and intermediate ports each fluidly connected with the dirty fluid inlet of a corresponding pressure exchanger. The fluid manifold segment also includes a fourth fluid conduit including opposing end ports and intermediate ports each fluidly connected with the dirty fluid outlet of a corresponding pressure exchanger.

The present disclosure also introduces a method including coupling multiple fluid manifold segments together to form a fluid manifold assembly. Each fluid manifold segment includes multiple pressure exchangers each including a clean fluid inlet, a clean fluid outlet, a dirty fluid inlet, and a dirty fluid outlet. Each fluid manifold segment also includes a first fluid conduit including opposing end ports and intermediate ports. Each fluid manifold segment also includes a second fluid conduit including opposing end ports and intermediate ports each fluidly connected with the clean fluid outlet of a corresponding pressure exchanger. Each fluid manifold segment also includes a third fluid conduit including opposing end ports and intermediate ports each fluidly connected with the dirty fluid inlet of a corresponding pressure exchanger. Each fluid manifold segment also includes a fourth fluid conduit including opposing end ports and intermediate ports each fluidly connected with the dirty fluid outlet of a corresponding pressure exchanger. The method also includes fluidly connecting the fluid manifold assembly with clean fluid pumps, fluidly connecting the fluid manifold assembly with a source of a dirty fluid, and fluidly connecting the fluid manifold assembly with a wellbore located at an oil and/or gas wellsite.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
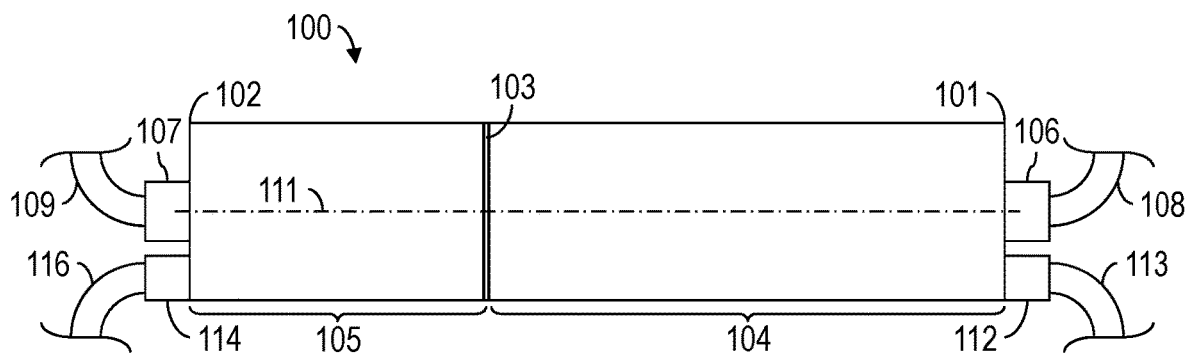
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. It should also be understood that the terms "first," "second," "third," etc., are arbitrarily assigned, are merely intended to differentiate between two or more parts, fluids, etc., and do not indicate a particular orientation or sequence.

The present disclosure introduces one or more aspects related to utilizing one or more pressure exchangers to divert a corrosive, abrasive, and/or solids-laden fluid (i.e., dirty fluid) away from high-pressure pumps, instead of pumping such fluid with the high-pressure pumps. A non-corrosive, non-abrasive, and solids-free fluid (i.e., clean fluid) may be pressurized by the high-pressure pumps, while the pressure exchangers, located downstream from the high-pressure pumps, transfer the pressure from the pressurized clean fluid to a low-pressure dirty fluid. Such use of pressure exchangers may facilitate improved fluid control during well treatment operations and/or increased functional life of the high-pressure pumps and other wellsite equipment fluidly coupled between the high-pressure pumps and the pressure exchangers.

As used herein, a "fluid" is a substance that can flow and conform to the outline of its container when the substance is tested at a temperature of 71° F. (22° C.) and a pressure of one atmosphere (atm) (0.1 megapascals (MPa)). A fluid may be liquid, gas, or both. A fluid may be water based or oil based. A fluid may have just one phase or more than one distinct phase. A fluid may be a heterogeneous fluid having more than one distinct phase. Example heterogeneous fluids within the scope of the present disclosure include a solids-laden fluid or slurry (such as may comprise a continuous liquid phase and undissolved solid particles as a dispersed phase), an emulsion (such as may comprise a continuous liquid phase and at least one dispersed phase of immiscible liquid droplets), a foam (such as may comprise a continuous liquid phase and a dispersed gas phase), and mist (such as may comprise a continuous gas phase and a dispersed liquid droplet phase), among other examples also within the scope of the present disclosure. A heterogeneous fluid may comprise more than one dispersed phase. Moreover, one or more of the phases of a heterogeneous fluid may be or comprise a mixture having multiple components, such as fluids containing dissolved materials and/or undissolved solids.

Plunger pumps may be employed in high-pressure oilfield pumping applications, such as for hydraulic fracturing applications. Plunger pumps are often referred to as positive displacement pumps, intermittent duty pumps, triplex pumps, quintuplex pumps, or frac pumps. Multiple plunger pumps may be employed simultaneously in large-scale operations where tens of thousands of gallons of fluid are pumped into a wellbore. These pumps are linked to each other with a manifold, which is plumbed to collect the output of the multiple pumps and direct it to the wellbore.

As described above, some fluids (e.g., fracturing fluid) may contain ingredients that are abrasive to the internal components of a pump. For example, a fracturing fluid generally contains proppant or other solid particulate material, which is insoluble in a base fluid. To create fractures, the fracturing fluid may be pumped at high-pressures ranging, for example, between about 5,000 to about 15,000 pounds force per square inch (psi) or more. The proppant may initiate the fractures and/or keep the fractures propped open. The propped fractures provide highly permeably flow paths for oil and gas to flow from the subterranean formation, thereby enhancing the production of a well. However, the abrasive fracturing fluid may accelerate wear of the internal components of the pumps. Consequently, the repair, replacement, and maintenance expenses of the pumps can be quite high, and life expectancy can be low.

Example implementations of apparatus described herein relate generally to a fluid system for forming and pressurizing a solids-laden fluid (e.g., fracturing fluid) having predetermined concentrations of solid material for injection into a wellbore during well treatment operations. The fluid system may include a blending or mixing device for receiving and mixing a solids-free carrying fluid or gel and a solid material to form the solids-laden fluid. The fluid system may also include a fluid pressure exchanger for increasing pressure or otherwise energizing of the solids-laden fluid formed by the mixing device before being injected into the wellbore. The fluid pressure exchanger may be utilized to pressurize the solids-laden fluid by facilitating or permitting pressure from a pressurized solids-free fluid to be transferred to a low-pressure solids-laden fluid, among other uses. The fluid pressure exchanger may comprise one or more chambers into which the low-pressure solids-laden fluid and the pressurized solids-free fluid are conducted. The solids-free fluid may be conducted into the chamber at a higher pressure than the solids-laden fluid, and may thus be utilized to pressurize the solids-laden fluid. The pressurized solids-laden fluid is then conducted from the chamber to a wellhead for injection into the wellbore. By pumping just the solids-free fluid with the pumps and utilizing the pressure exchanger to increase the pressure of the solids-laden fluid, the useful life of the pumps may be increased. Example implementations of methods described herein relate generally to utilizing the fluid system to form and pressurize the solids-laden fluid for injection into the wellbore during well treatment operations. For clarity and ease of understanding, the corrosive, abrasive, and/or solids-laden fluids may be referred to hereinafter simply as "dirty fluids" and the non-corrosive, non-abrasive, and solids-free fluids may be referred to hereinafter simply as "clean fluids."

FIG. 1 is a schematic view of an example implementation of a chamber 100 of a fluid pressure exchanger for pressurizing a dirty fluid with a clean fluid according to one or more aspects of the present disclosure. The chamber 100 includes a first end 101 and a second end 102. The chamber 100 may include a border or boundary 103 between the dirty and clean fluids defining a first volume 104 and a second volume 105 within the chamber 100. The boundary 103 may be a membrane that is impermeable or semi-permeable to a fluid, such as a gas. The membrane may be an impermeable membrane in implementations in which the dirty and clean fluids are incompatible fluids, or when mixing of the dirty and clean fluids is to be substantially prevented, such as to recycle the clean fluid absent contamination by the dirty fluid. The boundary 103 may be a semi-permeable membrane in implementations permitting some mixing of the clean fluid with the dirty fluid, such as to foam the dirty fluid when the clean fluid comprises a gas.

The boundary 103 may be a floating piston or separator slidably disposed along the chamber 100. The floating piston may physically isolate the dirty and clean fluids and be movable via pressure differential between the dirty and clean fluids. The floating piston may be retained within the chamber 100 by walls or other features of the chamber 100. The density of the floating piston may be set between that of the clean and dirty fluids, such as may cause gravity to locate the floating piston at an interface of the dirty and clean fluids when the chamber 100 is oriented vertically.

The boundary 103 may also be a diffusion or mixing zone in which the dirty and clean fluids mix or otherwise interact during pressurizing operations. The boundary 103 may also not exist, such that the first and second volumes 104 and 105 form a continuous volume within the chamber 100. A first inlet valve 106 is operable to conduct the dirty fluid into the first volume 104 of the chamber 100, and a second inlet valve 107 is operable to conduct the clean fluid into the second volume 105 of the chamber 100.

Figure 2:
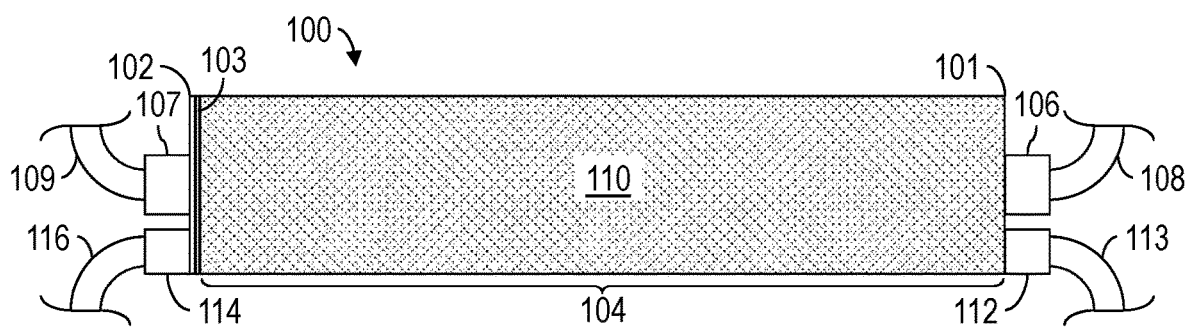
FIG. 2 is a schematic view of the apparatus shown in FIG. 1 in an operational stage according to one or more aspects of the present disclosure.

For example, FIG. 2 is a schematic view of the chamber 100 shown in FIG. 1 in an operational stage according to one or more aspects of the present disclosure, during which the dirty fluid 110 has been conducted into the chamber 100 through the first inlet valve 106 at the first end 101, such as via one or more fluid conduits 108. Consequently, the dirty fluid 110 may move the boundary 103 within the chamber 100 along a direction substantially parallel to the longitudinal axis 111 of the chamber 100, thereby increasing the first volume 104 and decreasing the second volume 105. The first inlet valve 106 may be closed after entry of the dirty fluid 110 into the chamber 100.

Figure 3:
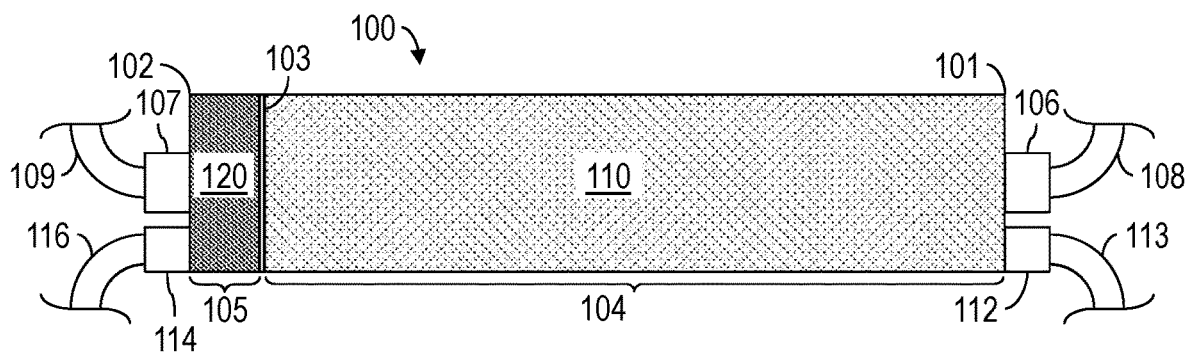
FIG. 3 is a schematic view of the apparatus shown in FIG. 2 in another operational stage according to one or more aspects of the present disclosure.

FIG. 3 is a schematic view of the chamber 100 shown in FIG. 2 in a subsequent operational stage according to one or more aspects of the present disclosure, during which a clean fluid 120 is being conducted into the chamber 100 through the second inlet valve 107 at the second end 102, such as via one or more fluid conduits 109. The clean fluid 120 may be conducted into the chamber 100 at a higher pressure compared to the pressure of the dirty fluid 110. Consequently, the higher-pressure clean fluid 120 may move the boundary 103 and the dirty fluid 110 within the chamber 100 back towards the first end 101, thereby reducing the volume of the first volume 104 and thereby pressurizing or otherwise energizing the dirty fluid 110. The clean fluid 120 may be a combustible or cryogenic gas that, upon combustion or heating, acts to pressurize the dirty fluid 110, whether instead of or in addition to the higher pressure of the clean fluid 120 acting to pressurize the dirty fluid 110. The boundary 103 and/or other components may include one or more burst discs to protect against overpressure from the clean fluid 120.

Figure 4:
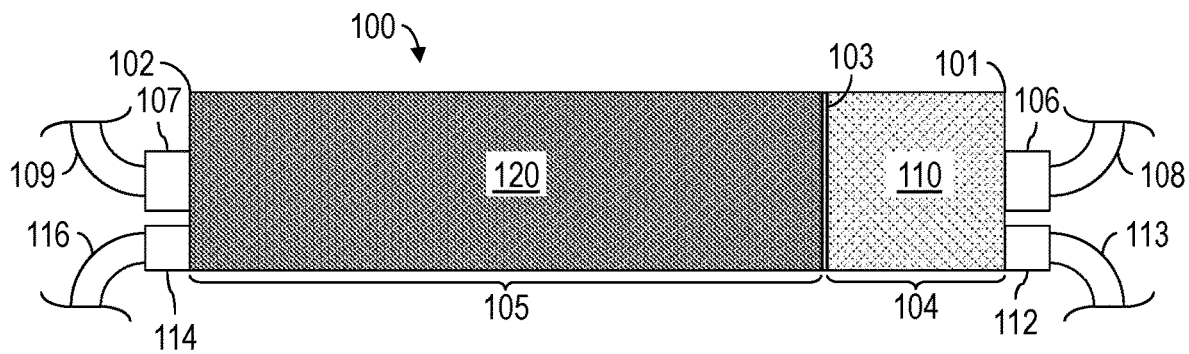
FIG. 4 is a schematic view of the apparatus shown in FIGS. 2 and 3 in another operational stage according to one or more aspects of the present disclosure.

As shown in FIG. 4, the boundary 103 may continue to reduce the first volume 104 as the pressurized dirty fluid 110 is conducted from the chamber 100 to a wellhead (not shown) at a higher pressure than when the dirty fluid 110 entered the chamber 100, such as via a first outlet valve 112 and one or more conduits 113. The second inlet valve 107 may then be closed, for example, in response to pressure sensed by a pressure transducer within the chamber 100 and/or along one or more of the conduits and/or inlet valves.

After the pressurized dirty fluid 110 is discharged from the chamber 100, the clean fluid 120 may be drained via an outlet valve 114 at the second end 102 of the chamber 100 and one or more conduits 116. The discharged clean fluid 120 may be stored as waste fluid or reused during subsequent iterations of the fluid pressurizing process. For example, additional quantities of the dirty and clean fluids 110, 120 may then be introduced into the chamber 100 to repeat the pressurizing process to achieve a substantially continuous supply of pressurized dirty fluid 110.

Figure 5:
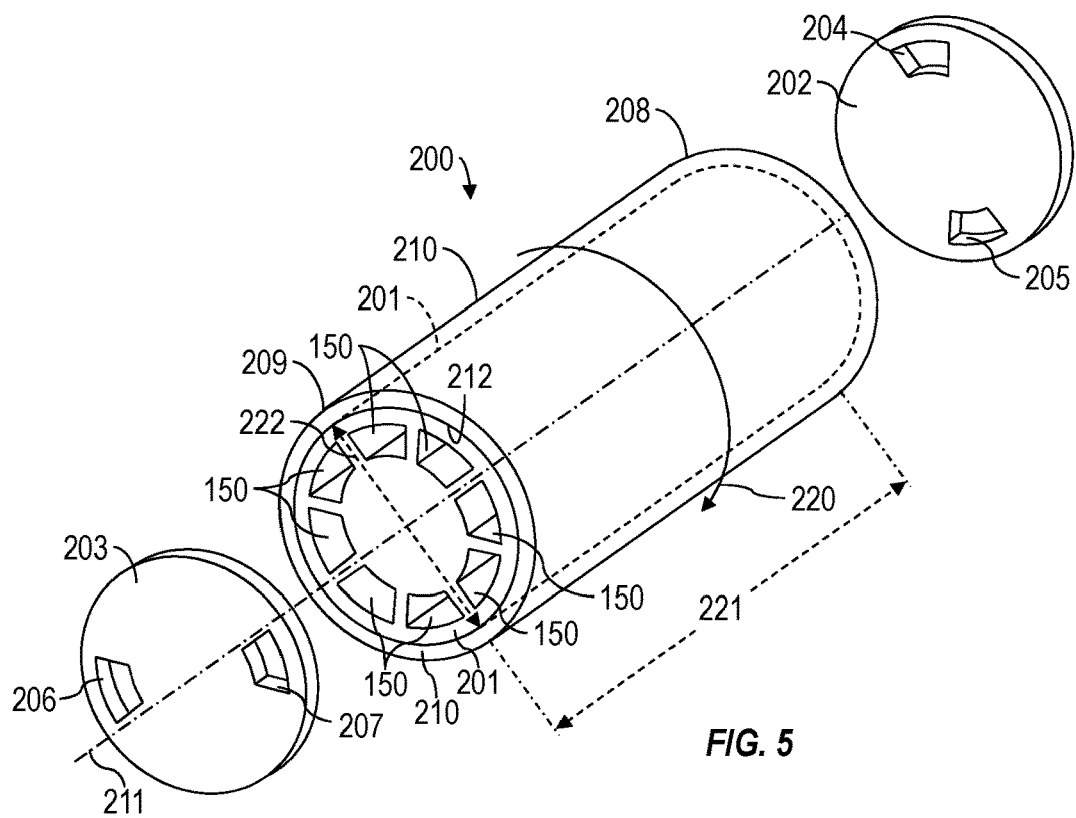
FIG. 5 is a partially exploded view of at least a portion of an example implementation of apparatus according to one or more aspects of the present disclosure.
Figure 6:
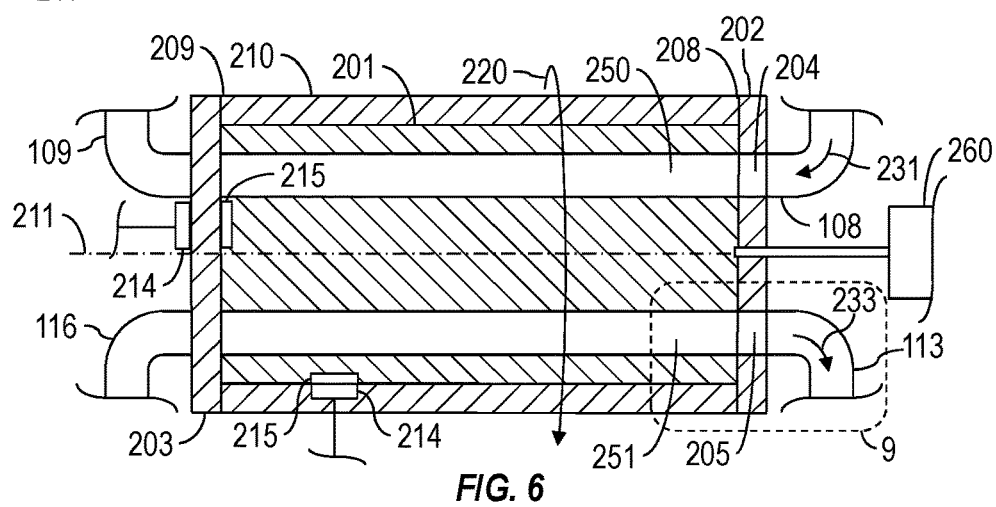
FIG. 6 is a sectional view of an example implementation of the apparatus shown in FIG. 5 according to one or more aspects of the present disclosure.
Figure 7:
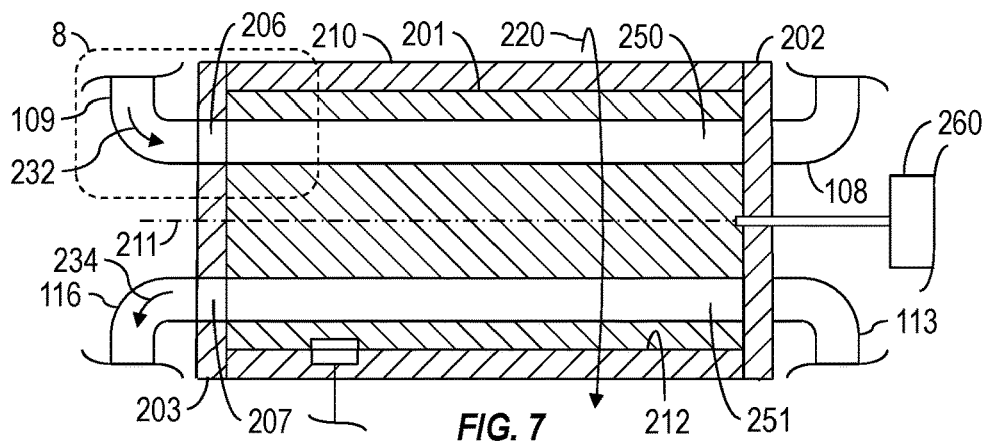
FIG. 7 is another view of the apparatus shown in FIG. 6 in a different stage of operation.

A fluid pressure exchanger comprising the apparatus shown in FIGS. 1-4 and/or others within the scope of the present disclosure may also comprise more than one of the example chambers 100 described above. FIG. 5 is a schematic view of an example fluid pressure exchanger 200 comprising multiple chambers 100 shown in FIGS. 1-4 and designated in FIG. 5 by reference numeral 150. FIGS. 6 and 7 are sectional views of the pressure exchanger 200 shown in FIG. 5. The following description refers to FIGS. 5-7, collectively.

The pressure exchanger 200 may comprise a housing 210 having a bore 212 extending between opposing ends 208, 209 of the housing 210. An end cap 202 may cover the bore 212 at the end 208 of the housing 210, and another end cap 203 may cover the bore 212 at the opposing end 209 of the housing 210. The housing 210 and the end caps 202, 203 may be sealingly engaged and statically disposed with respect to each other. The housing 210 and the end caps 202, 203 may be distinct components or members, or the housing 210 and one or both of the end caps 202, 203 may be formed as a single, integral, or continuous component or member. A rotor 201 may be slidably disposed within the bore 212 of the housing 210 and between the opposing end caps 202, 203 in a manner permitting relative rotation of the rotor 201 with respect to the housing 210 and end caps 202, 203. The rotor 201 may have a plurality of bores or chambers 150 extending through the rotor 201 and circumferentially spaced around an axis of rotation 211 extending longitudinally through the rotor 201. The rotor 201 may be a discrete member, as depicted in FIGS. 5-7, or an assembly of discrete components, such as may permit replacing worn portions of the rotor 201 and/or utilizing different materials for different portions of the rotor 201 to account for expected or actual wear.

The rotation of the rotor 201 about the axis 211 is depicted in FIG. 5 by arrow 220. Rotation of the rotor 201 may be achieved by various means. For example, rotation may be induced by utilizing force of the fluids received by the pressure exchanger 200, such as in implementations in which the fluids may be directed into the chambers 150 at a diagonal angle with respect to the axis of rotation 211, thereby imparting a rotational force to the rotor 201 to rotate the rotor 201. Rotation may also be achieved by a longitudinal geometry or configuring of at least a portion of the chambers 150 as they extend through the rotor 201. For example, an inlet portion of the each chamber 150, or the entirety of each chamber 150, may extend in a helical manner with respect to the axis of rotation 211, such that the incoming stream of clean fluid imparts a rotational force to the rotor 201 to rotate the rotor 201.

Rotation may also be imparted via a motor 260 operably connected to the rotor 201. For example, the motor 260 may be an electrical or fluid powered motor connected with the rotor 201 via a shaft, a transmission, or another intermediate driving member, such as may extend through at least one of the end caps 202, 203 and/or the housing 210, to transfer torque to the rotor 201 to rotate the rotor 201. The motor 260 may also be connected with the rotor 201 via a magnetic shaft coupling, such as in implementations in which a driven magnet may be physically connected with the rotor 201 and a driving magnet may be located outside of the pressure exchanger 200 and magnetically connected with the driven magnet. Such implementations may permit the motor 260 to drive the rotor 201 without a shaft extending through the end caps 202, 203 and/or housing 210.

Rotation may also be imparted into the rotor 201 via an electrical motor (not shown) disposed about and connected with the rotor 201. For example, the electrical motor may comprise an electrical stator disposed about or included as part of the housing 210 and an electrical rotor connected about or included as part of the rotor 201. The electrical stator may comprise field coils or windings that generate a magnetic field when powered by electric current from a source of electric power. The electrical rotor may comprise windings or permanent magnets fixedly disposed about or included as part of the rotor 201. The electrical stator may surround the electrical rotor in a manner permitting rotation of the rotor 201/electrical rotor assembly within the housing 210/electrical stator assembly during operation of the electrical motor. The electrical motors utilized within the scope of the present disclosure may include, for example, synchronous and asynchronous electric motors.

The pressure exchanger 200 may also comprise means for sensing or otherwise determining the rotational speed of the rotor 201. For example, the rotor speed sensing means may comprise one or more sensors 214 associated the rotor 201 and operable to convert position or presence of a rotating or otherwise moving portion of the rotor 201, a feature of the rotor 201, or a marker 215 disposed in association with the rotor 201, into an electrical signal or information related to or indicative of the position and/or speed of the rotor 201. Each sensor 214 may be disposed adjacent the rotor 201 or otherwise disposed in association with the rotor 201 in a manner permitting sensing of the rotor or the marker 215 during pressurizing operations.

Each sensor 214 may sense one or more magnets on the rotor 201, one or more features on the rotor 201 that can be optically detected, conductive portions or members on the rotor 201 that can be sensed with an electromagnetic sensor, and/or facets or features on the rotor 201 that can be detected with an ultrasonic sensor, among other examples. Each sensor 214 may be or comprise a linear encoder, a capacitive sensor, an inductive sensor, a magnetic sensor, a Hall effect sensor, and/or a reed switch, among other examples. The speed sensing means may also include an intentionally imbalanced rotor 201 whose vibrations may be detected with an accelerometer and utilized to determine the rotational speed of the rotor 201.

The sensors 214 may extend through the housing 210, the end caps 202, 203, or another pressure barrier fluidly isolating the internal portion of the pressure exchanger 201 in a manner permitting the detection of the presence of the rotor 201 or marker 215 at a selected or predetermined position. The sensor 214 and/or an electrical conductor connected with the sensor 214 may be sealed against the pressure barrier, such as to prevent or minimize fluid leakage. However, a non-magnetic housing 210 and/or end caps 202, 203 may be utilized, such as may permit a magnetic field to pass therethrough and, thus, permit the sensors 214 to be disposed on the outside of the housing 210 and/or end caps 202, 203. The sensor 214 may also be an ultrasonic transducer operable to send a pressure wave through the housing 210 and into the rotor 201, such as in implementations in which the housing 210 is a steel housing and the rotor 201 is a ceramic stator. The pressure wave may be reflected from varying markers or portions of the rotor 201 and sensed by the ultrasonic transducer to determine the rotational speed of the rotor 201.

The end caps 202, 203 may functionally replace the valves 106, 107, 112, and 114 depicted in FIGS. 1-4. For example, the first end cap 202 may be substantially disc-shaped, or may comprise a substantially disc-shaped portion, through which an inlet 204 and an outlet 205 extend. The inlet 204 may act as the first inlet valve 106 shown in FIGS. 1-4, and the outlet 205 may act as the first outlet valve 112 shown in FIGS. 1-4. Similarly, the second end cap 203 may be substantially disc-shaped, or may comprise a substantially disc-shaped portion, through which an inlet 206 and an outlet 207 extend. The inlet 206 may act as the second inlet valve 107 shown in FIGS. 1-4, and the outlet 207 may act as the second outlet valve 114 shown in FIGS. 1-4. The fluid inlets and outlets 204-207 may have a variety of dimensions and shapes. For example, as in the example implementation depicted in FIG. 5, the inlets and outlets 204-207 may have dimensions and shapes substantially corresponding to the cross-sectional dimensions and shapes of the openings of each chamber 150 at the opposing ends of the rotor 201. However, other implementations are also within the scope of the present disclosure, provided that the chambers 150 may each be sealed against the end caps 202, 203 in a manner preventing or minimizing fluid leaks. For example the surfaces of the end caps 202, 203 that mate with the corresponding ends of the rotor 201 may comprise face seals and/or other sealing means.

In the example implementation depicted in FIG. 5, the rotor 201 comprises eight chambers 150. However, other implementations within the scope of the present disclosure may comprise as few as two chambers 150, or as many as several dozen. The rotational speed of the rotor 201 may also vary and may be timed as per the velocity of the boundary 103 between the dirty and clean fluids and the length 221 of the chambers 150 so that the timing of the inlets and outlets 204-207 are adjusted in order to facilitate proper functioning as described herein. The rotational speed of the rotor 201 may be based on the intended flow rate of the pressurized dirty fluid exiting the chambers 150 collectively, the amount of pressure differential between the dirty and clean fluids, and/or the dimensions of the chambers 150. For example, larger dimensions of the chambers 150 and greater rotational speed of the rotor 201 relative to the end caps 202, 203 and housing 210 will increase the discharge volume of the pressurized dirty fluid.

The size and number of instances of the fluid pressure exchanger 200 utilized at a wellsite in oil and gas operations may depend on the location of the fluid pressure exchanger 200 within the process flow stream at the wellsite. For example, some oil and gas operations at a wellsite may utilize multiple pumps (such as the pumps 306 shown in FIG. 11) that each receive low-pressure dirty fluid from a common manifold (such as the manifold 308 shown in FIG. 11) and then pressurize the dirty fluid for return to the manifold. For such operations, an instance of the fluid pressure exchanger 200 may be utilized between each pump and the manifold, and/or one or more instances of the fluid pressure exchanger 200 may replace one or more of the pumps. In such implementations, the rotor 201 may have a length 221 ranging between about 25 centimeters (cm) and about 150 cm and a diameter 222 ranging between about 10 cm and about 30 cm, the cross-sectional area (flow area) of each chamber 150 may range between about 5 $cm^2$ and about 20 $cm^2$, and/or the volume of each chamber 150 may range between about 75 cubic cm (cc) and about 2500 cc. However, although other dimensions are also within the scope of the present disclosure. Some oil and gas operations at a wellsite may utilize multiple pumps that each receive low-pressure dirty fluid directly from a corresponding mixer (such as the mixer 304 shown in FIG. 11) or another source of dirty fluid and then pressurize the dirty fluid for injection directly into a well (such as the well 311 shown in FIG. 11). For such operations, an instance of the fluid pressure exchanger 200 may be utilized between each pump and the well, and/or one or more instances of the fluid pressure exchanger 200 may replace one or more of the pumps.

In some implementations, the pumps may each receive low-pressure clean fluid from the manifold (such as may be received at the manifold from a secondary fluid source) and then pressurize the clean fluid for return to the manifold. The pressurized clean fluid may then be conducted from the manifold to one or more instances of the fluid pressure exchanger 200 to be utilized to pressurize low-pressure dirty fluid received from a gel maker, proppant blender, and/or other low-pressure processing device, and the pressurized dirty fluid discharged from the fluid pressure exchangers 200 may be conducted towards a well. Examples of such operations include those shown in FIGS. 12-16, among other examples within the scope of the present disclosure. In such implementations, the length 221 of the rotor 201, the diameter 222 of the rotor 201, the flow area of each chamber 150, the volume of each chamber 150, and/or the number of chambers 150 may be much larger than as described above.

FIG. 6 is a sectional view of the pressure exchanger 200 shown in FIG. 5 during an operational stage in which two of the chambers are substantially aligned with the inlet and outlet 204, 205 of the first end cap 202 but not with the inlet and outlet 206, 207 of the second end cap 203. Thus, the inlet 204 fluidly connects one of the depicted chambers 150, designated by reference number 250 in FIG. 6, with the one or more conduits 108 supplying the non-pressurized dirty fluid, such that the non-pressurized dirty fluid may be conducted into the chamber 250. At the same time, the outlet 205 fluidly connects another of the depicted chambers 150, designated by reference number 251 in FIG. 6, with the one or more conduits 113 conducting previously pressurized dirty fluid out of the chamber 251, such as for conduction into a wellbore (not shown). As the rotor 201 rotates relative to the end caps 202, 203, the chambers 250, 251 will rotate out of alignment with the inlet and outlet 204, 205, thus preventing fluid communication between the chambers 250, 251 and the respective conduits 108, 113.

FIG. 7 is another view of the apparatus shown in FIG. 6 during another operational stage in which the chambers 250, 251 are substantially aligned with the inlet and outlet 206, 207 of the second end cap 203 but not with the inlet and outlet 204, 205 of the first end cap 202. Thus, the inlet 206 fluidly connects the chamber 250 with the one or more conduits 109 supplying the pressurizing or energizing clean fluid, such that the clean fluid may be conducted into the chamber 250. At the same time, the outlet 207 fluidly connects the other chamber 251 with the one or more conduits 116 conducting previously used pressurizing clean fluid out of the chamber 251, such as for recirculation to the clean fluid source (not shown). As the rotor 201 further rotates relative to the end caps 202, 203 and the housing 210, the chambers 250, 251 will rotate out of alignment with the inlet and outlet 206, 207, thus preventing fluid communication between the chambers 250, 251 and the respective conduits 109, 116.

The pressurizing process described above with respect to FIGS. 1-4 is achieved within each chamber 150, 250, 251 with each full rotation of the rotor 201 relative to the end caps 202, 203. For example, as the rotor 201 rotates relative to the end caps 202, 203 and the housing 210, the non-pressurized dirty fluid is conducted into the chamber 250 during the portion of the rotation in which the chamber 250 is in fluid communication with inlet 204 of the first end cap 202, as indicated in FIG. 6 by arrow 231. The rotation is continuous, such that the flow rate of non-pressurized dirty fluid into the chamber 250 increases as the chamber 250 comes into alignment with the inlet 204 and then decreases as the chamber 250 rotates out of alignment with the inlet 204. Further rotation of the rotor 201 relative to the end caps 202, 203 permits the pressurizing clean fluid to be conducted into the chamber 250 during the portion of the rotation in which the chamber 250 is in fluid communication with the inlet 206 of the second end cap 203, as indicated in FIG. 7 by arrow 232. The influx of the pressurizing clean fluid into the chamber 250 pressurizes the dirty fluid, such as due to the pressure differential between the dirty and clean fluids described above with respect to FIGS. 1-4.

Further rotation of the rotor 201 relative to the end caps 202, 203 and the housing 210 permits the pressurized dirty fluid to be conducted out of the chamber 250 during the portion of the rotation in which the chamber 250 is in fluid communication with the outlet 205 of the first end cap 202, as indicated in FIG. 6 by arrow 233. The discharged fluid may substantially comprise just the (pressurized) dirty fluid or a mixture of the dirty and clean fluids (also pressurized), depending on the timing of the rotor 201 and perhaps whether the chambers include the boundary 103 shown in FIGS. 1-4. Further rotation of the rotor 201 relative to the end caps 202, 203 permits the reduced-pressure clean fluid to be conducted out of the chamber 250 during the portion of the rotation in which the chamber 250 is in fluid communication with the outlet 207 of the second end cap 203, as indicated in FIG. 7 by arrow 234. The pressurizing process then repeats as the rotor 201 further rotates and the chamber 250 again comes into alignment with the inlet 204 of the first end cap 202.

Depending on the number and size of the chambers 150, the non-pressurized dirty fluid inlet 204 and the pressurizing clean fluid inlet 206 may be wholly or partially misaligned with each other about the central axis 211, such that the dirty fluid may be conducted into the chamber 150 to entirely or mostly fill the chamber 150 before the clean fluid is conducted into that chamber 150. The non-pressurized dirty fluid inlet 204 is completely closed to fluid flow from the conduit 108 before the pressurizing clean fluid inlet 206 begins opening. The pressurized dirty fluid outlet 205 and the reduced-pressure clean fluid outlet 207, however, may be partially open when the pressurizing clean fluid inlet 206 is permitting the clean fluid into the chamber 150. Similarly, the non-pressurized dirty fluid inlet 204 may be partially open when one or both of the pressurized dirty fluid outlet 205 and/or the reduced-pressure clean fluid outlet 207 is at least partially open.

The pressurized dirty fluid outlet 205 and the reduced-pressure clean fluid outlet 207 may be wholly or partially misaligned with each other about the central axis 211. For example, the pressurized dirty fluid (and perhaps a pressurized mixture of the dirty and clean fluids) may be substantially discharged from a chamber 150 via the pressurized dirty fluid outlet 205 before the remaining reduced-pressure clean fluid is permitted to exit through the reduced-pressure clean fluid outlet 207. As the rotor 201 continues to rotate relative to the end caps 202, 203 and the housing 210, the pressurized dirty fluid outlet 205 becomes closed to fluid flow, and the reduced-pressure clean fluid outlet 207 becomes open to discharge the remaining reduced-pressure clean fluid. Thus, the reduced-pressure clean fluid outlet 207 may be completely closed to fluid flow while the pressurized dirty fluid (or mixture of the dirty and clean fluids) is discharged from the chamber 150 to the wellhead. Complete closure of the reduced-pressure clean fluid outlet 207 may permit the pressurized fluid to maintain a higher-pressure flow to the wellhead.

The inlets and outlets 204-207 may also be configured to permit fluid flow into and out of more than one chamber 150 at a time. For example, the non-pressurized dirty fluid inlet 204 may be sized to simultaneously fill more than one chamber 150, the inlet and outlets 204-207 may be configured to permit non-pressurized dirty fluid to be conducted into a chamber 150 while the reduced-pressure clean fluid is simultaneously being discharged from that chamber 150. Depending on the size of the rotor 201 and the chambers 150, the fluid properties of the dirty and clean fluids, and the rotational speed of the rotor 201 relative to the end caps 202, 203, the pressurizing process within each chamber 150 may also be achieved in less than one rotation of the rotor 201 relative to the end caps 202, 203 and the housing 210, such as in implementations in which two, three, or more iterations of the pressurizing process is achieved within each chamber 150 during a single rotation of the rotor 201.

The flow of dirty fluid out of the pressure exchanger 200 via the fluid conduit 116 may be prevented or otherwise minimized by controlling the timing of the opening and closing of the fluid inlets 204, 206 and outlets 205, 207 of the pressure exchanger 200. For example, during the pressurizing operations, as the chambers 150 rotate, each chamber 150 is in turn aligned and, thus, fluidly connected with the low-pressure inlet 204 to receive the dirty fluid and the low-pressure outlet 207 to discharge the clean fluid. As the dirty fluid fills the chamber 150, the boundary 103 moves toward the low-pressure outlet 207 as the clean fluid is pushed out of the chamber 150. However, the rotation of the rotor 201 seals off the outlet 207 of the chamber 150 when or just before the boundary 103 reaches the outlet 207 to prevent or minimize the dirty fluid from entering into the fluid conduit 116. The chamber 150 then becomes aligned with the high-pressure inlet 206 and the high-pressure outlet 205 to permit the high-pressure clean fluid to enter the chamber 150 via the inlet 206 to push the dirty fluid from the chamber 150 via the outlet 205 at an increased pressure. As the clean fluid fills the chamber 150, the boundary 103 moves toward the high-pressure outlet 205 as the dirty fluid is pushed out of the chamber 150. However, the rotation of the rotor 201 seals off the outlet 205 of the chamber 150 when or just before the boundary 103 reaches the outlet 205 to prevent or minimize the clean fluid from entering into the fluid conduit 113. The clean fluid left in the chamber 150 may be pushed out through the fluid conduit 116 by the dirty fluid when the chamber 150 again becomes aligned with the low-pressure inlet 204 to receive the dirty fluid and the low-pressure outlet 207 to discharge the clean fluid. Such cycle may be continuously repeated to continuously receive and pressurize the stream of dirty fluid to form a substantially continuous or uninterrupted stream of dirt fluid.

Figure 8:
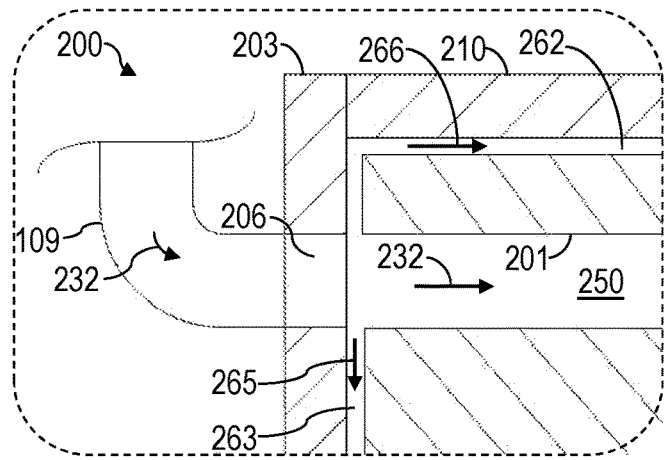
FIG. 8 is an enlarged view of the apparatus shown in FIG. 7 according to one or more aspects of the present disclosure.
Figure 9:
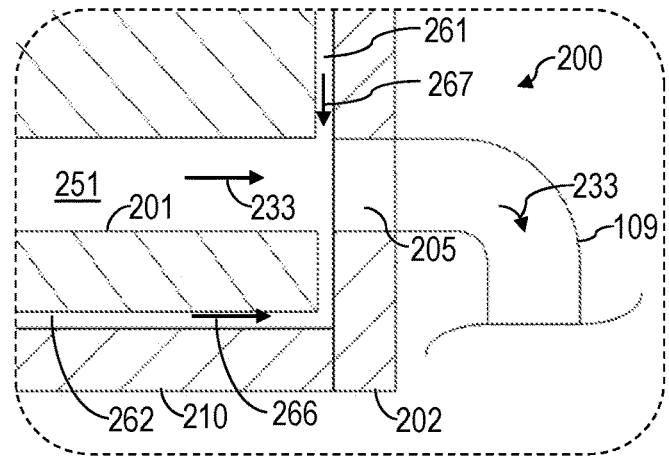
FIG. 9 is an enlarged view of the apparatus shown in FIG. 6 according to one or more aspects of the present disclosure.

FIGS. 8 and 9 are enlarged views of portions of the pressure exchanger 200 shown in FIGS. 7 and 6, respectively, according to one or more aspects of the present disclosure. The following description refers to FIGS. 6-9, collectively.

Small gaps or spaces 261, 262, 263 may be maintained between the rotor 201 and the housing 210 and end caps 202, 203 to permit rotation of the rotor 201 within the housing 210 and the end caps 202, 203. For clarity, the housing 210 and the end caps 202, 203 may be collectively referred to hereinafter as a "housing assembly." The spaces 261, 262, 263 may permit fluid flow between the rotor 201 and the housing assembly. For example, dirty fluid within the pressure exchanger 200 may flow through the space 261 along the end cap 202 from the high-pressure outlet 205 to the low-pressure fluid inlet 204, and through the spaces 261, 262, 263 along the housing 210 and end caps 202, 203 from the high-pressure outlet 205 to the clean fluid low-pressure outlet 207. Clean fluid within the pressure exchanger 200 may flow through the space 263 along the end cap 203 from the high-pressure inlet 206 to the low-pressure outlet 207, as indicated by arrow 265, and through the spaces 261, 262, 263 along the housing 210 and end caps 202, 203 from the high-pressure inlet 206 to the dirty fluid inlet and outlet 204, 205, as indicated by arrows 265, 266, 267.

The fluid flow through the spaces 261, 262, 263 within the pressure exchanger 200 may form a fluid film or layer operating as a hydraulic bearing or otherwise providing lubrication between the rotating rotor 201 and the static housing assembly, such as may prevent or reduce contact or friction between the rotor 201 and the housing assembly during pressurizing operations. The flow of fluids through the spaces 261, 262, 263 may be biased such that substantially just the clean fluid, and not the dirty fluid, flows through the spaces 261, 262, 263 during pressurizing operations, as indicated by arrows 265, 266, 267. Biasing the flow of clean fluid through the spaces 261, 262, 263 may also cause the clean/dirty fluid boundary 103 (shown in FIGS. 1-4) to maintain a net velocity directed toward the dirty fluid outlet 205. Accordingly, biasing the flow of clean fluid may result in substantially just the clean fluid being communicated through the spaces 261, 262, 263, such as to prevent or minimize friction or wear caused by the dirty fluid between the rotor 201 and the housing assembly. Biasing the flow of the clean fluid may also result in substantially just the clean fluid being discharged via the clean fluid outlet 207, such as to prevent or minimize contamination of the clean fluid discharged from the pressure exchanger 200.

Figure 10:
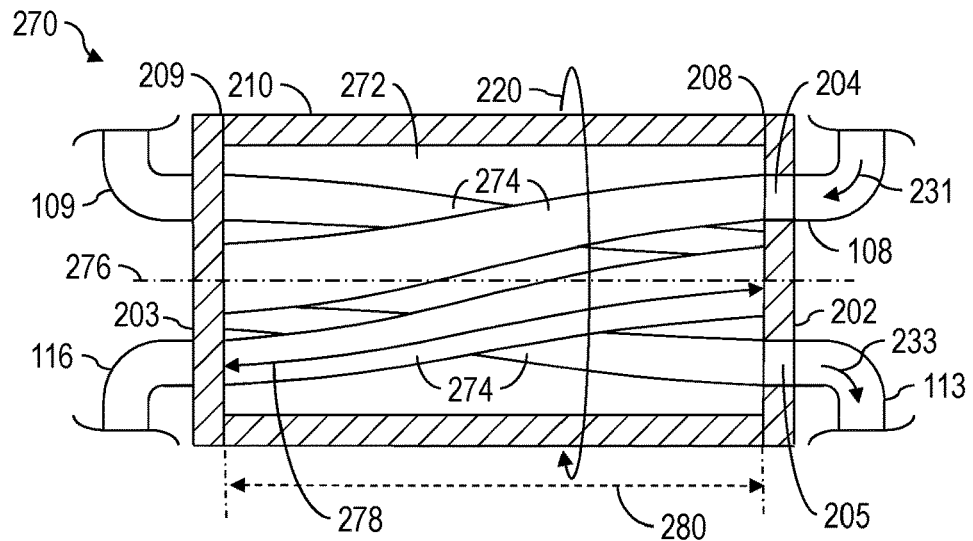
FIG. 10 is a sectional view of another example implementation of the apparatus shown in FIG. 5 according to one or more aspects of the present disclosure.

FIG. 10 is a sectional view of another example implementation of the pressure exchanger 200 shown in FIG. 5 according to one or more aspects of the present disclosure and designated in FIG. 10 by reference numeral 270. The pressure exchanger 270 is substantially similar in structure and operation to the pressure exchanger 200, including where indicated by like reference numbers, except as described below.

The pressure exchanger 270 may include a rotor 272 slidably disposed within the bore of the housing 210 and between the opposing end caps 202, 203 in a manner permitting relative rotation of the rotor 272 with respect to the housing 210 and end caps 202, 203. The rotor 272 may have multiple bores or chambers 274 extending through the rotor 272 between the opposing ends 208, 209 of the housing 210 and circumferentially spaced around an axis of rotation 276 extending longitudinally along the rotor 272. For the sake of clarity, cross-hatching of the rotor 272 is removed from FIG. 10, and just four chambers 274 are depicted, it being understood that other chambers 274 may also exist.

The chambers 274 extend through the rotor 272 in a helical manner about or otherwise with respect to the axis of rotation 276. As described above, such helical chamber implementations may be utilized to impart rotation to the rotor 272 instead of with a separate motor 260 or other rotary driving means. Such helical chamber implementations may also permit the length 278 of the chambers 274 to be greater than the axial length 280 of the rotor 272, which may permit the axial length 280 of the rotor 272 to be reduced. The increased length 278 of the chambers 274 may also permit the rotor 272 to be rotated at slower speeds than a rotor having chambers that extend substantially parallel with respect to an axis of rotation.

The pressure exchangers 200, 270 shown in FIGS. 5-10 and/or otherwise within the scope of the present disclosure may utilize various forms of the dirty and clean fluids described above. For example, the dirty fluid may be a high-density and/or high-viscosity solids-laden fluid comprising insoluble solid particulate material and/or other ingredients that may compromise the life or maintenance of pumps disposed downstream of the fluid pressure exchangers 200, 270, especially when such pumps are operated at higher pressures. Examples of the dirty fluid utilized in oil and gas operations may include treatment fluid, drilling fluid, spacer fluid, workover fluid, a cement composition, fracturing fluid, acidizing fluid, stimulation fluid, and/or combinations thereof, among other examples also within the scope of the present disclosure. The dirty fluid may be a foam, slurry, emulsion, or compressible gas. The viscosity of the dirty fluid may be sufficient to permit transport of solid additives or other solid particulate material (collectively referred to hereinafter as "solids") without appreciable settling or segregation. Chemicals, such as biopolymers (e.g. polysaccharides), synthetic polymers (e.g. polyacrylamide and its derivatives), crosslinkers, viscoelastic surfactants, oil gelling agents, low molecular weight organogelators, and phosphate esters, may also be included in the dirty fluid, such as to control viscosity of the dirty fluid.

The composition of the clean fluid may permit the clean fluid to be pumped at higher pressures with reduced adverse effects on the downstream pumps. For example, the clean fluid may be a solids-free fluid that does not include insoluble solid particulate material or other abrasive ingredients, or a fluid that includes low concentrations of insoluble solid particulate material or other abrasive ingredients. The clean fluid may be a liquid, such as water (including freshwater, brackish water, or brine), a gas (including a cryogenic gas), or combinations thereof. The clean fluid may also include substances, such as tracers, that can be transferred to the dirty fluid upon mixing within the chambers 150, 250, 274 or upon transmission through a semi-permeable implementation of the boundary 103. The viscosity of the clean fluid may also be increased, such as to minimize or reduce viscosity contrast between the dirty and clean fluids. Viscosity contrast may result in channeling of the lower viscosity fluid through the higher viscosity fluid. The clean fluid may be viscosified utilizing the same chemicals and/or techniques described above with respect to the dirty fluid.

The clean and/or dirty fluid may be chemically modified, such as via one or more fluid additives temporarily (or regularly) injected into the clean and/or dirty fluids to produce a reaction at the clean/dirty boundary 103 that acts to stabilize the boundary 103 (e.g., a membrane, mixing zone). For example, viscosity modification may be utilized to help form a substantially flat flow profile within the chambers 150, 250, 274. Also, one or repeated pulses of a cross linker applied to the clean fluid may be utilized to form cross linked gel pills in the chambers 150, 250, 274 to act as boundary stabilizers. Such stabilizers may be safely pumped into the well and replaced over time.

Furthermore, the clean and dirty fluids may be selected or formulated such that a reaction between the clean and dirty fluids creates a physical change at the clean/dirty boundary 103 that stabilizes the boundary 103. For example, the clean and dirty fluids may cross-link when interacting at the boundary 103 to produce a floating, viscous plug. The clean and dirty fluids may be formulated such that the plug or another product of such reaction may not damage downstream components when trimmed off and injected into the well by the action of the outlet 205 or another discharge valve.

The following are additional examples of the dirty and clean fluids that may be utilized during oil and gas operations. However, the following are merely examples, and are not considered to be limiting to the dirty and clean fluids and that may also be utilized within the scope of the present disclosure.

For fracturing operations, the dirty fluid may be a slurry with a continuous phase comprising water and a dispersed phase comprising proppant (including foamed slurries), including implementations in which the dispersed proppant includes two or more different size ranges and/or shapes, such as may optimize the amount of packing volume within the fractures. The dirty fluid may also be a cement composition (including foamed cements), or a compressible gas. For such fracturing implementations, the clean fluid may be a liquid comprising water, a foam comprising water and gas, a gas, a mist, or a cryogenic gas.

For cementing operations, including squeeze cementing, the dirty fluid may be a cement composition comprising water as a continuous phase and cement as a dispersed phase, or a foamed cement composition. For such cementing implementations, the clean fluid may be a liquid comprising water, a foam comprising water and gas, a gas, a mist, or a cryogenic gas.

For drilling, workover, acidizing, and other wellbore operations, the dirty fluid may be a homogenous solution comprising water, soluble salts, and other soluble additives, a slurry with a continuous phase comprising water and a dispersed phase comprising additives that are insoluble in the continuous phase, an emulsion or invert emulsion comprising water and a hydrocarbon liquid, or a foam of one or more of these examples. In such implementations, the clean fluid may be a liquid comprising water, a foam comprising water and gas, a gas, a mist, or a cryogenic gas.

In the above example implementations, and/or others within the scope of the present disclosure, the dirty fluid 110 may include proppant; swellable or non-swellable fibers; a curable resin; a tackifying agent; a lost-circulation material; a suspending agent; a viscosifier; a filtration control agent; a shale stabilizer; a weighting agent; a pH buffer; an emulsifier; an emulsifier activator; a dispersion aid; a corrosion inhibitor; an emulsion thinner; an emulsion thickener; a gelling agent; a surfactant; a foaming agent; a gas; a breaker; a biocide; a chelating agent; a scale inhibitor; a gas hydrate inhibitor; a mutual solvent; an oxidizer; a reducer; a friction reducer; a clay stabilizing agent; an oxygen scavenger; cement; a strength retrogression inhibitor; a fluid loss additive; a cement set retarder; a cement set accelerator; a light-weight additive; a de-foaming agent; an elastomer; a mechanical property enhancing additive; a gas migration control additive; a thixotropic additive; and/or combinations thereof.

Figure 11:
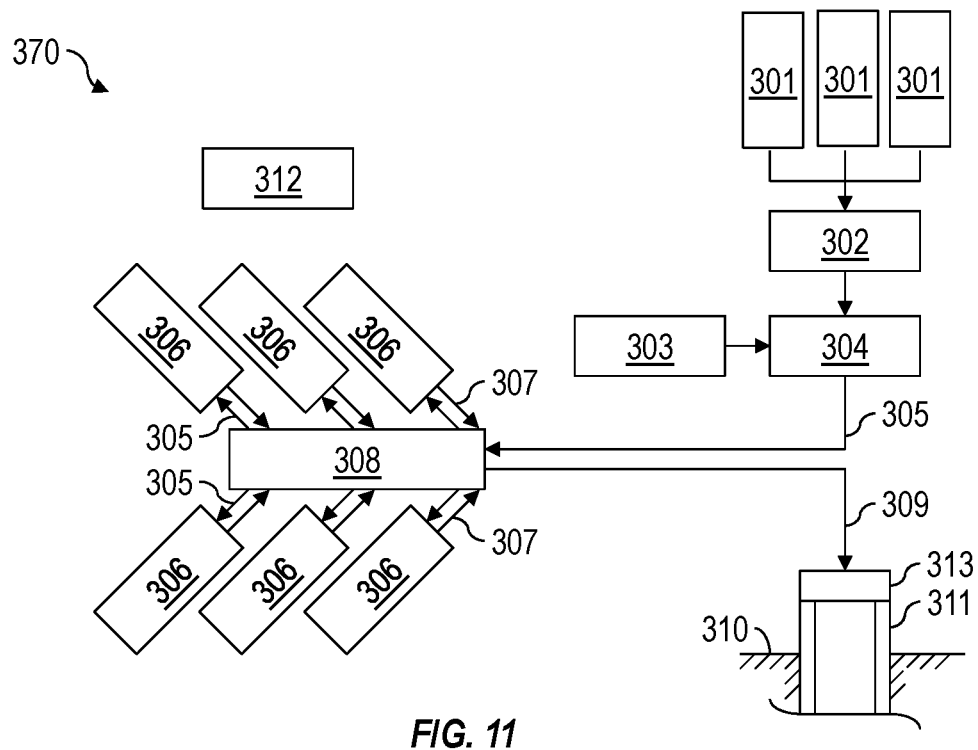
FIG. 11 is a schematic view of at least a portion of an example implementation of apparatus according to one or more aspects of the present disclosure.

FIG. 11 is a schematic view of an example implementation of another wellsite system 370 that may be utilized for pumping a fluid from a wellsite surface 310 to a well 311 during a well treatment operation. Water from a plurality of water tanks 301 may be substantially continuously pumped to a gel maker 302, which mixes the water with a gelling agent to form a carrying fluid or gel, which may be a clean fluid. The gel may be substantially continuously pumped into a blending/mixing device, hereinafter referred to as a mixer 304. Solids, such as proppant and/or other solid additives stored in a solids container 303, may be intermittently or substantially continuously pumped into the mixer 304 to be mixed with the gel to form a substantially continuous stream or supply of treatment fluid, which may be a dirty fluid. The treatment fluid may be pumped from the mixer 304 to a plurality of plunger, frac, and/or other pumps 306 through a system of conduits 305 and a manifold 308. Each pump 306 pressurizes the treatment fluid, which is then returned to the manifold 308 through another system of conduits 307. The stream of treatment fluid is then directed to the well 311 via a wellhead 313 through a system of conduits 309. A control unit 312 may be operable to control various portions of such processing via wired and/or wireless communications (not shown).

Figure 12:
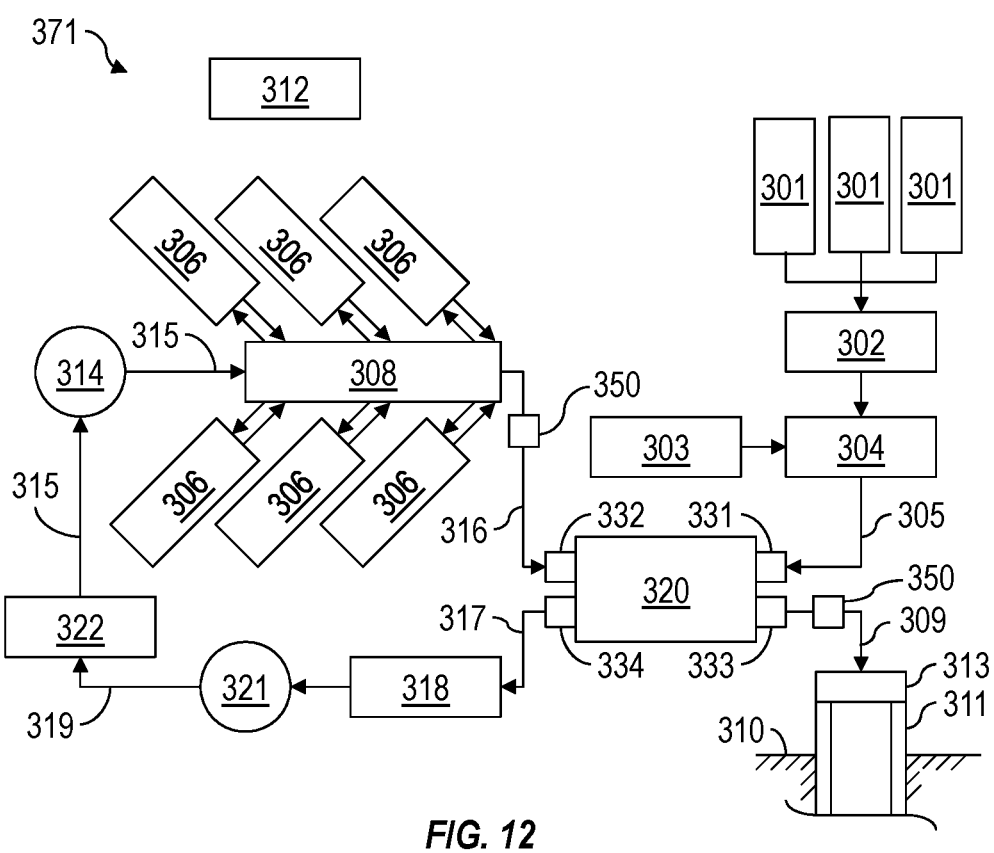
FIG. 12 is a schematic view of at least a portion of an example implementation of apparatus according to one or more aspects of the present disclosure.

FIG. 12 is a schematic view of an example implementation of another wellsite system 371 according to one or more aspects of the present disclosure. The wellsite system 371 comprises one or more similar features of the wellsite system 370 shown in FIG. 11, including where indicated by like reference numbers, except as described below.

The wellsite system 371 includes a fluid pressure exchanger 320, which may be utilized to eliminate or reduce pumping of dirty fluid through the pumps 306. The dirty fluid may be conducted from the mixer 304 to one or more chambers 100/150/250/251/274 of the fluid pressure exchanger 320 via the conduit system 305. The fluid pressure exchanger 320 may be, comprise, and/or otherwise have one or more aspects in common with the apparatus shown in one or more of FIGS. 1-10. Thus, as similarly described above with respect to FIGS. 1-10, the fluid pressure exchanger 320 comprises a non-pressurized dirty fluid inlet 331, a pressurized clean fluid inlet 332, a pressurized fluid discharge or outlet 333, and a reduced-pressure fluid discharge or outlet 334. Consequently, the pumps 306 may conduct the clean fluid to and from the manifold 308 and then to the pressurized clean fluid inlet 332 of the fluid pressure exchanger 320, where the pressurized clean fluid may be utilized to pressurize the dirty fluid received at the non-pressurized dirty fluid inlet 331 from the mixer 304.

A centrifugal or other type of pump 314 may supply the clean fluid to the manifold 308 from a holding or frac tank 322 through a conduit system 315. An additional source of fluid to be pressurized by the manifold 308 may be flowback fluid from the well 311. The pressurized clean fluid is conducted from the manifold 308 to one or more chambers of the fluid pressure exchanger 320 via a conduit system 316. The pressurized fluid discharged from the fluid pressure exchanger 320 is then conducted to the wellhead 313 of the well 311 via a conduit system 309. The reduced-pressure clean fluid remaining in the fluid pressure exchanger 320 (or chamber 100/150 thereof) may then be conducted to a settling tank/pit 318 via a conduit system 317, where the fluid may be recycled back into the high-pressure stream via a centrifugal or other type of pump 321 and a conduit system 319, such as to the tank 322.

The wellsite system 371 may further comprise pressure sensors 350 operable to generate electric signals and/or other information indicative of pressure of the clean fluid upstream of the pressure exchanger 320 and/or pressure of the dirty fluid discharged from the pressure exchanger 320. For example, the pressure sensors 350 may be fluidly connected along the fluid conduits 309, 316. Additional pressure sensors may also be fluidly connected along the fluid conduits 305, 317 such as may be utilized to monitor pressure of the low-pressure clean and dirty fluids.

Some of the components, such as conduits, valves, and the manifold 308, may be configured to provide dampening to accommodate pressure pulsations. For example, liners that expand and contract may be employed to prevent problems associated with pumping against a closed valve due to intermittent pumping of the high-pressure fluid stream.

Figure 13:
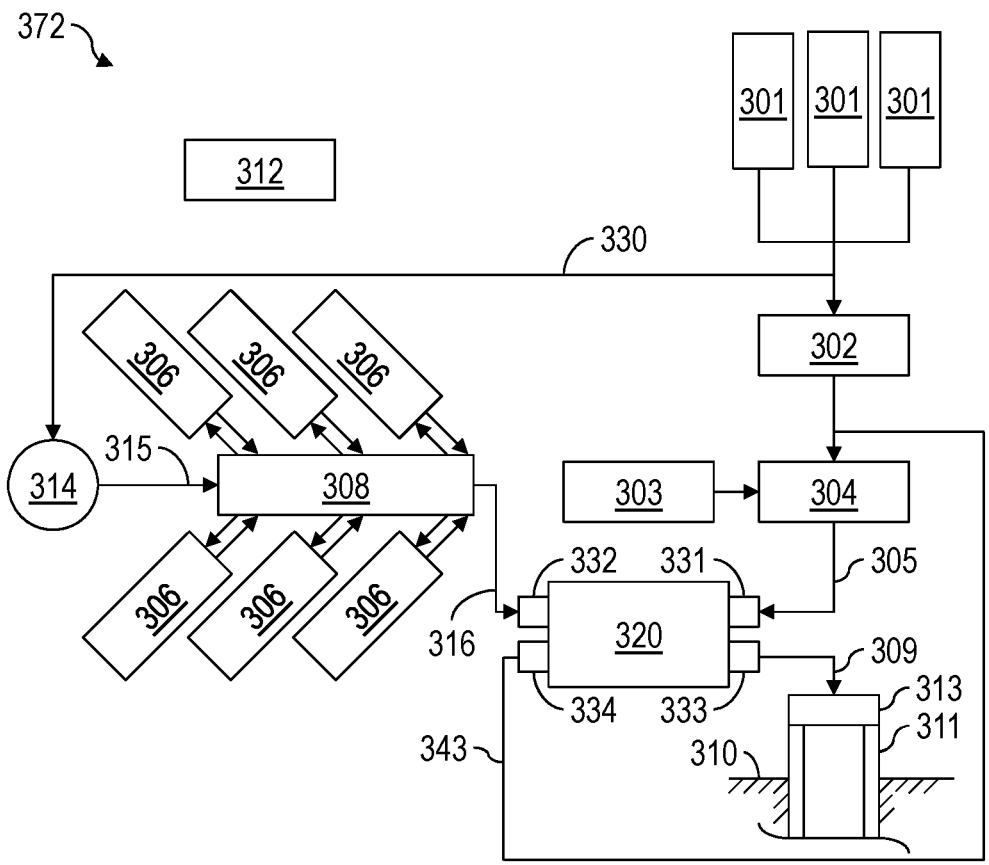
FIG. 13 is a schematic view of at least a portion of an example implementation of apparatus according to one or more aspects of the present disclosure.

FIG. 13 is a schematic view of an example implementation of another wellsite system 372 according to one or more aspects of the present disclosure. The wellsite system 372 comprises one or more similar features of the wellsite systems 370, 371 shown in FIGS. 11 and 12, respectively, including where indicated by like reference numbers, except as described below.

In the wellsite system 372, the clean fluid may be conducted to the manifold 308 via a conduit system 330, the pump 314, and the conduit system 315. That is, the fluid stream leaving the gel maker 302 may be split into a low-pressure side, for utilization by the mixer 304, and a high-pressure side, for pressurization by the manifold 308. Similarly, although not depicted in FIG. 13, the fluid stream entering the gel maker 302 may be split into the low-pressure side, for utilization by the gel maker 302, and the high-pressure side, for pressurization by the manifold 308. Thus, the clean fluid stream and the dirty fluid stream may have the same source, instead of utilizing the tank 322 or other separate clean fluid source.

FIG. 13 also depicts the option for the reduced-pressure fluid discharged from the fluid pressure exchanger 320 to be recycled back into the low-pressure clean fluid stream between the gel maker 302 and the mixer 304 via a conduit system 343. In such implementations, the flow rate of the proppant and/or other ingredients from the solids container 303 into the mixer 304 may be regulated based on the concentration of the proppant and/or other ingredients entering the low-pressure stream from the conduit system 343. The flow rate from the solids container 303 may be adjusted to decrease the concentration of proppant and/or other ingredients based on the concentrations in the fluid being recycled into the low-pressure stream. Similarly, although not depicted in FIG. 13, the reduced-pressure fluid discharged from the fluid pressure exchanger 320 may be recycled back into the low-pressure flow stream before the gel maker 302, or perhaps into the low-pressure flow stream between the mixer 304 and the fluid pressure exchanger 320.

Figure 14:
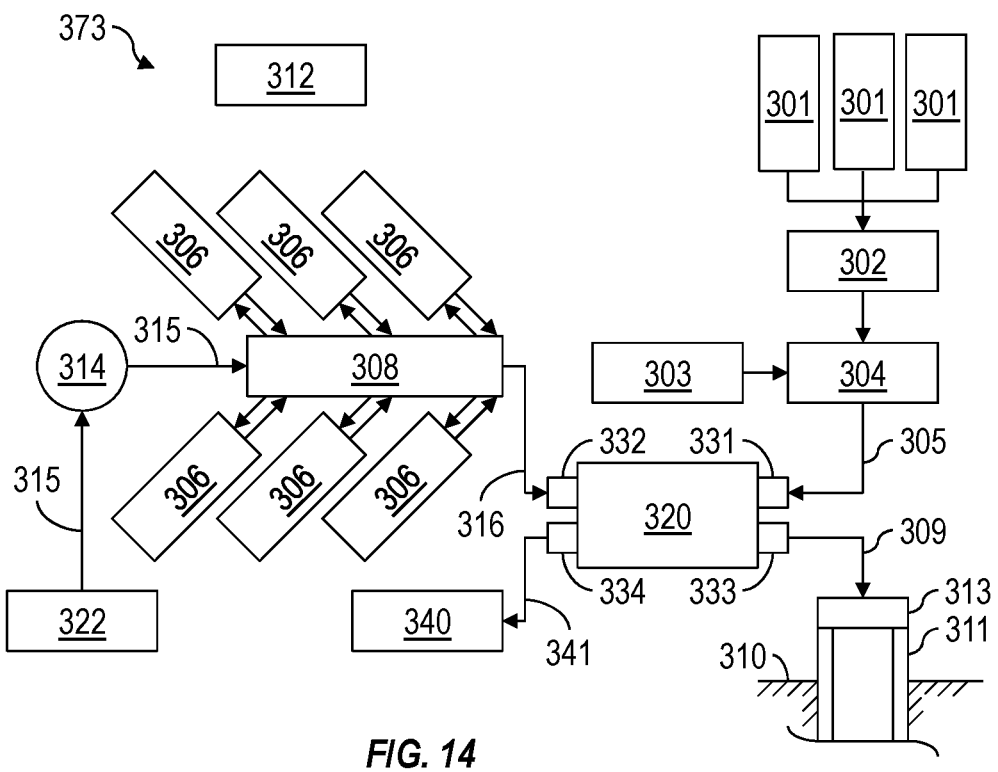
FIG. 14 is a schematic view of at least a portion of an example implementation of apparatus according to one or more aspects of the present disclosure.

FIG. 14 is a schematic view of an example implementation of another wellsite system 373 according to one or more aspects of the present disclosure. The wellsite system 373 comprises one or more similar features of the wellsite systems 370, 371, 372 shown in FIGS. 11, 12, and 13, respectively, including where indicated by like reference numbers, except as described below.

In the wellsite system 373, the source of the clean fluid is the tank 322, and the reduced-pressure fluid discharged from the fluid pressure exchanger 320 is not recycled back into the high-pressure stream, but is instead directed to a tank 340 via a conduit system 341. However, in a similar implementation, the reduced-pressure fluid discharged from the fluid pressure exchanger 320 is not recycled back into the high-pressure stream, as depicted in FIG. 13. In either implementation, utilizing the tank 322 or other source of the clean fluid separate from the discharge of the gel maker 302 and the fluid pressure exchanger 320 permits a single pass clean fluid system with very low probability of proppant entering the pumps 306.

Figure 15:
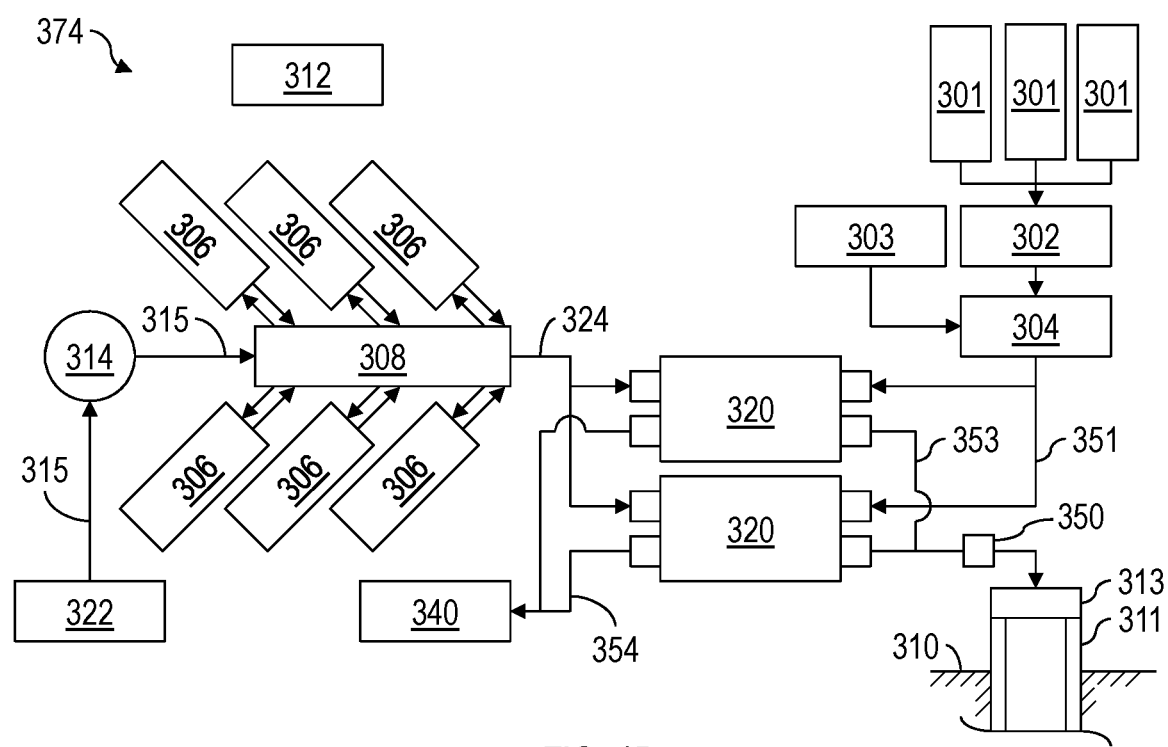
FIG. 15 is a schematic view of at least a portion of an example implementation of apparatus according to one or more aspects of the present disclosure.

FIG. 15 is a schematic view of an example implementation of another wellsite system 374 according to one or more aspects of the present disclosure. The wellsite system 374 comprises one or more similar features of the wellsite systems 370, 371, 372, 373 shown in FIGS. 11, 12, 13, and 14, respectively, including where indicated by like reference numbers, except as described below.

Unlike the wellsite system 373, the wellsite system 374 utilizes multiple instances of the fluid pressure exchanger 320. The low-pressure discharge from the mixer 304 may be split into multiple streams each conducted to a corresponding one of the fluid pressure exchangers 320 via a conduit system 351. Similarly, the high-pressure discharge from the manifold 308 may be split into multiple streams each conducted to a corresponding one of the fluid pressure exchangers 320 via a conduit system 352. The pressurized fluid discharged from the fluid pressure exchangers 320 may be combined and conducted towards the well 311 via a conduit system 353, and the reduced-pressure discharge from the fluid pressure exchangers 320 may be combined or separately conducted to the tank 340 via a conduit system 354.

Figure 16:
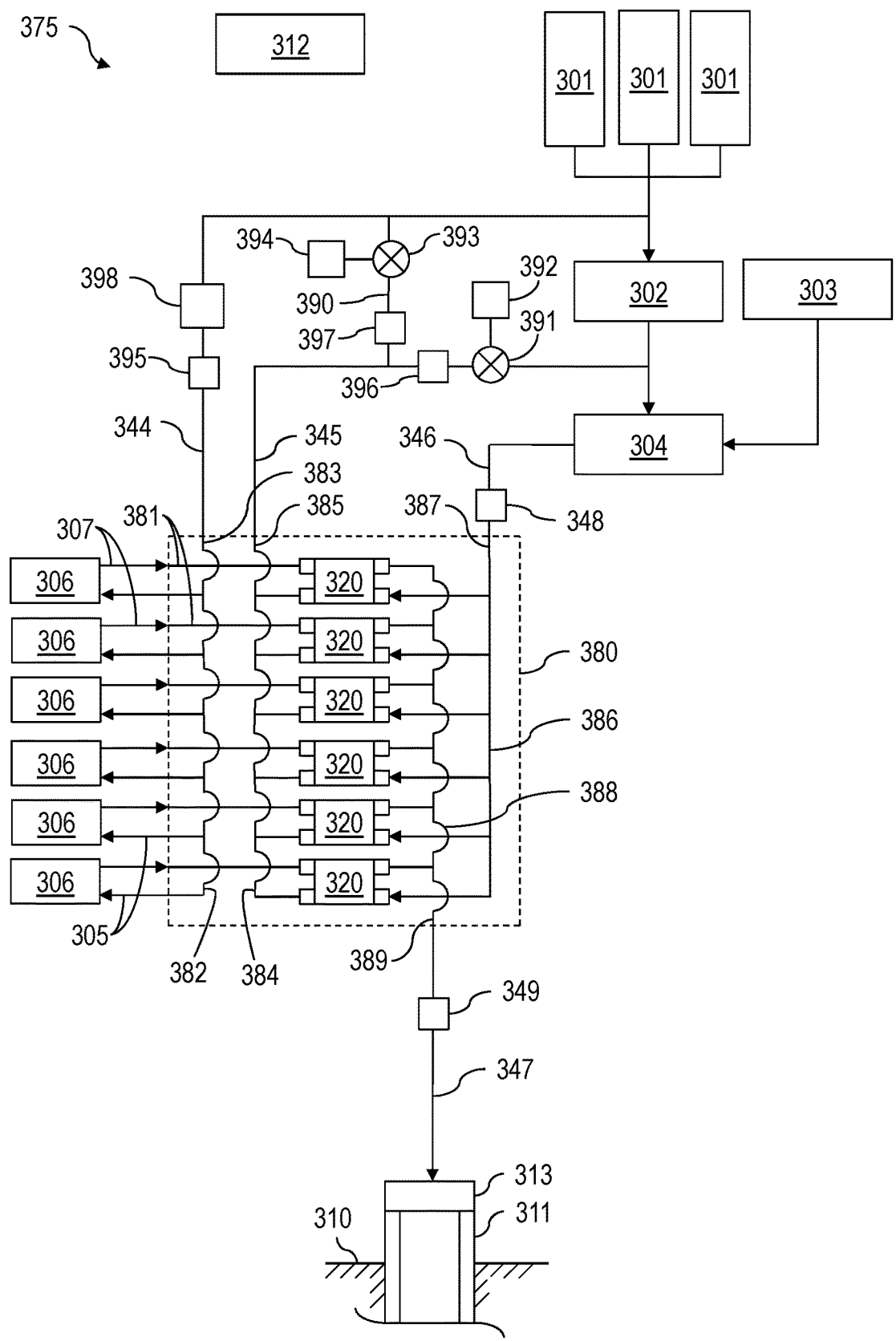
FIG. 16 is a schematic view of at least a portion of an example implementation of apparatus according to one or more aspects of the present disclosure.

FIG. 16 is a schematic view of an example implementation of another wellsite system 375 according to one or more aspects of the present disclosure. The wellsite system 375 comprises one or more similar features of the wellsite systems 370, 371, 372, 373, 374 shown in FIGS. 11, 12, 13, 14, and 15, respectively, including where indicated by like reference numbers, except as described below.

Unlike the wellsite systems 370, 371, 372, 373, 374, the wellsite system 375 comprises a plurality of pressure exchangers 320 integrated or otherwise combined as part of a manifold 380. The manifold 380 may comprise the plurality of the pressure exchangers 320 hard-piped or otherwise integrated with or along a plurality of fluid conduits, such as may facilitate fluid connection between the pressure exchangers 320 and the pumps 306, the source of clean fluid (e.g., the water tanks 301), the source of dirty fluid (e.g., the mixer 304), and the wellbore 311.

The manifold 380 may comprise a clean fluid distribution conduit 382 fluidly connected with the water tanks 301 via a fluid conduit system 344. The clean fluid distribution conduit 382 may split the stream of low-pressure clean fluid discharged from the tanks 301 into multiple streams each conducted to a corresponding pump 306. The clean fluid distribution conduit 382 may include an inlet port 383 fluidly connected with a fluid conduit system 344 and a plurality of outlet ports (not numbered) each fluidly connected with an inlet port of a corresponding pump 306 via a corresponding fluid conduit 305. A booster pump 398, such as a centrifugal pump, may be fluidly connected along the fluid conduit system 344 to transfer the clean fluid from the tanks 301 to the manifold 380 via the conduit system 344. The manifold 380 may further comprise a plurality of clean fluid inlet ports 381 fluidly connected with corresponding clean fluid inlets 332 of the pressure exchangers 320. Outlet ports of the pumps 306 may be fluidly connected with corresponding clean fluid inlets 332 of the pressure exchangers 320 via fluid conduits 307 extending between the outlets ports of the pumps 306 and the corresponding clean fluid inlet ports 381 of the manifold 380.

The manifold 380 may further comprise a clean fluid collection conduit 384 fluidly connected with an inlet of the mixer 304 via a fluid conduit system 345. The clean fluid collection conduit 384 may combine the streams of low-pressure clean fluid discharged from the pressure exchangers 320 into a single stream for transfer to the mixer 304 or another destination. The clean fluid collection conduit 384 may have a plurality of inlet ports (not numbered) each fluidly connected with the clean fluid outlet 334 of a corresponding pressure exchanger 320. The clean fluid collection conduit 384 may also have an outlet port 385 fluidly connected with the fluid conduit system 345.

The manifold 380 may further comprise a dirty fluid distribution conduit 386 fluidly connected with an outlet of the mixer 304 via a fluid conduit system 346. The dirty fluid distribution conduit 386 may split the stream of low-pressure dirty fluid discharged from the mixer 304 into multiple streams each conducted to a corresponding pressure exchanger 320. The dirty fluid distribution conduit 386 may have an inlet port 387 fluidly connected with the fluid conduit system 346 and a plurality of outlet ports (not numbered) each fluidly connected with a dirty fluid inlet 331 of a corresponding pressure exchanger 320.

The manifold 380 may further comprise a dirty fluid collection conduit 388 fluidly connected with the wellbore 311 via a fluid conduit system 347. The dirty fluid collection conduit 388 may combine the streams of high-pressure dirty fluid discharged from the pressure exchangers 320 into a single stream for transfer to the wellbore 311. The dirty fluid collection conduit 388 may have a plurality of inlet ports (not numbered) each fluidly connected with the dirty fluid outlet 333 of a corresponding pressure exchanger 320 and an outlet port 389 fluidly connected with the fluid conduit system 347.

The fluid conduit systems 344, 345 may be fluidly connected via a fluid conduit system 390 extending between the fluid conduit systems 344, 345. The fluid conduit system 390 may permit a selected portion of the clean fluid discharged from the pressure exchangers 320 and flowing through the fluid conduit system 345 to be directed into the fluid conduit system 344 and fed into the pumps 306 via the clean fluid distribution conduit 382. The amount or the flow rate of the clean fluid flowing through the fluid conduit system 345 and into the mixer 304 may be adjusted via a flow control valve 391 fluidly connected along the fluid conduit system 345. The flow control valve 391 may be fluidly connected downstream from the fluid conduit system 390. The amount or the flow rate of the clean fluid discharged from the pressure exchangers and directed into the pumps 306 via the fluid conduit system 390 may be adjusted via a flow control valve 393 fluidly connected along the fluid conduit system 390. The flow control valves 391, 393 may be or comprise flow rate control valves, such as needle valves, metering valves, butterfly valves, globe valves, or other valves operable to progressively or gradually open and close to control the flow rate of the clean fluid. Each fluid valve 391, 393 may be actuated remotely by a corresponding actuator 392, 394, respectively, operatively coupled with the valves 391, 393. The actuators may be or comprise electric actuators, such as solenoids or motors, or fluid actuators, such as pneumatic or hydraulic cylinders or rotary actuators. The fluid valves 391, 393 may also be actuated manually, such as by a lever (not shown).

The wellsite system 375 may further include one or more flow rate sensors 395, 396, 397, such as flow meters, operably connected along the fluid conduit systems 344, 345, 390, respectively. The flow rate sensors 395, 396, 397 may be operable to measure volumetric and/or mass flow rate of the clean fluid transferred via the respective fluid conduit systems 344, 345, 390. The flow rate sensors 395, 396, 397 may be electrical flow rate sensors operable to generate an electrical signal or information indicative of the measured flow rates.

The wellsite system 375 may perform density measurements along one or more fluid conduit systems to determine and control density of the dirty fluid being formed and/or injected into the wellbore 311. Accordingly, fluid analyzers 348, 349 may be disposed along the fluid conduit systems 346, 347 in a manner permitting monitoring of the flow rate and/or solids concentration of the fluid discharged from the mixer 304 and the manifold 380. Each fluid analyzer 348, 349 may comprise a density sensor operable to measure the solids concentration or the amount of particles in the fluid, which may be indicative of the amount of proppant or other solids in the fluids conducted by the conduit systems 346, 347. The density sensor may emit radiation that is absorbed by different particles in the fluid. Different absorption coefficients may exist for different particles, which may then be utilized to translate the signals or information generated by the density sensor to determine the density or solids concentration. Each fluid analyzer 348, 349 may also or instead comprise a flow rate sensor, such as a flow meter, operable to measure the volumetric and/or mass flow rate of the fluid.

Figure 17:
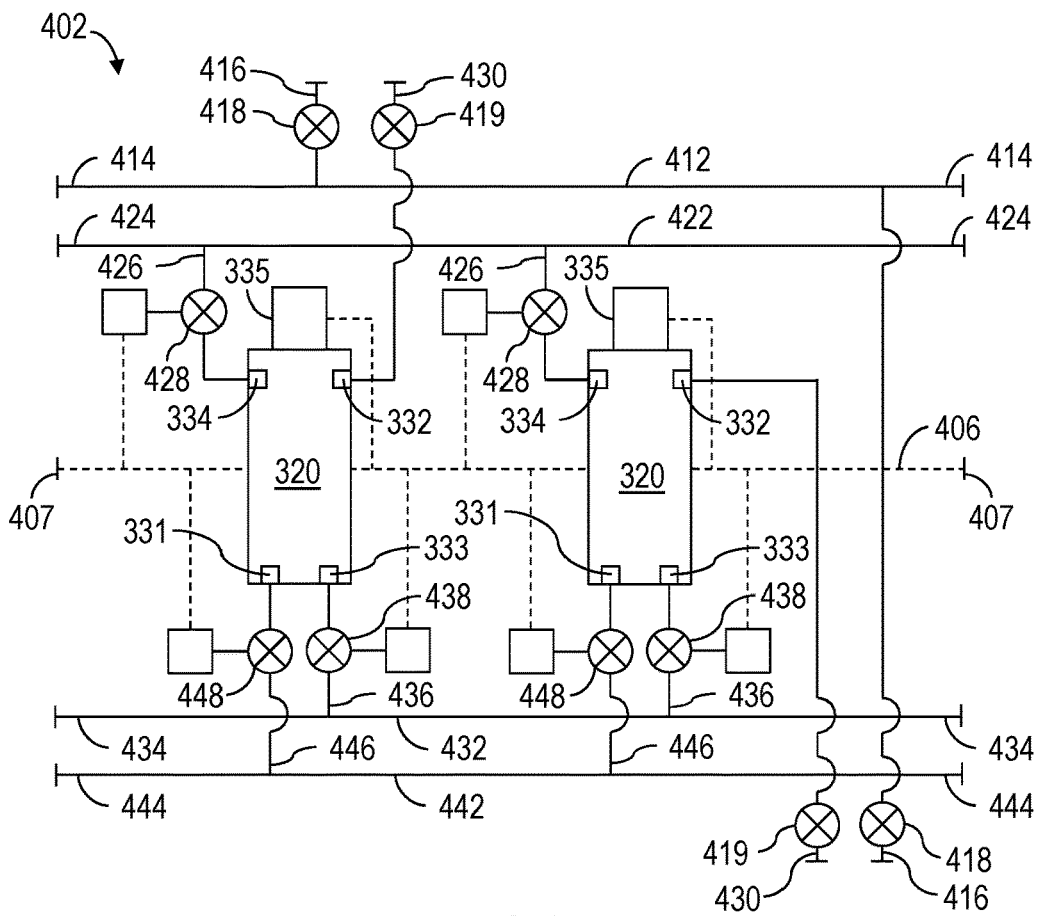
FIG. 17 is a schematic view of at least a portion of an example implementation of apparatus according to one or more aspects of the present disclosure.
Figure 18:
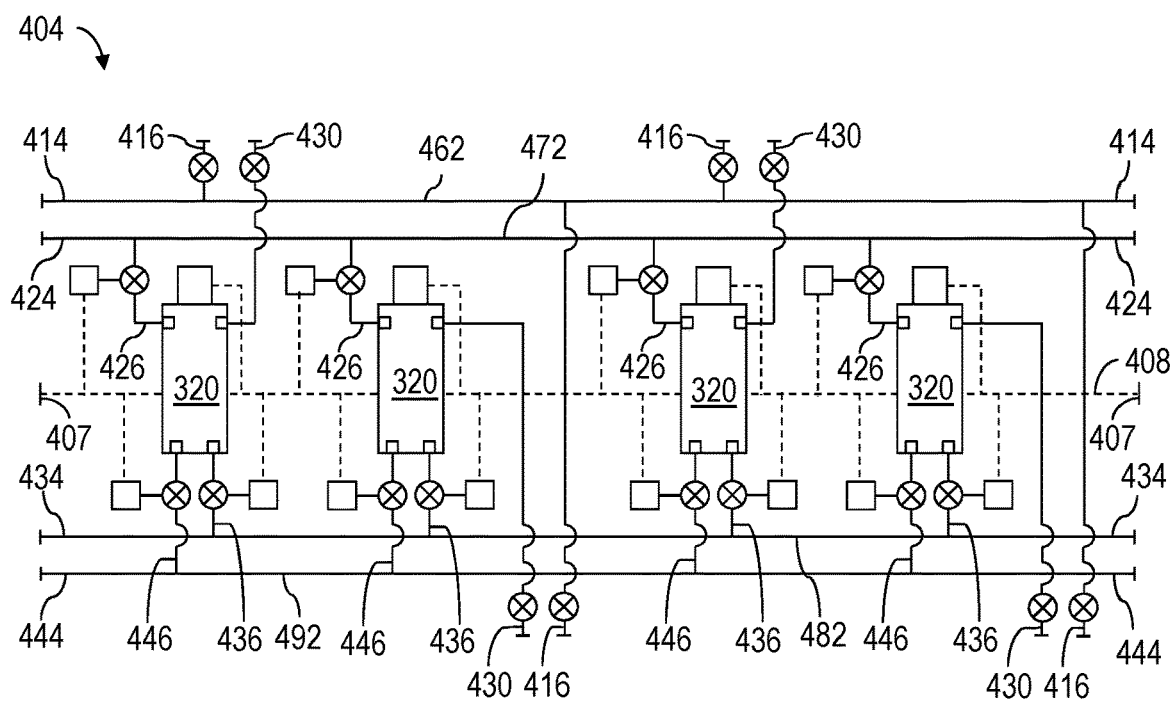
FIG. 18 is a schematic view of at least a portion of an example implementation of apparatus according to one or more aspects of the present disclosure.
Figure 19:
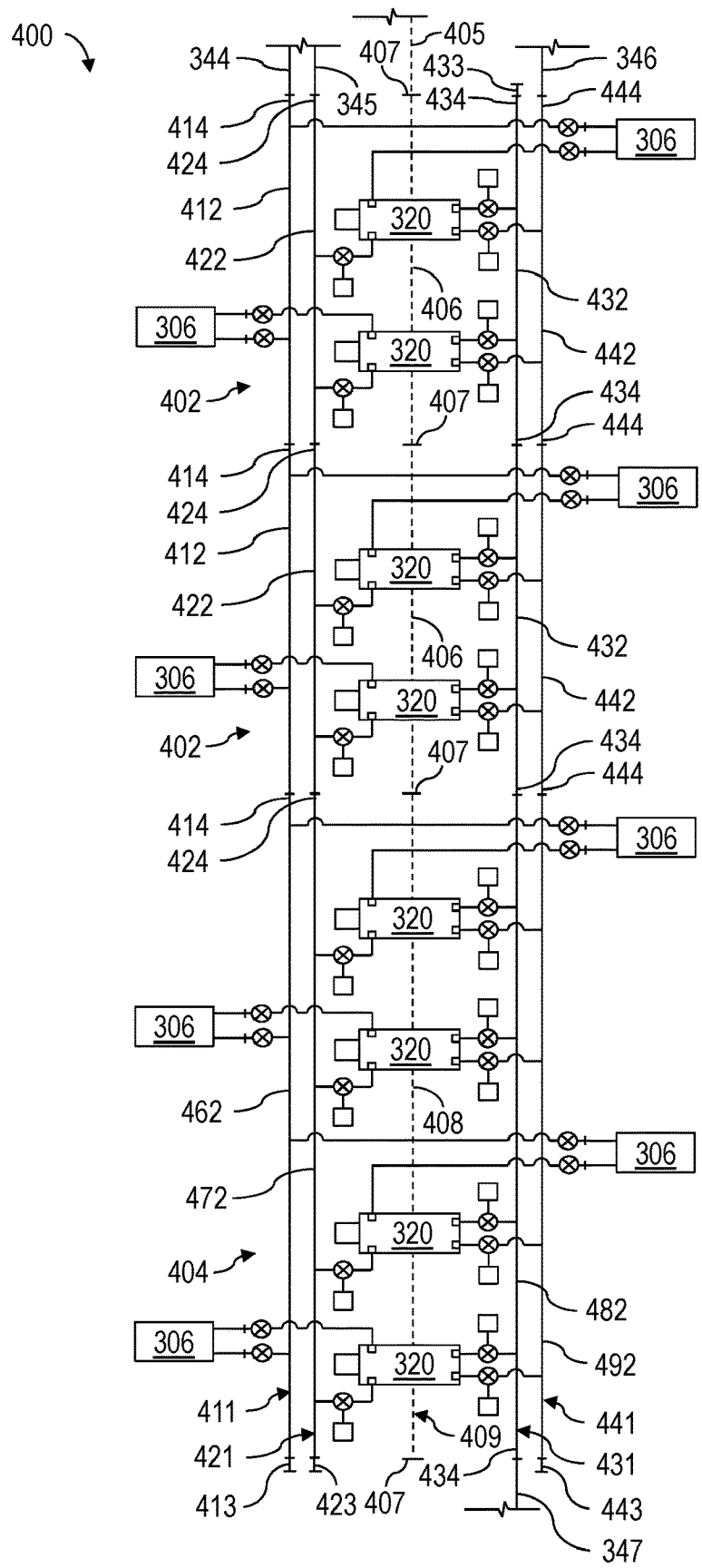
FIG. 19 is a schematic view of at least a portion of an example implementation of apparatus according to one or more aspects of the present disclosure.

Although the manifold 380 is shown as a single unit or piece of wellsite equipment, the manifold 380 may comprise a plurality of distinct units or sections detachably coupled together to form the manifold 380. FIG. 17-19 are schematic views of an example implementation of manifold segments 402, 404 comprising a portion of or otherwise utilized to form a manifold assembly 400 according to one or more aspects of the present disclosure. The manifold assembly 400 and manifold segments 402, 404 comprise one or more similar features of the manifold 380, including where indicated by like reference numbers, except as described below. The following description refers to FIGS. 16-19, collectively.

Referring now to FIG. 17, the manifold segment 402 may comprise a low-pressure clean fluid conduit 412, such as a fluid pipe, comprising opposing end openings or ports 414 and intermediate ports 416 located between the ports 414. The conduit 412 may be or comprise a segment of the clean fluid distribution conduit 382. The end ports 414 may be or comprise fluid couplings, such as flanges, boss couplings, threaded connectors, among other examples, operable to detachably fluidly connect with corresponding ports of low-pressure clean fluid conduits of other manifold segments. Each port 416 may be or comprise a fluid conduit terminating with a coupling, such as a flange, a boss coupling, and a threaded connector, among other examples, operable to fluidly connect with a corresponding port or fluid connector of the fluid conduit 305 to fluidly connect an inlet of a corresponding pump 306 with the clean fluid conduit 412. The ports 416 may extend to one side of the manifold segment 402 if the corresponding pumps 306 are located on one side of the manifold segment 402 or the ports 416 may extend on opposite sides of the manifold segments 402 if the corresponding pumps 306 are located on the opposite sides of the manifold segment 402. A fluid valve 418 may be connected at or along each port 416.

The manifold segment 402 may further comprise ports 430, each fluidly connected with the high-pressure clean fluid inlet 332 of a corresponding pressure exchanger 320. Each port 430 may be or comprise a fluid conduit terminating with a coupling, such as a flange, a boss coupling, a threaded connector, among other examples, operable to fluidly connect with a corresponding port or fluid connector of the fluid conduit 307 to fluidly connect an outlet of a corresponding pump 306 with the fluid inlet 332 of a corresponding pressure exchanger 320. The ports 430 may extend to one side of the manifold segment 402 if the corresponding pumps 306 are located on one side of the manifold segment 402 or the ports 430 may extend on opposite sides of the manifold segments 402 if the corresponding pumps 306 are located on the opposite sides of the manifold segment 402. A fluid valve 419 may be connected at or along each port 430.

The manifold segment 402 may further comprise a low-pressure clean fluid conduit 422, such as a fluid pipe, comprising opposing end openings or ports 424 and an intermediate ports 426 located between the ports 424. The conduit 422 may be or comprise a segment of the clean fluid collection conduit 384. The end ports 424 may be or comprise fluid couplings, such as flanges, boss couplings, threaded connectors, among other examples, operable to detachably fluidly connect with corresponding ports of low-pressure clean fluid conduits of other manifold segments. The ports 426 may be or comprise fluid conduits terminating with couplings fluidly connected with the low-pressure clean fluid outlet ports 334 of the pressure exchangers 320. A fluid valve 428 may be connected at or along each port 426.

The manifold segment 402 may further comprise a high-pressure dirty fluid conduit 432, such as a fluid pipe, comprising opposing end openings or ports 434 and intermediate ports 436 located between the ports 434. The conduit 432 may be or comprise a segment of the dirty fluid collection conduit 388. The end ports 434 may be or comprise fluid couplings, such as flanges, boss couplings, threaded connectors, among other examples, operable to detachably fluidly connect with corresponding ports of high-pressure dirty fluid conduits of other manifold segments. The intermediate ports 436 may be or comprise fluid conduits terminating with couplings fluidly connected with the high-pressure dirty fluid outlet ports 333 of the pressure exchangers 320. A fluid valve 438 may be connected at or along each port 436.

The manifold segment 402 may also comprise a low-pressure dirty fluid conduit 442, such as a fluid pipe, comprising opposing end openings or ports 444 and intermediate ports 446 located between the ports 444. The conduit 442 may be or comprise a segment of the dirty fluid distribution conduit 386. The end ports 444 may be or comprise fluid couplings, such as flanges, boss couplings, threaded connectors, among other examples, operable to detachably fluidly connect with corresponding ports of low-pressure dirty fluid conduits of other manifold segments. The intermediate ports 446 may be or comprise fluid conduits terminating with couplings fluidly connected with the low-pressure dirty fluid inlet ports 331 of the pressure exchangers 320. A fluid valve 448 may be connected at or along each port 446.

Each pressure exchanger 320 may have a rotary actuator 335 operatively connected thereto. The rotary actuator 335 may be connected with a rotor (not shown) of the pressure exchanger 320, such as may impart rotation to the rotor. The rotary actuator 335 may be an electrical or fluid powered motor connected with the rotor via a shaft, a transmission, or another intermediate driving member (not shown) operable to transfer torque from the rotary actuator 335 to the rotor.

The fluid valves 418, 419 may be or comprise fluid shut-off valves, such as ball valves, globe valves, butterfly valves, and/or other types of fluid valves, which may be selectively opened and closed to permit and prevent fluid flow through the ports 416, 430. Each fluid valve 418, 419 may be actuated manually, such as by a lever (not shown). However, each fluid valve 418, 419 may be actuated remotely by a corresponding actuator (not shown), such as an electric actuator, such as a solenoid or motor, or a fluid actuator, such as pneumatic or hydraulic cylinder or rotary actuator. The fluid valves 428, 438, 448 may be or comprise fluid shut-off valves, such as ball valves, globe valves, butterfly valves, and/or other types of fluid valves, which may be selectively opened and closed to permit and prevent fluid flow. The fluid valves 428, 438, 448 may instead be or comprise flow rate control valves, such as needle valves, metering valves, butterfly valves, globe valves, or other valves operable to progressively or gradually open and close to control the fluid flow rate. Each fluid valve 428, 438, 448 may be actuated remotely by a corresponding actuator (not numbered) operatively coupled with the fluid valves 428, 438, 448. The actuators may be or comprise electric actuators, such as solenoids or motors, or fluid actuators, such as pneumatic or hydraulic cylinders or rotary actuators. The fluid valves 428, 438, 448 may also be actuated manually, such as by a lever (not shown).

Although the manifold segment 402 is shown comprising two pressure exchangers 320 and two sets of corresponding ports 416, 426, 430, 436, 446, manifold segments within the scope of the present disclosure may also comprise one, three, four, five, six, or more pressure exchangers 320 and corresponding sets of ports 416, 426, 430, 436, 446. FIG. 18 is a schematic view of an example implementation of a manifold segment 404 comprising four pressure exchangers 320 and four sets of corresponding ports 416, 426, 430, 436, 446. The manifold segment 404 comprises one or more similar features of the manifold segment 402, including where indicated by like reference numbers, except as described below.

The manifold segment 404 may comprise a low-pressure clean fluid conduit 462 comprising opposing end openings or ports 414 and four intermediate ports 416 located between the ports 414. The conduit 462 may be or comprise a segment of the clean fluid distribution conduit 382. The manifold segment 404 may further comprise a low-pressure clean fluid conduit 472 comprising opposing end openings or ports 424 and four intermediate ports 426 located between the ports 424. The conduit 472 may be or comprise a segment of the clean fluid collection conduit 384. The manifold segment 404 may further comprise four ports 430, each fluidly connected with the high-pressure clean fluid inlet 332 of a corresponding pressure exchanger 320. Each set of ports 416, 430 may be fluidly coupled with a corresponding pump 306, such as via intermediate fluid conduits 305, 307. The manifold segment 404 may further comprise a high-pressure dirty fluid conduit 482 comprising opposing end openings or ports 434 and four intermediate ports 436 located between the ports 434. The conduit 482 may be or comprise a segment of the dirty fluid collection conduit 388. The manifold segment 402 may also comprise a low-pressure dirty fluid conduit 492 comprising opposing end openings or ports 444 and four intermediate ports 446 located between the ports 444. The conduit 492 may be or comprise a segment of the dirty fluid distribution conduit 386. As described above, the ports 426, 436, 446 may connect the conduits 472, 482, 492, respectively, with corresponding ports of the pressure exchangers 320.

Similar as described above, each pressure exchanger 320 may have a rotary actuator 335 operatively connected thereto. The rotary actuator 335 may be connected with a rotor (not shown) of the pressure exchanger 320, such as may impart rotation to the rotor.

Each manifold segment 402, 404 may further comprise a multi-conductor cable (shown in FIGS. 17 and 18 as dashed lines), hereinafter referred to as a conductor 406, 408, extending between opposing ends or sides of a corresponding manifold segment 402, 404. The conductors 406, 408 may be operable to communicatively and electrically connect the manifold segments 402, 404 with adjacent manifold segments 402, 404 when coupled together to form the manifold assembly 400. Each conductor 406, 408 may include various electrical connectors or interfaces (not shown), such as may facilitate connection between the conductor 406, 408 and the various components of the manifold segment 402, 404 to permit signal and electrical power communication between the various components of the manifold segments 402, 404 and a source of control signals and electrical power, such as the control unit 312 and an electrical generator (not shown). For example, actuators of the valves 428, 438, 448 and the motors 335 of each manifold segment 402, 404 may be communicatively connected with each conductor 406, 408 via corresponding conductors (also shown as dashed lines), such as may permit transfer of electrical power, data, and/or control signals between, e.g., the control unit 312 and electrical generator and one or more of the valves 428, 438, 448 and motors 335. Opposing ends of each conductor 406, 408 may terminate with or otherwise comprise electrical connectors or interfaces 407, which may facilitate mechanical and electrical connection between conductors 406, 408 of adjacent manifold segments 402, 404 when coupled to form the manifold assembly 400.

As described above, two or more of the manifold segments 402, 404, or other manifold segments comprising a different number of pressure exchangers 320, may be coupled together to form a manifold assembly within the scope of the present disclosure. FIG. 19 is a schematic view of an example implementation of the manifold assembly 400 comprising two manifold segments 402 and one manifold segment 404. Thus, the manifold assembly 400 comprises one or more similar features of the manifold segments 402, 404, including where indicated by like reference numbers, except as described below. The following description refers to FIGS. 16-19, collectively.

The manifold segments 402, 404 may be detachably coupled together to form the manifold assembly 400 by detachably coupling corresponding end ports 414, 424, 434, 444 of each manifold segment 402, 404. For example, the low-pressure clean fluid conduits 412, 462 of the manifold segments 402, 404 may be detachably coupled at their corresponding end ports 414 to form a low-pressure clean fluid conduit assembly 411 extending continuously along the length of the manifold assembly 400. One of the end ports 414 at the end of the conduit assembly 411 may be fluidly isolated or closed by a closing member 413, such as a plug, a cap, a blind flange, and the like. The end port 414 at the opposing end of the conduit assembly 411 may be fluidly connected with the conduit 344, such as to supply low-pressure clean fluid to the pressure exchangers 320. Furthermore, the low-pressure clean fluid conduits 422, 472 of the manifold segments 402, 404 may be coupled at their corresponding end ports 424 to form a low-pressure clean fluid conduit assembly 421 extending continuously along the length of the manifold assembly 400. One of the end ports 424 at the end of the conduit assembly 421 may be fluidly isolated or closed by a closing member 423. The end port 424 at the opposing end of the conduit assembly 421 may be fluidly connected with the conduit 345, such as to receive the low-pressure clean fluid discharged by the pressure exchangers 320. The low-pressure clean fluid conduits 432, 482 of the manifold segments 402, 404 may be coupled at their corresponding end ports 434 to form a high-pressure dirty fluid conduit assembly 431 extending continuously along the length of the manifold assembly 400. One of the end ports 434 at the end of the conduit assembly 431 may be fluidly isolated or closed by a closing member 433. The end port 434 at the opposing end of the conduit assembly 431 may be fluidly connected with the conduit 347, to receive the high-pressure dirty fluid discharged by the pressure exchangers 320 for injection into the wellbore 311. Also, the low-pressure clean fluid conduits 442, 492 of the manifold segments 402, 404 may be coupled at their corresponding end ports 444 to form a low-pressure dirty fluid conduit assembly 441 extending continuously along the length of the manifold assembly 400. One of the end ports 444 at the end of the conduit assembly 441 may be fluidly isolated or closed by a closing member 443. The end port 444 at the opposing end of the conduit assembly 441 may be fluidly connected with the conduit 346, such as to supply low-pressure dirty fluid to the pressure exchangers 320.

The manifold segments 402, 404 may be communicatively and electrically connected by coupling corresponding conductors 406, 408 of adjacent manifold segments 402, 404. For example, the conductors 406, 408 of the manifold segments 402, 404 may be detachably coupled at their corresponding end connectors 407 to form a conductor assembly 409 extending continuously along the length of the manifold assembly 400. The conductor assembly 409 may facilitate transfer of electrical power, data, and/or control signals between, e.g., the control unit 312 and the electrical generator and one or more of the manifold segments 402, 404 of the manifold assembly 400. The conductor assembly 409 may be electrically connected with a conductor 405, which may be electrically connected with the control unit 312 and the electrical generator to electrically connect the manifold assembly 400 with the control unit 312 and the electrical generator.

Although the manifold assembly 400 is shown comprising two manifold segments 402 and one manifold segment 404, manifold assemblies within the scope of the present disclosure may comprise other quantities of manifold segments 402, 404 and in different combinations. For example, a manifold assembly within the scope of the present disclosure may include one or more manifold segments comprising one, two, three, four, five, six, or other quantities of pressure exchangers 320.

Figure 20:
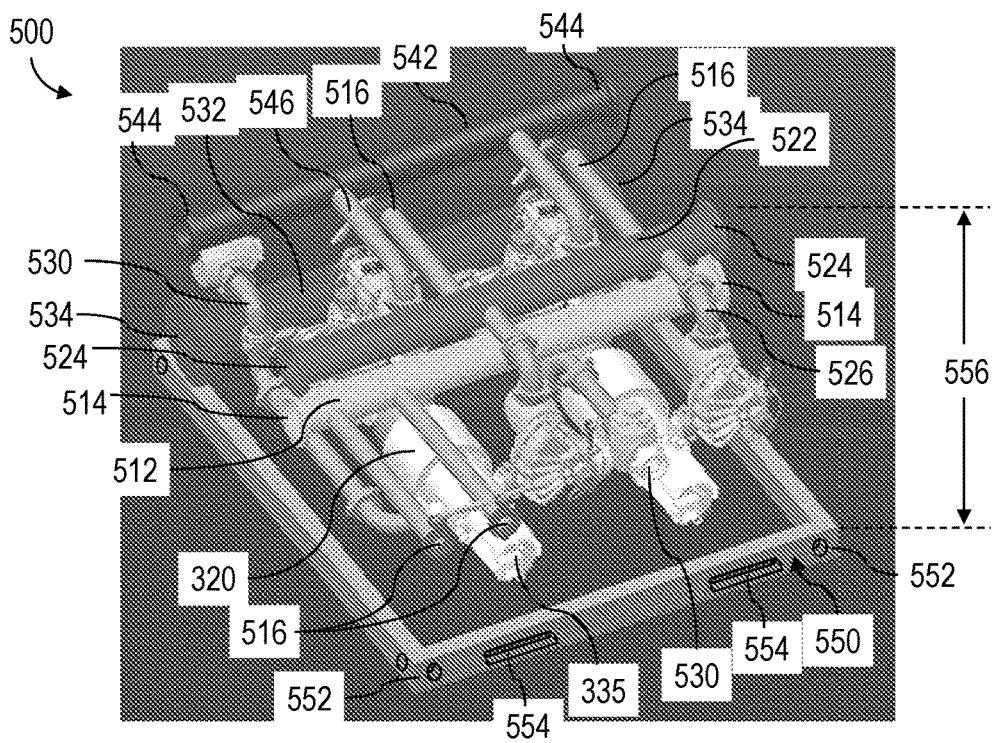
FIG. 20 is a perspective view of at least a portion of an example implementation of apparatus according to one or more aspects of the present disclosure.
Figure 21:
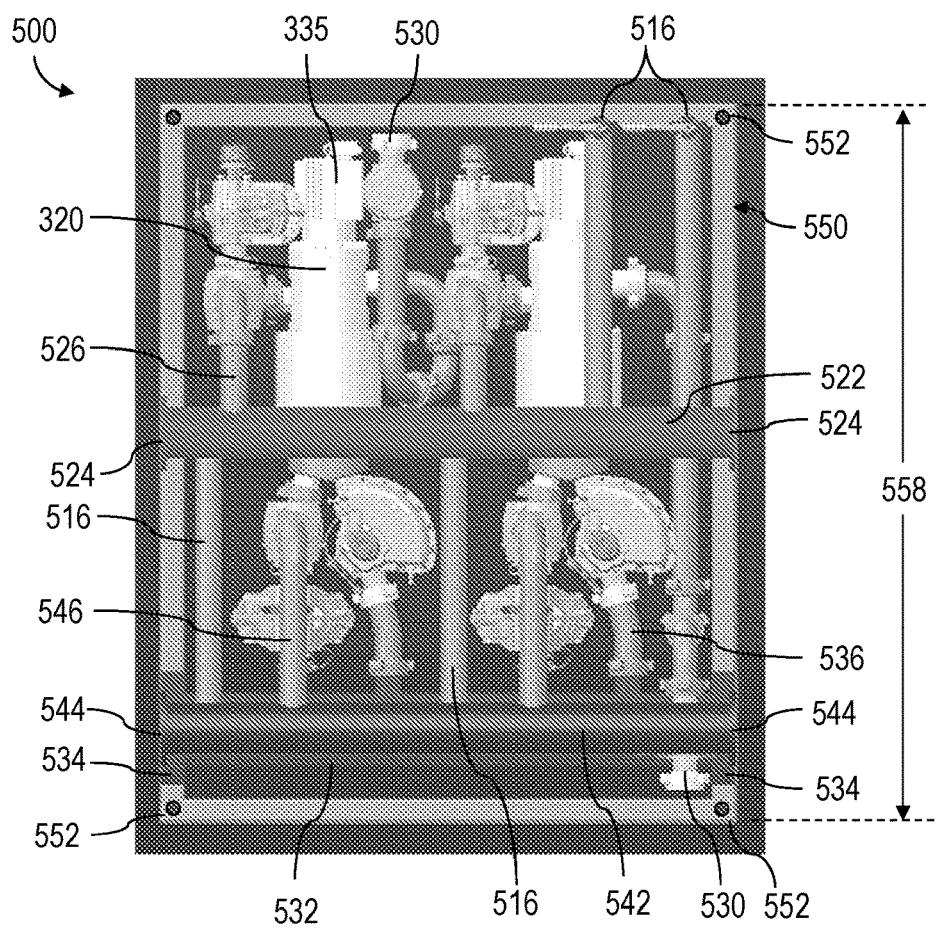
FIG. 21 is a top view of the apparatus shown in FIG. 20 according to one or more aspects of the present disclosure.

FIGS. 20 and 21 are perspective and top views of an example implementation of a manifold segment 500 according to one or more aspects of the present disclosure. The manifold segment 500 comprises one or more similar features of the manifold segment 402, including where indicated by like reference numbers, except as described below. The following description refers to FIGS. 16-21, collectively.

The manifold segment 500 may comprise a low-pressure clean fluid conduit 512, such as a fluid pipe, comprising opposing end openings or ports 514 and intermediate ports 516 located between the ports 514. The conduit 512 may be or comprise a segment of the clean fluid distribution conduit assembly 411. The end ports 514 may be or comprise fluid couplings, such as flanges, boss couplings, threaded connectors, among other examples, operable to detachably fluidly connect with corresponding ports of low-pressure clean fluid conduits of other manifold segments. Each intermediate port 516 may be or comprise a fluid conduit terminating with a coupling, such as a flange, a boss coupling, and a threaded connector, among other examples. The ports 516 may be operable to fluidly connect with corresponding fluid connectors of the fluid conduits 305 to fluidly connect inlets of the pumps 306 with the clean fluid conduit 512. A fluid valve (not numbered) may be connected at or along each intermediate port 516.

The manifold segment 500 may further comprise a low-pressure clean fluid conduit 522, such as a fluid pipe, comprising opposing end openings or ports 524 and an intermediate ports 526 located between the ports 524. The conduit 522 may be or comprise a segment of the clean fluid collection conduit assembly 421. The end ports 524 may be or comprise fluid couplings, such as flanges, boss couplings, threaded connectors, among other examples, operable to detachably fluidly connect with corresponding ports of low-pressure clean fluid conduits of other manifold segments. The intermediate ports 526 may be or comprise fluid conduits terminating with couplings fluidly connected with the low-pressure clean fluid outlet ports (not numbered) of the pressure exchangers 320. A fluid valve (not numbered) may be connected along each port 526. Each pressure exchanger 320 may have the rotary actuator 335 operatively connected thereto.

The manifold segment 500 may further comprise ports 530, each fluidly connected with the high-pressure clean fluid inlets (not numbered) of a corresponding pressure exchanger 320. Each port 530 may be or comprise a fluid conduit terminating with a coupling, such as a flange, a boss coupling, a threaded connector, among other examples. Each port 530 may be operable to fluidly connect with a corresponding fluid connector of the fluid conduit 307 to fluidly connect an outlet of a pump 306 with the high-pressure clean fluid inlet of a corresponding pressure exchanger 320. A fluid valve (not numbered) may be connected at or along each port 530.

The manifold segment 500 may further comprise a high-pressure dirty fluid conduit 532, such as a fluid pipe, comprising opposing end openings or ports 534 and intermediate ports 536 located between the ports 534. The conduit 532 may be or comprise a segment of the dirty fluid collection conduit assembly 431. The end ports 534 may be or comprise fluid couplings, such as flanges, boss couplings, threaded connectors, among other examples, operable to detachably fluidly connect with corresponding ports of high-pressure dirty fluid conduits of other manifold segments. The intermediate ports 536 may be or comprise fluid conduits terminating with couplings fluidly connected with the high-pressure dirty fluid outlet ports (not numbered) of the pressure exchangers 320. A fluid valve (not numbered) may be connected along each port 536.

The manifold segment 500 may also comprise a low-pressure dirty fluid conduit 542, such as a fluid pipe, comprising opposing end openings or ports 544 and intermediate ports 546 located between the ports 544. The conduit 542 may be or comprise a segment of the dirty fluid distribution conduit assembly 441. The end ports 544 may be or comprise fluid couplings, such as flanges, boss couplings, threaded connectors, among other examples, operable to detachably fluidly connect with corresponding ports of low-pressure dirty fluid conduits of other manifold segments. The intermediate ports 546 may be or comprise fluid conduits terminating with couplings fluidly connected with the low-pressure dirty fluid inlet ports (not numbered) of the pressure exchangers 320. A fluid valve (not numbered) may be connected along each port 546.

The manifold segment 500 may further comprise a frame assembly 550 extending around the conduits 512, 522, 532, 542, the valves, the ports 516, 526, 530, 536, 546, and/or the pressure exchangers 320 and operable to help maintain the components of the manifold segment 500 operatively connected and/or in relative positions. Portions of the frame assembly 550 are not shown to prevent obstructing some components of the manifold segment 500 from view. The frame assembly 550 may be a box-shaped frame (similar to frame 650 shown in FIGS. 22 and 23), encompassing or surrounding the components of the manifold segment 500 on each side. The frame assembly 550 may be or comprise a plurality of interconnected structural steel members or beams extending about and connected with the components of the manifold segment 500. The frame assembly 550 may be a load-bearing frame assembly operable to support the weight of one or more additional instances of the manifold segment 500 or other manifold segments vertically stacked on top of the manifold segment 500. Thus, the frame assembly 550 may protect the components of the manifold segment 500 from physical damage during transport, assembly, and operations and help facilitate transportation of the manifold segment 500.

The frame 550 may facilitate the manifold segment 500 to be implemented as a skid, which may be moved and/or temporarily or permanently installed at the wellsite surface 310. The frame 550 may also permit the manifold segment 500 to be mounted on a trailer, such as may permit transportation to the wellsite surface 310. For example, the frame assembly 550 and/or other portions of the manifold segment 500 may be constructed pursuant to International Organization for Standardization (ISO) specifications, permitting the manifold segment 500 to be transported like an intermodal ISO container. Accordingly, the frame assembly 550 or other portions of the manifold segment 500 may form or comprise corner castings 552, such as may facilitate the manifold segment 500 to be detachably mounted on a transport surface, such as a trailer 710 (shown in FIG. 24), and/or multiple manifold segments 500 to be stacked vertically on top of each other and/or connected together horizontally. The corner castings 552 and/or the frame assembly 550 may be constructed pursuant to ISO specifications, such as may permit the manifold segment 500 to be transported across different modes of transport within the global containerized intermodal freight transport system or other transport means adapted to receive standardized ISO containers. The frame assembly 550 may further have or form forklift or grappler pockets 554, such as may permit the manifold segment 500 to be picked up and moved by a forklift, a grappler, and/or a crane equipped with grappler tongs. The frame assembly 500 may also support a catwalk (not shown), such as may support wellsite operators or other workers while inspecting the components of the manifold segment 500 and/or facilitating mounting of the manifold segments 500 together and/or on the trailer 710.

The manifold segment 500 shows the pressure exchangers 320 mounted horizontally below the conduits 512, 522. Horizontal mounting may result in the manifold segment 500 having a vertical height 556 that is substantially less than if the pressure exchangers 320 were mounted vertically. However, mounting the pressure exchangers 320 vertically may result in a manifold segment having a horizontal width 558 that is substantially less than when the pressure exchangers 320 are mounted horizontally, as in the manifold segment 500.

Figure 22:
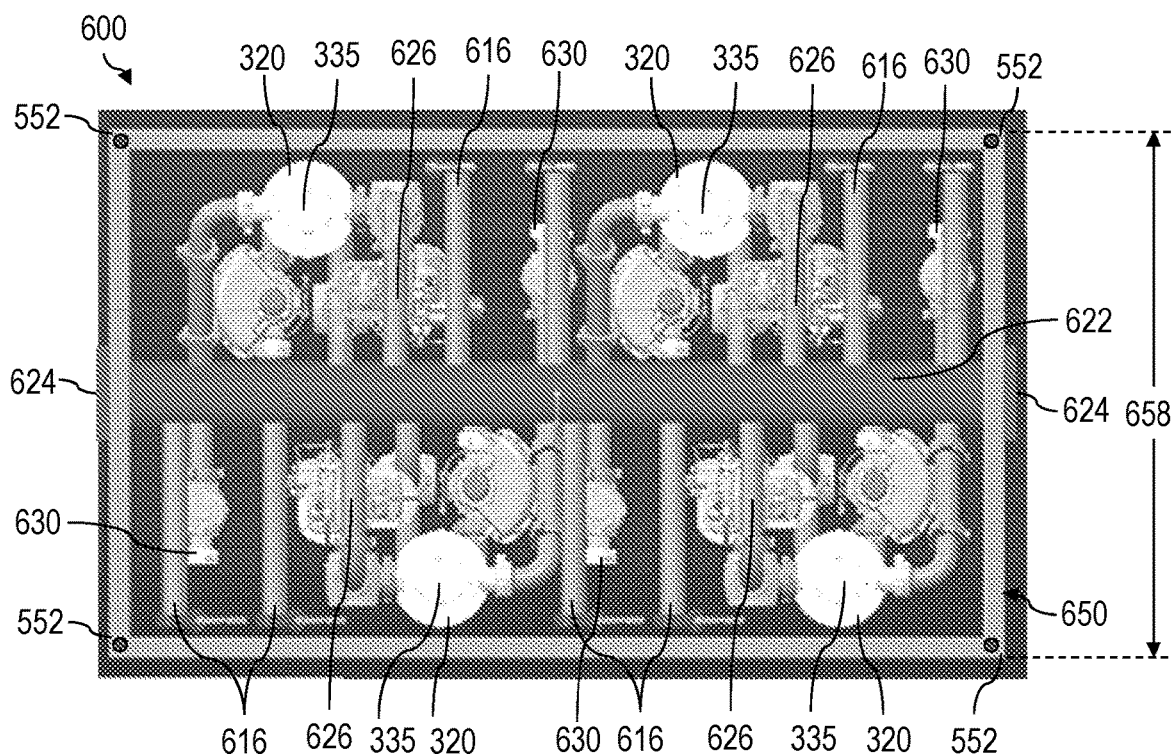
FIG. 22 is a top view of at least a portion of an example implementation of apparatus according to one or more aspects of the present disclosure.
Figure 23:
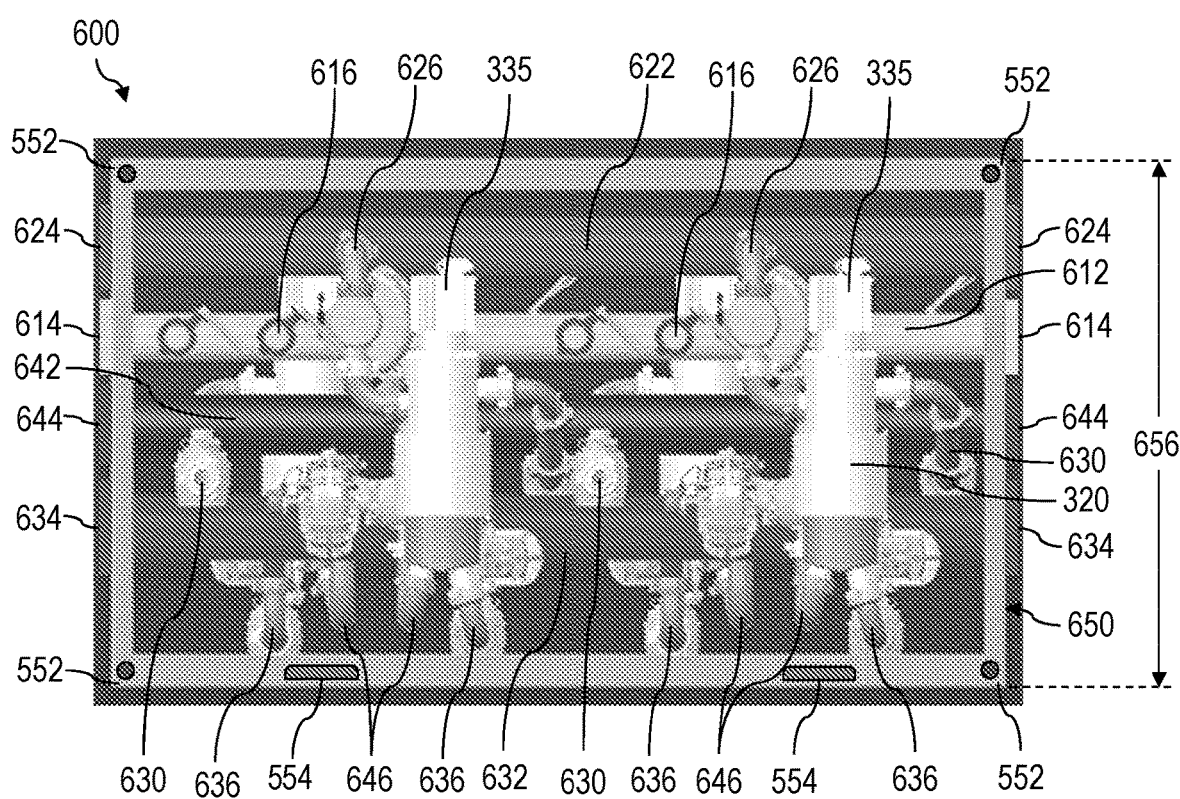
FIG. 23 is a side view of the apparatus shown in FIG. 22 according to one or more aspects of the present disclosure.

FIGS. 22 and 23 are top and side views of an example implementation of a manifold segment 600 according to one or more aspects of the present disclosure. The manifold segment 600 comprises one or more similar features of the manifold segments 404, 500, including where indicated by like reference numbers, except as described below. The following description refers to FIGS. 16-23, collectively.

The manifold segment 600 comprises four vertically mounted pressure exchangers 320. Such vertical mounting may result in a horizontal width 658 that is substantially less than the horizontal width 558 of the manifold segment 500, and a vertical height 656 that is substantially greater than the vertical height 556 of the manifold segment 500.

The manifold segment 600 may comprise a low-pressure clean fluid conduit 612 comprising opposing end openings or ports 614 and intermediate ports 616 located between the ports 614. The conduit 612 may be or comprise a segment of the clean fluid distribution conduit assembly 411. The end ports 614 may be or comprise fluid couplings operable to detachably fluidly connect with corresponding ports of low-pressure clean fluid conduits of other manifold segments. Each intermediate port 616 may be or comprise a fluid conduit terminating with a coupling operable to fluidly connect with a corresponding fluid connector of the fluid conduit 305 to fluidly connect an inlet of a corresponding pump 306 with the clean fluid conduit 612. A fluid valve (not numbered) may be connected at or along each port 616.

The manifold segment 600 may further comprise a low-pressure clean fluid conduit 622 comprising opposing end openings or ports 624 and an intermediate ports 626 located between the ports 624. The conduit 622 may be or comprise a segment of the clean fluid collection conduit assembly 421. The end ports 624 may be or comprise fluid couplings operable to detachably fluidly connect with corresponding ports of low-pressure clean fluid conduits of other manifold segments. The intermediate ports 626 may be or comprise fluid conduits terminating with couplings fluidly connected with the low-pressure clean fluid outlet ports (not numbered) of the pressure exchangers 320. A fluid valve (not numbered) may be connected at or along each port 626. Each pressure exchanger 320 may have the rotary actuator 335 operatively connected thereto.

The manifold segment 600 may further comprise ports 630 fluidly connected with the high-pressure clean fluid inlets (not numbered) of the pressure exchangers 320. Each port 630 may be or comprise a fluid conduit terminating with a coupling operable to fluidly connect with a corresponding fluid connector of the fluid conduit 307 to fluidly connect an outlet of a pump 306 with the high-pressure clean fluid inlet of a corresponding pressure exchanger 320. A fluid valve (not numbered) may be connected at or along each port 630.

The manifold segment 600 may further comprise a high-pressure dirty fluid conduit 632 comprising opposing end openings or ports 634 and intermediate ports 636 located between the ports 634. The conduit 632 may be or comprise a segment of the dirty fluid collection conduit assembly 431. The end ports 634 may be or comprise fluid couplings operable to detachably fluidly connect with corresponding ports of high-pressure dirty fluid conduits of other manifold segments. The intermediate ports 636 may be or comprise fluid conduits terminating with couplings fluidly connected with the high-pressure dirty fluid outlet ports (not numbered) of the pressure exchangers 320. A fluid valve (not numbered) may be connected at or along each port 636.

The manifold segment 600 may also comprise a low-pressure dirty fluid conduit 642 comprising opposing end openings or ports 644 and intermediate ports 646 located between the ports 644. The conduit 642 may be or comprise a segment of the dirty fluid distribution conduit assembly 441. The end ports 644 may be or comprise fluid couplings operable to detachably fluidly connect with corresponding ports of low-pressure dirty fluid conduits of other manifold segments. The intermediate ports 646 may be or comprise fluid conduits terminating with couplings fluidly connected with the low-pressure dirty fluid inlet ports (not numbered) of the pressure exchangers 320. A fluid valve (not numbered) may be connected at or along each port 646.

Similarly to the manifold segment 500, the manifold segment 600 may further comprise a frame assembly 650 extending around the conduits 612, 622, 632, 642, the valves, the ports 616, 626, 630, 636, 646, and/or the pressure exchangers 320 and operable to help maintain components of the manifold segment 600 operatively connected and/or in relative positions. The frame assembly 650 may protect the components of the manifold segment 600 from physical damage during transport, assembly, and operations and permit transportation of the manifold segment 600. The frame 650 may facilitate the manifold segment 600 to be implemented as a skid, which may be moved and/or temporarily or permanently installed at the wellsite surface 310. The frame assembly 650 or other portions of the manifold segment 600 may form or comprise corner castings 552, such as may facilitate the manifold segment 600 to be detachably mounted on a transport surface, such as the trailer 710 (shown in FIG. 24) and/or multiple manifold segments 600 to be stacked vertically on top of each and/or connected together horizontally. The frame assembly 650 may further have forklift or grappler pockets 554, such as may permit the manifold segment 600 to be picked up and moved by a forklift, a grappler, and/or a crane equipped with grappler tongs.

Figure 24:
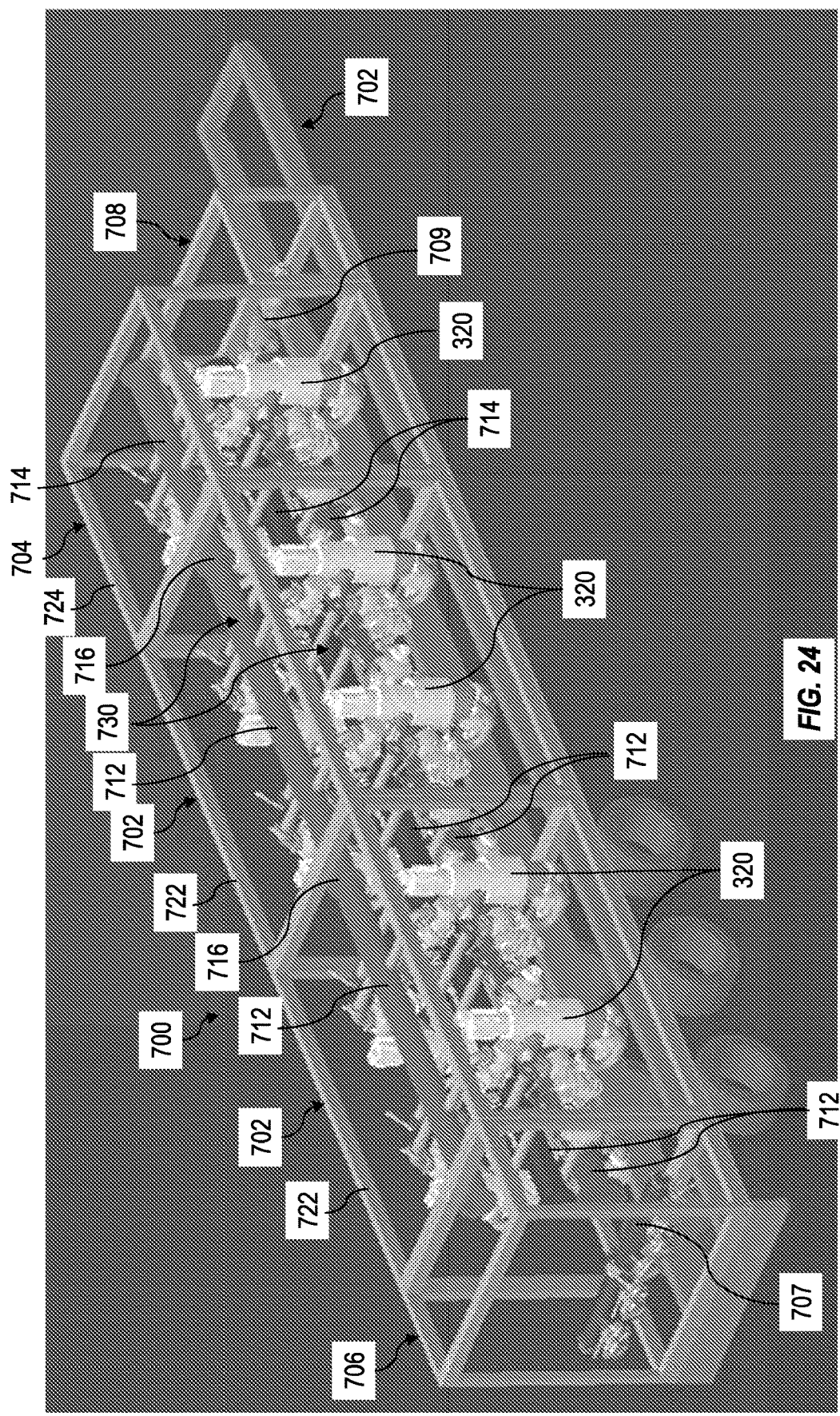
FIG. 24 is a perspective view of at least a portion of an example implementation of apparatus according to one or more aspects of the present disclosure.

FIG. 24 is a perspective view of an example implementation manifold assembly 700 according to one or more aspects of the present disclosure. The manifold assembly 700 comprises one or more similar features of the manifold segments 402, 404, 500, 600 including where indicated by like reference numbers, except as described below. The following description refers to FIGS. 16-24, collectively.

The manifold assembly 700 is shown comprising two manifold segments 702 having four pressure exchangers 320 and one manifold segment 704 having two pressure exchangers 320. The manifold assembly 700 may be assembled and mounted on a mobile trailer 710, such as may permit the manifold assembly 700 to be transported to a wellsite 310 via a vehicle (not shown), such as a truck. The mobile trailer 710 may be a flatbed trailer, a double-drop trailer, or another trailer adapted to receive and transport a manifold assembly or individual manifold segments. Accordingly, the manifold assembly 700 may be simultaneously assembled and mounted on the mobile trailer 710 or the manifold assembly 700 may be first assembled and then mounted on the mobile trailer 710 for transport to the wellsite 310. Once at the wellsite 310, the manifold assembly 700 may be unloaded from the mobile trailer 710 and fluidly connected to other wellsite equipment to conduct the pumping operations. However, the manifold assembly 700 may be maintained on the mobile trailer 710 throughout the pumping operations. The mobile trailer 710 may also be utilized to transport individual (i.e., unassembled) manifold segments 702, 704 or other manifold segments within the scope of the present disclosure to the wellsite 310, where they may be unloaded and assembled to form the manifold assembly 700 or another manifold assembly.

Similar to as described above, each manifold segment 702, 704 may comprise a plurality of fluid conduit segments 712, 714 (some of which are obstructed from view) fluidly connected with corresponding pressure exchangers 320. Each manifold segment 702, 704 may also include a frame assembly 722, 724 extending around the fluid conduit segments 712, 714 and the pressure exchangers 320. The fluid conduit segments 712, 714 may be coupled at their corresponding end ports 716 to form fluid conduit assemblies 730 extending continuously along the length of the manifold assembly 700 fluidly connecting the manifold segments 702, 703. The end ports 716 may be or comprise corresponding flanges, boss couplings, and threaded connectors, among other examples. The fluid conduits 730 may be or comprise the fluid conduit assemblies 382, 384, 386, 388, 411, 421, 431, 441 described above. The frame assemblies 702, 704 may also be connected together, such as via the corner castings 552, to increase structural integrity of the manifold assembly 700 and/or to reduce stress between the end ports 716.

The manifold assembly 700 may also comprise end segments 706, 708, such as may be operable to fluidly connect multiple fluid conduits and/or pieces of wellsite equipment with a corresponding one or more of the fluid conduits 730. For example, the end segment 706 may comprise a manifold 707 having a single inlet and a plurality of outlets and may be operable to split up flow of the pressurized dirty fluid among a plurality of fluid conduits for injection into the wellbore 311. The end segment 708 may comprise a manifold 709 having a single outlet and a plurality of inlets and may be operable to combine flow of low pressure dirty fluid conducted along a plurality of fluid conduits from the mixer 304.

Figure 25:
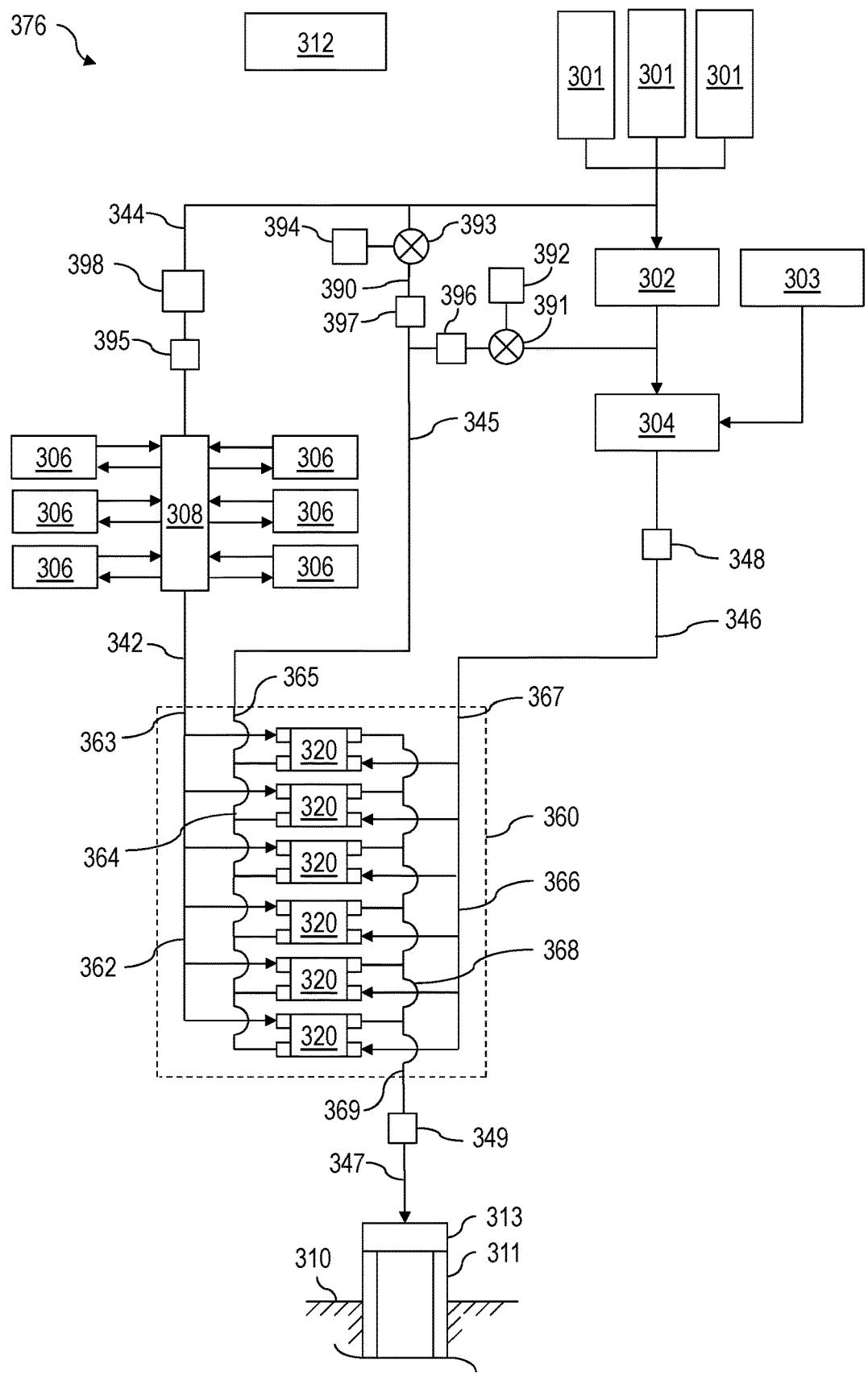
FIG. 25 is a schematic view of at least a portion of an example implementation of apparatus according to one or more aspects of the present disclosure.

FIG. 25 is a schematic view of an example implementation of another wellsite system 376 according to one or more aspects of the present disclosure. The wellsite system 376 comprises one or more similar features of the wellsite systems 370, 371, 372, 373, 374, 375 shown in FIGS. 11, 12, 13, 14, 15, and 16, respectively, including where indicated by like reference numbers, except as described below.

Unlike the wellsite systems, 370, 371, 372, 373, 374, 375, the wellsite system 376 comprises a pressure exchanging manifold 360 fluidly connected to and operable to receive pressurized clean fluid from a manifold 308. The manifold 308 may be fluidly connected with a plurality of pumps 306, such as may be operable to pressurize the clean fluid received from the tanks 301 via the fluid conduit system 344 and discharge the pressurized clean fluid into the manifold 360 via the fluid conduit system 342. The manifold 360 may comprise a plurality of pressure exchangers 320 that may be hard-piped or otherwise integrated with or along a plurality of fluid conduits operable to fluidly connect the pressure exchangers 320 with a source of pressurized clean fluid (i.e., the manifold 308), a source of dirty fluid (i.e., the mixer 304), and the wellbore 311.

The manifold 360 may comprise a clean fluid distribution conduit 362 fluidly connected with the manifold 308 via the fluid conduit system 342 and configured to split up or otherwise distribute the pressurized clean fluid among the plurality of pressure exchangers 320. The clean fluid distribution conduit 362 may include an inlet port 363 fluidly connected with the fluid conduit system 342 and a plurality of outlet ports (not numbered) each fluidly connected with a clean fluid inlet port 332 of a corresponding pressure exchanger 320. The manifold 360 may further comprise a clean fluid collection conduit 364 fluidly connected with an inlet of the mixer 304 via a fluid conduit system 345. The clean fluid collection conduit 364 may combine the streams of low-pressure clean fluid discharged from the pressure exchangers 320 into a single stream for transfer to the mixer 304 and/or another destination. The clean fluid collection conduit 364 may have a plurality of inlet ports (not numbered) each fluidly connected with the clean fluid outlet 334 of a corresponding pressure exchanger 320. The clean fluid collection conduit 364 may also have an outlet port 365 fluidly connected with the fluid conduit system 345. The manifold 360 may further comprise a dirty fluid distribution conduit 366 fluidly connected with an outlet of the mixer 304 via a fluid conduit system 346. The dirty fluid distribution conduit 366 may split the stream of low-pressure dirty fluid discharged from the mixer 304 into multiple streams each conducted to a corresponding pressure exchanger 320. The dirty fluid distribution conduit 366 may have an inlet port 367 fluidly connected with the fluid conduit system 346 and a plurality of outlet ports (not numbered) each fluidly connected with a dirty fluid inlet 331 of a corresponding pressure exchanger 320. The manifold 360 may also comprise a dirty fluid collection conduit 368 fluidly connected with the wellbore 311 via a fluid conduit system 347. The dirty fluid collection conduit 368 may combine the streams of high-pressure dirty fluid discharged from the pressure exchangers 320 into a single stream for transfer to the wellbore 311. The dirty fluid collection conduit 368 may have a plurality of inlet ports (not numbered) each fluidly connected with the dirty fluid outlet 333 of a corresponding pressure exchanger 320 and an outlet port 369 fluidly connected with the fluid conduit system 347.

Similarly as described above, the fluid conduit systems 344, 345 may be fluidly connected via a fluid conduit system 390 extending between the fluid conduit systems 344, 345. The fluid conduit system 390 may permit a selected portion of the clean fluid discharged from the pressure exchangers 320 and flowing through the fluid conduit system 345 to be directed into the fluid conduit system 344 and fed into the pumps 306 via the clean fluid distribution conduit 362.

Figure 26:
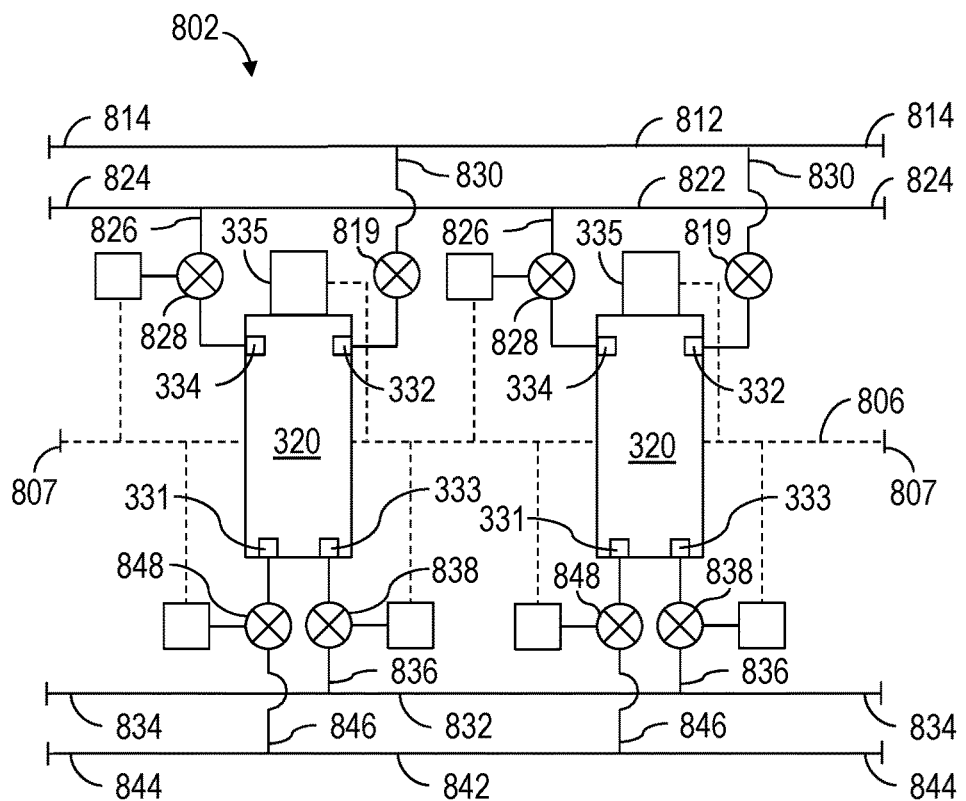
FIG. 26 is a schematic view of at least a portion of an example implementation of apparatus according to one or more aspects of the present disclosure.
Figure 27:
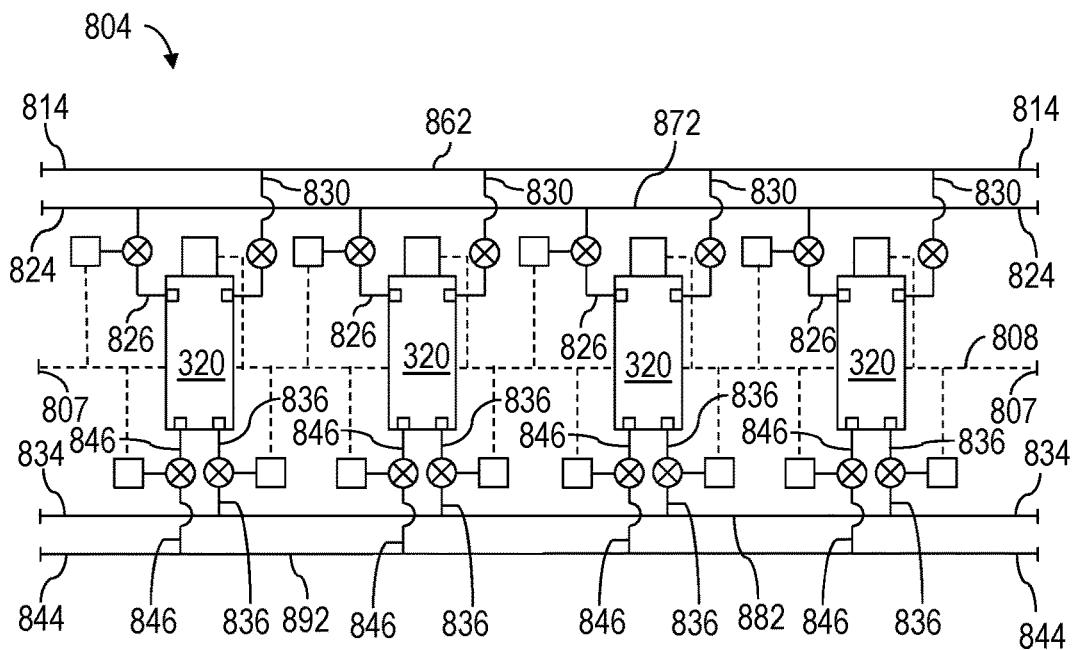
FIG. 27 is a schematic view of at least a portion of an example implementation of apparatus according to one or more aspects of the present disclosure.
Figure 28:
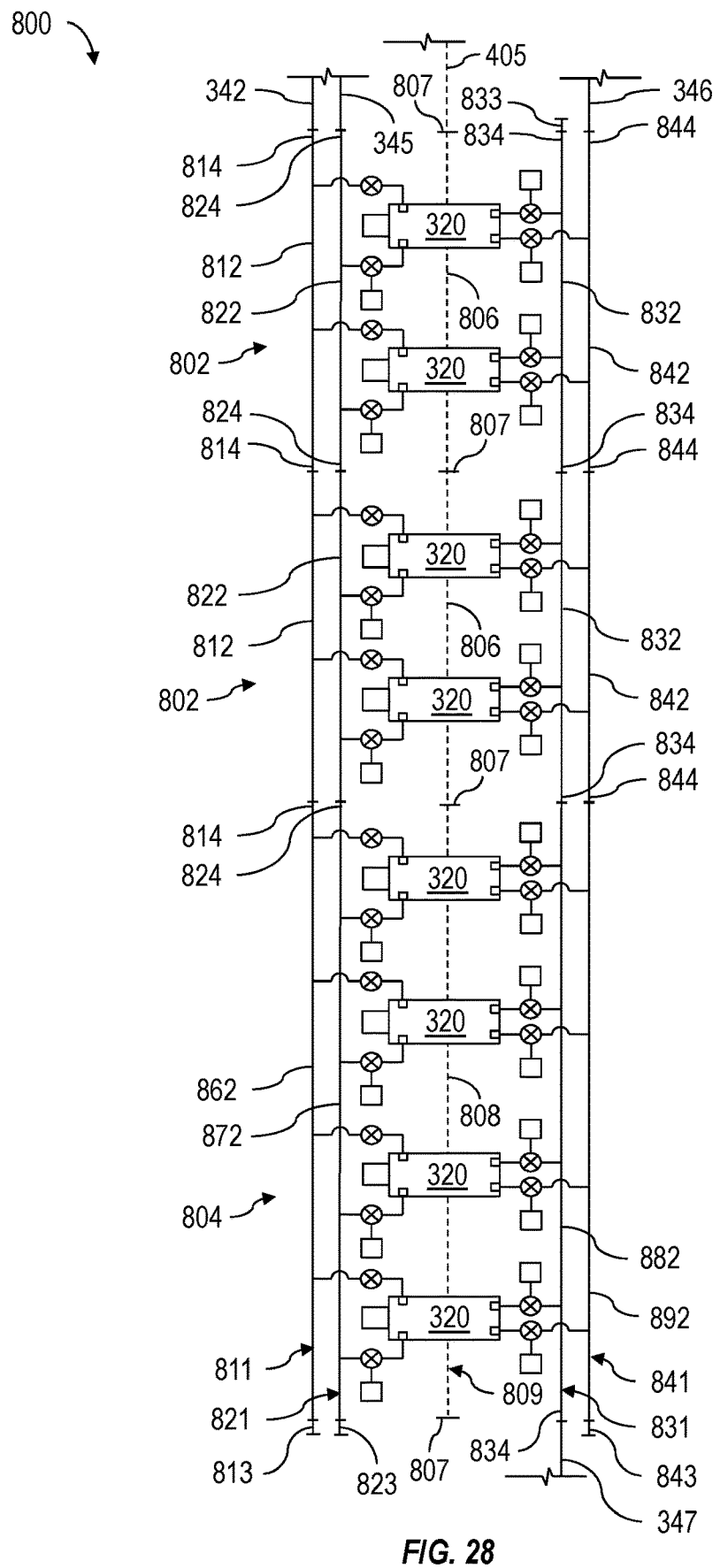
FIG. 28 is a schematic view of at least a portion of an example implementation of apparatus according to one or more aspects of the present disclosure.

Although the manifold 360 is shown as a single unit or piece of wellsite equipment, the manifold 360 may comprise a plurality of distinct units or sections detachably coupled together to form the manifold 360. FIGS. 26-28 are schematic views of an example implementation of manifold segments 802, 804 comprising a portion of or otherwise utilized to form a manifold assembly 800 according to one or more aspects of the present disclosure. The manifold assembly 800 and manifold segments 802, 804 comprise one or more similar features of the manifold 360, including where indicated by like reference numbers, except as described below. The following description refers to FIGS. 25-28, collectively.

Referring now to FIG. 26, the manifold segment 802 may comprise a high-pressure clean fluid conduit 812, such as a fluid pipe, comprising opposing end openings or ports 814 and intermediate ports 830 located between the ports 814.

The conduit 812 may be or comprise a segment of the clean fluid distribution conduit 362. The end ports 814 may be or comprise fluid couplings, such as flanges, boss couplings, threaded connectors, among other examples, operable to detachably fluidly connect with corresponding end ports of high-pressure clean fluid conduits of other manifold segments. Each port 830 may be or comprise a fluid conduit terminating with a coupling fluidly connected with a high-pressure clean fluid inlet 332 of a corresponding pressure exchanger 320. A fluid valve 819 may be connected at or along each port 830.

The manifold segment 802 may further comprise a low-pressure clean fluid conduit 822, such as a fluid pipe, comprising opposing end openings or ports 824 and an intermediate ports 826 located between the ports 824. The conduit 822 may be or comprise a segment of the clean fluid collection conduit 364. The end ports 824 may be or comprise fluid couplings, such as flanges, boss couplings, threaded connectors, among other examples, operable to detachably fluidly connect with corresponding end ports of low-pressure clean fluid conduits of other manifold segments. The ports 826 may be or comprise fluid conduits terminating with couplings fluidly connected with the low-pressure clean fluid outlet ports 334 of the pressure exchangers 320. A fluid valve 828 may be connected at or along each port 826.

The manifold segment 802 may further comprise a high-pressure dirty fluid conduit 832, such as a fluid pipe, comprising opposing end openings or ports 834 and intermediate ports 836 located between the ports 834. The conduit 832 may be or comprise a segment of the dirty fluid collection conduit 368. The end ports 834 may be or comprise fluid couplings, such as flanges, boss couplings, threaded connectors, among other examples, operable to detachably fluidly connect with corresponding end ports of high-pressure dirty fluid conduits of other manifold segments. The intermediate ports 836 may be or comprise fluid conduits terminating with couplings fluidly connected with the high-pressure dirty fluid outlet ports 333 of the pressure exchangers 320. A fluid valve 838 may be connected at or along each port 836.

The manifold segment 802 may also comprise a low-pressure dirty fluid conduit 842, such as a fluid pipe, comprising opposing end openings or ports 844 and intermediate ports 846 located between the ports 844. The conduit 842 may be or comprise a segment of the dirty fluid distribution conduit 366. The end ports 844 may be or comprise fluid couplings, such as flanges, boss couplings, threaded connectors, among other examples, operable to detachably fluidly connect with corresponding end ports of low-pressure dirty fluid conduits of other manifold segments. The intermediate ports 846 may be or comprise fluid conduits terminating with couplings fluidly connected with the low-pressure dirty fluid inlet ports 331 of the pressure exchangers 320. A fluid valve 848 may be connected at or along each port 846.

Each pressure exchanger 320 may have a rotary actuator 335 operatively connected thereto. The rotary actuator 335 may be connected with a rotor (not shown) of the pressure exchanger 320, such as may impart rotation to the rotor. The rotary actuator 335 may be an electrical or fluid powered motor connected with the rotor via a shaft, a transmission, or another intermediate driving member (not shown) operable to transfer torque from the rotary actuator 335 to the rotor.

The fluid valves 819 may be or comprise fluid shut-off valves, such as ball valves, globe valves, butterfly valves, and/or other types of fluid valves, which may be selectively opened and closed to permit and prevent fluid flow through the ports 830. Each fluid valve 819 may be actuated manually, such as by a lever (not shown). However, each fluid valve 819 may be actuated remotely by a corresponding actuator (not shown), such as an electric actuator, such as a solenoid or motor, or a fluid actuator, such as pneumatic or hydraulic cylinder or rotary actuator. The fluid valves 828, 838, 848 may be or comprise fluid shut-off valves, such as ball valves, globe valves, butterfly valves, and/or other types of fluid valves, which may be selectively opened and closed to permit and prevent fluid flow. The fluid valves 828, 838, 848 may instead be or comprise flow rate control valves, such as needle valves, metering valves, butterfly valves, globe valves, or other valves operable to progressively or gradually open and close to control the fluid flow rate. Each fluid valve 828, 838, 848 may be actuated remotely by a corresponding actuator (not numbered) operatively coupled with the fluid valves 828, 838, 848. The actuators may be or comprise electric actuators, such as solenoids or motors, or fluid actuators, such as pneumatic or hydraulic cylinders or rotary actuators. The fluid valves 828, 838, 848 may also be actuated manually, such as by a lever (not shown).

Although the manifold segment 802 is shown comprising two pressure exchangers 320 and two sets of corresponding ports 826, 830, 836, 846, manifold segments within the scope of the present disclosure may also comprise one, three, four, five, six, eight, or more pressure exchangers 320 and corresponding sets of ports 826, 830, 836, 846. FIG. 27 is a schematic view of an example implementation of a manifold segment 804 comprising four pressure exchangers 320 and four sets of corresponding ports 826, 830, 836, 846. The manifold segment 804 comprises one or more similar features of the manifold segment 802, including where indicated by like reference numbers, except as described below.

The manifold segment 804 may comprise a high-pressure clean fluid conduit 862, such as a fluid pipe, comprising opposing end openings or ports 814 and intermediate ports 830 located between the ports 814. The conduit 862 may be or comprise a segment of the clean fluid distribution conduit 362. Each port 830 may be fluidly connected with the high-pressure clean fluid inlet 332 of a corresponding pressure exchanger 320. The manifold segment 804 may further comprise a low-pressure clean fluid conduit 872 comprising opposing end openings or ports 824 and intermediate ports 826 located between the ports 824. The conduit 872 may be or comprise a segment of the clean fluid collection conduit 364. Each port 826 may be fluidly connected with the low-pressure clean fluid outlet 334 of a corresponding pressure exchanger 320. The manifold segment 804 may further comprise a high-pressure dirty fluid conduit 882 comprising opposing end openings or ports 834 and intermediate ports 836 located between the ports 834. The conduit 882 may be or comprise a segment of the dirty fluid collection conduit 368. Each port 836 may be fluidly connected with the high-pressure dirty fluid outlet 333 of a corresponding pressure exchanger 320. The manifold segment 802 may also comprise a low-pressure dirty fluid conduit 892 comprising opposing end openings or ports 844 and intermediate ports 846 located between the ports 844. The conduit 892 may be or comprise a segment of the dirty fluid distribution conduit 366. Each port 846 may be fluidly connected with the low-pressure dirty fluid inlet 331 of a corresponding pressure exchanger 320. Similar as described above, each pressure exchanger 320 may have a rotary actuator 335 operatively connected thereto. The rotary actuator 335 may be connected with a rotor (not shown) of the pressure exchanger 320, such as may impart rotation to the rotor.

Each manifold segment 802, 804 may further comprise a multi-conductor cable (shown in FIGS. 26 and 27 as dashed lines), hereinafter referred to as a conductor 806, 808, extending between opposing ends or sides of a corresponding manifold segment 802, 804. The conductors 806, 808 may be operable to communicatively and electrically connect the manifold segments 802, 804 with adjacent manifold segments 802, 804 when coupled together to form the manifold assembly 800. Each conductor 806, 808 may include various electrical connectors or interfaces (not shown), such as may facilitate connection between the conductor 806, 808 and the various components of the manifold segment 802, 804 to permit signal and electrical power communication between the various components of the manifold segments 802, 804 and a source of control signals and electrical power, such as the control unit 312 and an electrical generator (not shown). For example, actuators of the valves 828, 838, 848 and the motors 335 of each manifold segment 802, 804 may be communicatively connected with each conductor 806, 808 via corresponding conductors (also shown as dashed lines), such as may permit transfer of electrical power, data, and/or control signals between, e.g., the control unit 312 and electrical generator and one or more of the valves 828, 838, 848 and motors 335. Opposing ends of each conductor 806, 808 may terminate with or otherwise comprise electrical connectors or interfaces 807, which may facilitate mechanical and electrical connection between conductors 806, 808 of adjacent manifold segments 802, 804 when coupled to form the manifold assembly 800.

Two or more of the manifold segments 802, 804, or other manifold segments comprising a different number of pressure exchangers 320, may be coupled together to form a manifold assembly within the scope of the present disclosure. FIG. 28 is a schematic view of an example implementation of the manifold assembly 800 comprising two manifold segments 802 and one manifold segment 804. Thus, the manifold assembly 800 comprises one or more similar features of the manifold segments 802, 804, including where indicated by like reference numbers, except as described below. The following description refers to FIGS. 25-28, collectively.

The manifold segments 802, 804 may be coupled together to form the manifold assembly 800 by detachably coupling corresponding end ports 814, 824, 834, 844 of each manifold segment 802, 804. For example, the high-pressure clean fluid conduits 812, 862 of the manifold segments 802, 804 may be detachably coupled at their corresponding end ports 814 to form a high-pressure clean fluid conduit assembly 811 extending continuously along the length of the manifold assembly 800. One of the end ports 814 at the end of the conduit assembly 811 may be fluidly isolated or closed by a closing member 813, such as a plug, a cap, a blind flange, and the like. The end port 814 at the opposing end of the conduit assembly 811 may be fluidly connected with the conduit 342, such as to supply high-pressure clean fluid to the pressure exchangers 320. Furthermore, the low-pressure clean fluid conduits 822, 872 of the manifold segments 802, 804 may be coupled at their corresponding end ports 824 to form a low-pressure clean fluid conduit assembly 821 extending continuously along the length of the manifold assembly 800. One of the end ports 824 at the end of the conduit assembly 821 may be fluidly isolated or closed by a closing member 823. The end port 824 at the opposing end of the conduit assembly 821 may be fluidly connected with the conduit 345 to transfer the low-pressure clean fluid discharged by the pressure exchangers 320 to the mixer 304 and/or the manifold 308. The low-pressure clean fluid conduits 832, 882 of the manifold segments 802, 804 may be coupled at their corresponding end ports 834 to form a high-pressure dirty fluid conduit assembly 831 extending continuously along the length of the manifold assembly 800. One of the end ports 834 at the end of the conduit assembly 831 may be fluidly isolated or closed by a closing member 833. The end port 834 at the opposing end of the conduit assembly 831 may be fluidly connected with the conduit 347 to transfer the high-pressure dirty fluid discharged by the pressure exchangers 320 for injection into the wellbore 311. Also, the low-pressure clean fluid conduits 842, 892 of the manifold segments 802, 804 may be coupled at their corresponding end ports 844 to form a low-pressure dirty fluid conduit assembly 841 extending continuously along the length of the manifold assembly 800. One of the end ports 844 at the end of the conduit assembly 841 may be fluidly isolated or closed by a closing member 843. The end port 844 at the opposing end of the conduit assembly 841 may be fluidly connected with the conduit 346, such as to supply low-pressure dirty fluid to the pressure exchangers 320.

The manifold segments 802, 804 may be communicatively and electrically connected by coupling corresponding conductors 806, 808 of adjacent manifold segments 802, 804. For example, the conductors 806, 808 of the manifold segments 802, 804 may be detachably coupled at their corresponding end connectors 807 to form a conductor assembly 809 extending continuously along the length of the manifold assembly 800. The conductor assembly 809 may facilitate transfer of electrical power, data, and/or control signals between, e.g., the control unit 312 and the electrical generator and one or more of the manifold segments 802, 804 of the manifold assembly 800. The conductor assembly 809 may be electrically connected with a conductor 405, which may be electrically connected with the control unit 312 and the electrical generator to electrically connect the manifold assembly 800 with the control unit 312 and the electrical generator.

Although the manifold assembly 800 is shown comprising two manifold segments 802 and one manifold segment 804, manifold assemblies within the scope of the present disclosure may comprise other quantities of manifold segments 802, 804 and in different combinations. For example, a manifold assembly within the scope of the present disclosure may include one or more manifold segments comprising one, two, three, four, five, six, eight, or other quantities of pressure exchangers 320.

Figure 29:
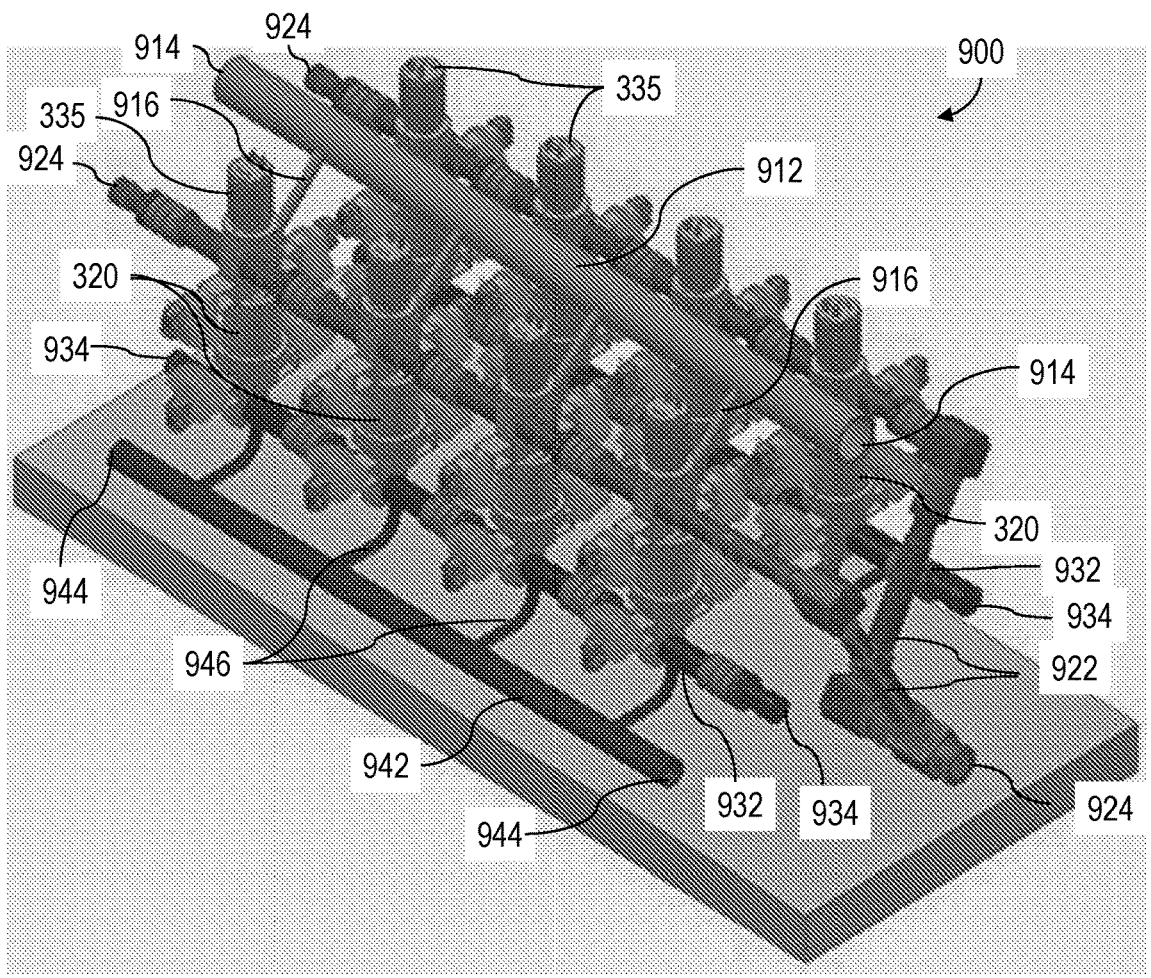
FIG. 29 is a perspective view of at least a portion of an example implementation of apparatus according to one or more aspects of the present disclosure.
Figure 30:
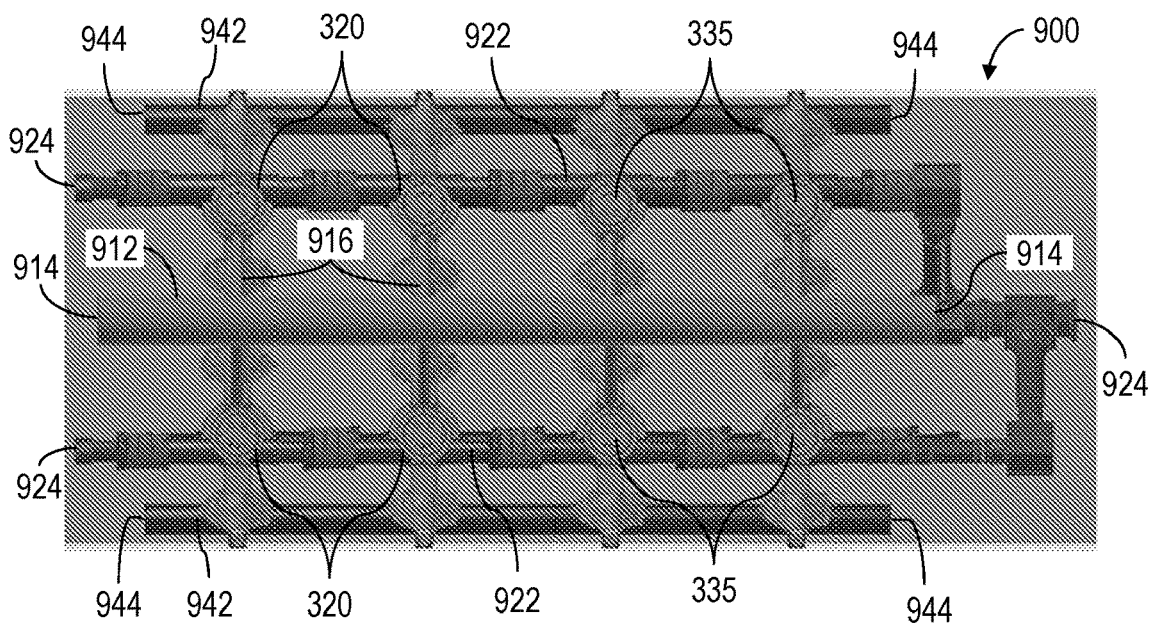
FIG. 30 is a top view of the apparatus shown in FIG. 20 according to one or more aspects of the present disclosure.

FIGS. 29 and 30 are perspective and top views of an example implementation of a manifold segment 900 according to one or more aspects of the present disclosure. The manifold segment 900 comprises one or more similar features of the manifold 360 and manifold segments 802, 804, including where indicated by like reference numbers, except as described below. The following description refers to FIGS. 25-30, collectively.

The manifold segment 900 may comprise one or more low-pressure clean fluid conduits 912, such as fluid pipes, comprising opposing end openings or ports 914 and intermediate ports 916 located between the ports 914. The conduit 912 may be or comprise a segment of the clean fluid collection conduit assembly 364, 821. The end ports 914 may be or comprise fluid couplings, such as flanges, boss couplings, threaded connectors, among other examples, operable to detachably fluidly connect with corresponding end ports of low-pressure clean fluid conduits of other manifold segments. Each intermediate port 916 may be or comprise a fluid conduit fluidly connected with a clean fluid outlet (obstructed from view) of a corresponding pressure exchanger 320. Each pressure exchanger 320 may have the rotary actuator 335 operatively connected thereto. A fluid valve (not numbered) may be connected at or along each intermediate port 916.

The manifold segment 900 may further comprise one or more high-pressure clean fluid conduits 922, such as a fluid pipes, comprising opposing end openings or ports 924 and an intermediate ports (obstructed from view) located between the ports 924. The conduits 922 may be or comprise a segment of the clean fluid distribution conduit assembly 362, 811. The end ports 924 may be or comprise fluid couplings, such as flanges, boss couplings, threaded connectors, among other examples, operable to detachably fluidly connect with corresponding end ports of high-pressure clean fluid conduits of other manifold segments. The intermediate ports may be or comprise fluid conduits terminating with couplings fluidly connected with the high-pressure clean fluid inlets (obstructed from view) of the pressure exchangers 320. A fluid valve (not numbered) may be connected along each port extending between the conduits 922 and a corresponding pressure exchanger 320.

The manifold segment 900 may further comprise one or more high-pressure dirty fluid conduits 932, such as fluid pipes, each comprising opposing end openings or ports 934 and intermediate ports (obstructed from view) located between the ports 934. The conduits 932 may be or comprise a segment of the dirty fluid collection conduit assembly 368, 831. The end ports 934 may be or comprise fluid couplings, such as flanges, boss couplings, threaded connectors, among other examples, operable to detachably fluidly connect with corresponding end ports of high-pressure dirty fluid conduits of other manifold segments. The intermediate ports may be or comprise fluid conduits terminating with couplings fluidly connected with the high-pressure dirty fluid outlet ports (obstructed from view) of the pressure exchangers 320. A fluid valve (not numbered) may be connected along each port extending between the conduits 932 and a corresponding pressure exchanger 320.

The manifold segment 900 may also comprise one or more low-pressure dirty fluid conduits 942, such as fluid pipes, comprising opposing end openings or ports 944 and intermediate ports 946 located between the ports 944. The conduits 942 may be or comprise a segment of the dirty fluid distribution conduit assembly 366, 841. The end ports 944 may be or comprise fluid couplings, such as flanges, boss couplings, threaded connectors, among other examples, operable to detachably fluidly connect with corresponding end ports of low-pressure dirty fluid conduits of other manifold segments. The intermediate ports 946 may be or comprise fluid conduits terminating with couplings fluidly connected with the low-pressure dirty fluid inlet ports (obstructed from view) of the pressure exchangers 320. A fluid valve (not numbered) may be connected along each port 946.

Although not shown, the manifold segment 900 may further comprise a frame assembly extending around the conduits 912, 922, 932, 942, the valves, the ports, and/or the pressure exchangers 320 and operable to help maintain the components of the manifold segment 900 operatively connected and/or in relative positions. Such frame assembly may comprise one or more similar features of the frame assemblies 550, 650 described above and shown in FIGS. 20-23. Furthermore, similarly to the manifold segments 702, 704, the manifold segment 900 may be detachably coupled with other manifold segments to form a manifold assembly and mounted on a mobile trailer (such as the trailer 710 shown in FIG. 24), such as may permit the manifold assembly to be transported to a wellsite via a vehicle.

A manifold assembly within the scope of the present disclosure, such as the manifold assembly 360, 380, 400, 700, 800, may be customized at a wellsite and/or at an operational base, such that the resulting manifold assembly may be suited or optimized for flow rates, pressures, and proppant loading that is intended or otherwise expected at a well pad. For example, a manifold assembly may be customized for flow rate by connecting a number of manifold segments to include a sufficient number of pressure exchangers collectively operable to generate the intended or expected dirty fluid (i.e., slurry) flow rates. A manifold assembly may be customized for pressure, for example, by connecting manifold segments comprising pressure exchangers rated for intended or expected operating pressures. A manifold assembly may be customized for proppant loading, for example, by utilizing manifold segments comprising pressure exchangers designed for intended or expected proppant loading (e.g., high, medium, low proppant loading). Customization for proppant loading may also be achieved by adjusting the number of pressure exchangers with respect to lead flow (i.e., high pressure fluid flowing directly from high pressure inlets to high pressure outlets) and feed slurry density. A given downhole proppant loading may be generated with multiple combinations of feed slurry proppant loading and lead flow. Increasing lead flow may decrease downhole fluid density if the supplied dirty fluid density is held constant.

Figure 31:
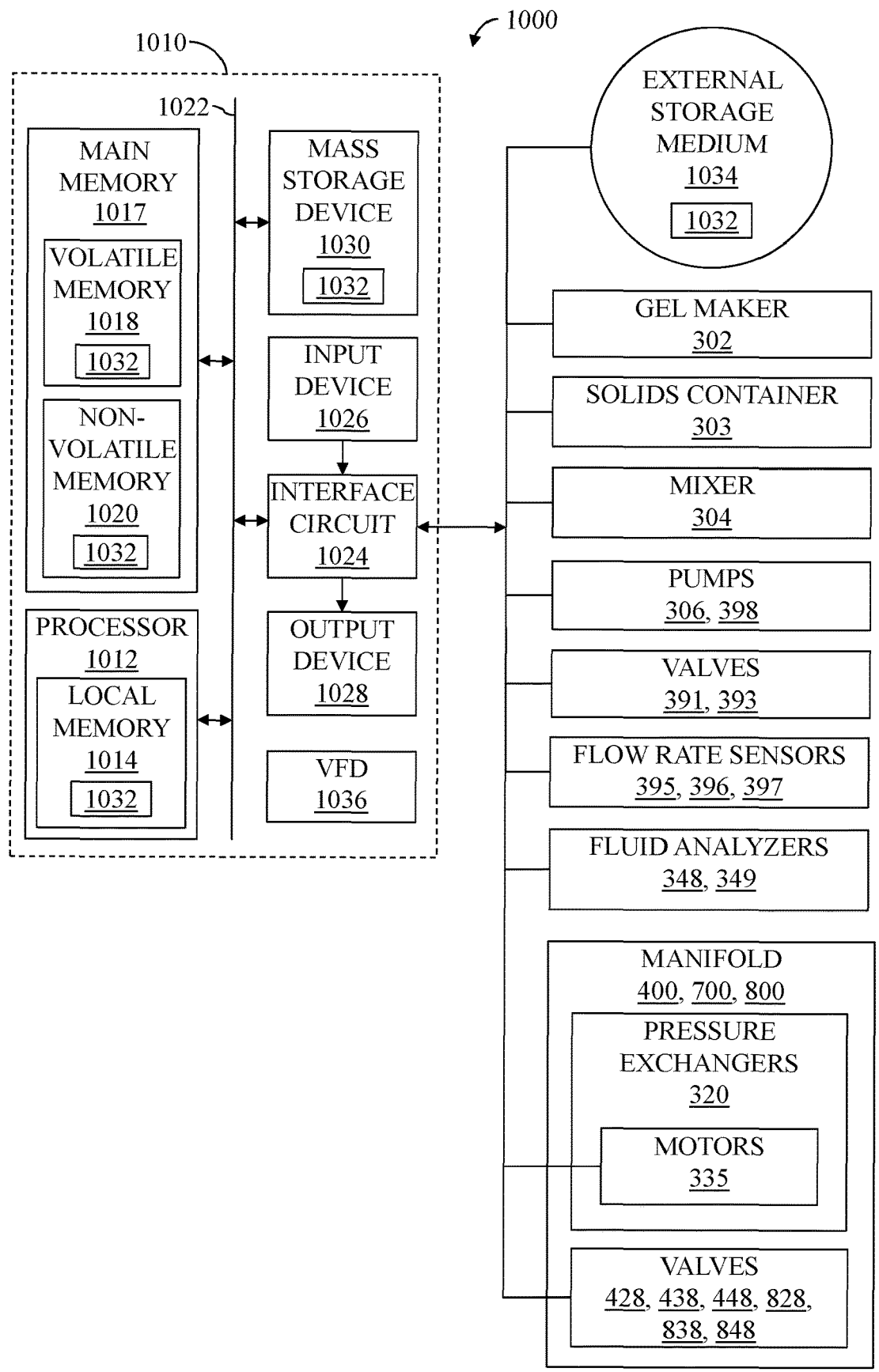
FIG. 31 is a schematic view of at least a portion of an example implementation of apparatus according to one or more aspects of the present disclosure.

Various portions of the wellsite systems 371-376 described above may collectively form and/or be controlled by a control system, such as may be operable to monitor and/or control operations of the wellsite systems 371-376. FIG. 31 is a schematic view of at least a portion of an example implementation of such a control system 1000 according to one or more aspects of the present disclosure. The following description refers to one or more of FIGS. 1-31.

The control system 1000 may comprise a 1010, which may be in communication with the gel maker 302, the solids container 303, the mixer 304, the pumps 306, 398, the valves 391, 393, the flow rate sensors 395, 396, 397, the fluid analyzers 348, 349, and the motors 335 and valves 428, 438, 448, 828, 838, 848 of the manifold assemblies 400, 700, 800 and/or actuators associated with one or more of these components. For clarity, these and other components in communication with the controller 1010 will be collectively referred to hereinafter as "sensor and controlled equipment." The controller 1010 may be operable to receive coded instructions 1032 from wellsite operators and signals generated by the sensor equipment, process the coded instructions 1032 and the signals, and communicate control signals to the controlled equipment to execute the coded instructions 1032 to implement at least a portion of one or more example methods and/or processes described herein, and/or to implement at least a portion of one or more of the example systems described herein. The controller 1010 may be or form a portion of the control unit 312.

The controller 1010 may be or comprise, for example, one or more processors, special-purpose computing devices, servers, personal computers (e.g., desktop, laptop, and/or tablet computers) personal digital assistant (PDA) devices, smartphones, internet appliances, and/or other types of computing devices. The controller 1010 may comprise a processor 1012, such as a general-purpose programmable processor. The processor 1012 may comprise a local memory 1014, and may execute coded instructions 1032 present in the local memory 1014 and/or another memory device. The processor 1012 may execute, among other things, the machine-readable coded instructions 1032 and/or other instructions and/or programs to implement the example methods and/or processes described herein. The programs stored in the local memory 1014 may include program instructions or computer program code that, when executed by an associated processor, facilitate the wellsite system 371-376 to perform the example methods and/or processes described herein. The processor 1012 may be, comprise, or be implemented by one or more processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, as non-limiting examples. Of course, other processors from other families are also appropriate.

The processor 1012 may be in communication with a main memory 1017, such as may include a volatile memory 1018 and a non-volatile memory 1020, perhaps via a bus 1022 and/or other communication means. The volatile memory 1018 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 1020 may be, comprise, or be implemented by read-only memory, flash memory, and/or other types of memory devices. One or more memory controllers (not shown) may control access to the volatile memory 1018 and/or non-volatile memory 1020.

The controller 1010 may also comprise an interface circuit 1024. The interface circuit 1024 may be, comprise, or be implemented by various types of standard interfaces, such as an Ethernet interface, a universal serial bus (USB), a third generation input/output (3GIO) interface, a wireless interface, a cellular interface, and/or a satellite interface, among others. The interface circuit 1024 may also comprise a graphics driver card. The interface circuit 1024 may also comprise a communication device, such as a modem or network interface card to facilitate exchange of data with external computing devices via a network (e.g., Ethernet connection, digital subscriber line (DSL), telephone line, coaxial cable, cellular telephone system, satellite, etc.). One or more of the controlled equipment may be connected with the controller 1010 via the interface circuit 1024, such as may facilitate communication between the controlled equipment and the controller 1010.

One or more input devices 1026 may also be connected to the interface circuit 1024. The input devices 1026 may permit the wellsite operators to enter the coded instructions 1032, including control commands, operational set-points, and/or other data for use by the processor 1012. The operational set-points may include, as non-limiting examples, intended frequencies or speeds of the pressure exchangers 320 to produce intended flows of dirty fluid for injection into the wellbore 311. The input devices 1026 may be, comprise, or be implemented by a keyboard, a mouse, a touchscreen, a track-pad, a trackball, an isopoint, and/or a voice recognition system, among other examples.

One or more output devices 1028 may also be connected to the interface circuit 1024. The output devices 1028 may be, comprise, or be implemented by display devices (e.g., a liquid crystal display (LCD), a light-emitting diode (LED) display, or cathode ray tube (CRT) display), printers, and/or speakers, among other examples. The controller 1010 may also communicate with one or more mass storage devices 1030 and/or a removable storage medium 1034, such as may be or include floppy disk drives, hard drive disks, compact disk (CD) drives, digital versatile disk (DVD) drives, and/or USB and/or other flash drives, among other examples.

The coded instructions 1032 may be stored in the mass storage device 1030, the main memory 1017, the local memory 1014, and/or the removable storage medium 1034. Thus, the controller 1010 may be implemented in accordance with hardware (perhaps implemented in one or more chips including an integrated circuit, such as an ASIC), or may be implemented as software or firmware for execution by the processor 1012. In the case of firmware or software, the implementation may be provided as a computer program product including a non-transitory, computer-readable medium or storage structure embodying computer program code (i.e., software or firmware) thereon for execution by the processor 1012. The coded instructions 1032 may include program instructions or computer program code that, when executed by the processor 1012, may cause the wellsite systems 371-376 to perform intended methods, processes, and/or routines.

The controller 1010 may further comprise one or more variable frequency drives (VFD) 1036, which may facilitate speed control of the motors 335 and, thus, control the rotational speed of the pressure exchanger rotors. The VFDs 1036 may receive control signals from the processor 1012 via the bus 1022 or the output device 1028 and output corresponding electrical power to control the speed and the torque output of the motors 335 to control the flow rate of the dirty fluid for injection into the wellbore 311. In other implementations of the control system 1000, the one or more VFDs may be disposed adjacent to or in association with each manifold segment 402, 404, 500, 600, 802, 804, 900.

Figure 32:
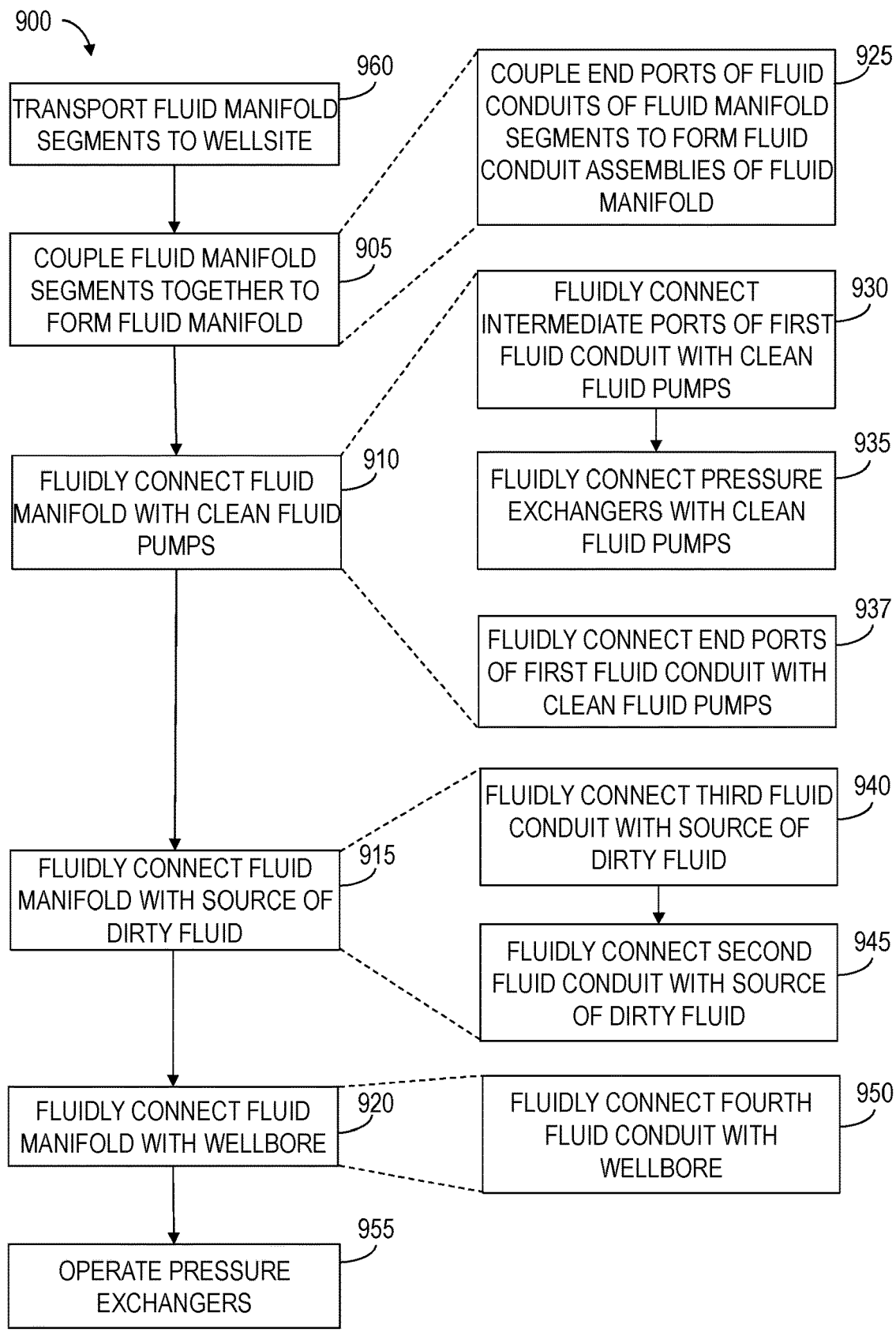
FIG. 32 is a flow-chart diagram of at least a portion of an example implementation of a method according to one or more aspects of the present disclosure.

FIG. 32 is a flow-chart diagram of at least a portion of an example implementation of a method (900) according to one or more aspects of the present disclosure. The method (900) may be performed utilizing or otherwise in conjunction with at least a portion of one or more implementations of one or more instances of the apparatus shown in one or more of FIGS. 1-31 and/or otherwise within the scope of the present disclosure. The method (900) may be performed manually by the wellsite operator and/or performed or caused, at least partially, by the controller 1010 executing the coded instructions 1032 according to one or more aspects of the present disclosure. Thus, the following description of the method (900) also refers to apparatus shown in one or more of FIGS. 1-31. However, the method (900) may also be performed in conjunction with implementations of apparatus other than those depicted in FIGS. 1-31 that are also within the scope of the present disclosure.

The method (900) may comprise coupling (905) a plurality of fluid manifold segments 402, 404 together to form a fluid manifold assembly 400. Each fluid manifold segment 402, 404 may comprise a plurality of pressure exchangers 320 each comprising a clean fluid inlet 332, a clean fluid outlet 334, a dirty fluid inlet 331, and a dirty fluid outlet 333. Each fluid manifold segment 402, 404 may further comprise a first fluid conduit 412 having opposing end ports 414 and intermediate ports 416, a second fluid conduit 422 having opposing end ports 424 and intermediate ports 426 each fluidly connected with the clean fluid outlet 334 of a corresponding pressure exchanger 320, a third fluid conduit 442 having opposing end ports 444 and intermediate ports 446 each fluidly connected with the dirty fluid inlet 331 of a corresponding pressure exchanger 320, and a fourth fluid conduit 432 comprising opposing end ports 434 and intermediate ports 436 each fluidly connected with the dirty fluid outlet 333 of a corresponding pressure exchanger 320. The method (900) may further comprise fluidly connecting (910) the fluid manifold assembly 400 with clean fluid pumps 306, fluidly connecting (915) the fluid manifold assembly 400 with a source of a dirty fluid 304, and fluidly connecting (920) the fluid manifold assembly 400 with a wellbore 311 located at an oil and gas wellsite 310.

Coupling (905) the plurality of fluid manifold segments 402, 404 together to form the fluid manifold assembly 400 may comprise (925) coupling the opposing end ports 414 of the first fluid conduits 412 of the plurality of fluid manifold segments 402, 404 to form a first fluid conduit assembly 411 of the fluid manifold assembly 400, coupling the opposing end ports 424 of the second fluid conduits 422 of the plurality of fluid manifold segments 402, 404 to form a second fluid conduit assembly 421 of the fluid manifold assembly 400, coupling the opposing end ports 444 of the third fluid conduits 442 of the plurality of fluid manifold segments 402, 404 to form a third fluid conduit assembly 441 of the fluid manifold assembly 400, and coupling the opposing end ports 434 of the fourth fluid conduits 432 of the plurality of fluid manifold segments 402, 404 to form a fourth fluid conduit assembly 431 of the fluid manifold assembly 400.

Fluidly connecting (910) the fluid manifold assembly 400 with the clean fluid pumps 306 may comprise fluidly connecting (930) intermediate ports 416 of the first fluid conduit assembly 411 with inlets of corresponding clean fluid pumps 306 and may also comprise fluidly connecting (935) the clean fluid inlets 332 of the plurality of pressure exchangers 320 with outlets of corresponding clean fluid pumps 306. However, wherein each intermediate port 830 of the first fluid conduit 812 is fluidly connected with the clean fluid inlet 332 of a corresponding pressure exchanger 320, fluidly connecting (910) the fluid manifold assembly 800 with the clean fluid pumps 306 may comprise fluidly connecting (937) at least one of the opposing end ports 814 of the first fluid conduit assembly 811 with outlets of the clean fluid pumps 306.

Fluidly connecting (915) the fluid manifold assembly 400 with the source of the dirty fluid 304 may comprise fluidly connecting (940) the third fluid conduit assembly 441 with an outlet of the source of the dirty fluid 304 and may also comprise fluidly connecting (945) the second fluid conduit assembly 421 with an inlet of the source of the dirty fluid 304. The source of the dirty fluid 304 may be or comprise a mixer 304 operable to produce the dirty fluid. The dirty fluid may comprise an oil and gas well treatment fluid.

Furthermore, fluidly connecting (920) the fluid manifold assembly 400 with the wellbore 311 may comprise fluidly connecting (950) the fourth fluid conduit assembly 431 with the wellbore 311.

Each of the plurality of pressure exchangers 320 may comprise a rotor 201, wherein at least one chamber 150 extends through the rotor 201. Thus, the method (900) may further comprise operating (955) each of the plurality of pressure exchangers 320 to receive the dirty fluid at a first pressure into the at least one chamber 150 via the dirty fluid inlet 331, receive clean fluid at a second pressure into the at least one chamber 150 via the clean fluid inlet 332 to pressurize the dirty fluid to a third pressure, wherein the second and third pressures may be substantially greater than the first pressure, discharge the dirty fluid at the third pressure from the at least one chamber 150 via the dirty fluid outlet 333, and discharge the clean fluid at a fourth pressure from the at least one chamber 150 via the clean fluid outlet 331.

The method (900) may also comprise, before coupling (905) the plurality of fluid manifold segments 402, 404 together, transporting (960) each of the plurality of fluid manifold segments 402, 404 to the oil and gas wellsite 310.

In view of the entirety of the present disclosure, including the figures and the claims, a person having ordinary skill in the art will readily recognize that the present disclosure introduces an apparatus that includes a manifold assembly comprising: (A) a plurality of pressure exchangers each comprising: (i) a clean fluid inlet; (ii) a clean fluid outlet; (iii) a dirty fluid inlet; and (iv) a dirty fluid outlet; (B) a first clean fluid conduit comprising: (i) an inlet; and (ii) a plurality of outlets; (C) a second clean fluid conduit comprising: (i) a plurality of inlets each in detachable fluid connection with the clean fluid outlet of a corresponding one of the pressure exchangers; and (ii) an outlet; (D) a first dirty fluid conduit comprising: (i) an inlet; and (ii) a plurality of outlets each in detachable fluid connection with the dirty fluid inlet of a corresponding one of the pressure exchangers; and (E) a second dirty fluid conduit comprising: (i) a plurality of inlets each in detachable fluid connection with the dirty fluid outlet of a corresponding one of the pressure exchangers; and (ii) an outlet.

Each pressure exchanger may comprise a rotor, at least one chamber extends through the rotor, and each pressure exchanger may be operable to: receive dirty fluid at a first pressure into the at least one chamber via the dirty fluid inlet; receive clean fluid at a second pressure into the at least one chamber via the clean fluid inlet to pressurize the dirty fluid to a third pressure, wherein the second and third pressures may be substantially greater than the first pressure; discharge the dirty fluid at the third pressure from the at least one chamber via the dirty fluid outlet; and discharge the clean fluid at a fourth pressure from the at least one chamber via the clean fluid outlet.

The apparatus may comprise a plurality of high-pressure pumps and a source of clean fluid, where each outlet of the first clean fluid conduit may be in detachable fluid connection with a fluid inlet of a corresponding one of the plurality of high-pressure pumps, and the inlet of the first clean fluid conduit may be in detachable fluid connection with the source of clean fluid. In such implementations, among others within the scope of the present disclosure, each clean fluid inlet of the pressure exchangers may be in detachable fluid connection with a fluid outlet of a corresponding one of the high-pressure pumps.

The apparatus may comprise a plurality of high-pressure pumps, where each outlet of the first clean fluid conduit may be fluidly connected with the clean fluid inlet of a corresponding pressure exchanger, and the first clean fluid conduit may be operable to receive pressurized clean fluid from the high-pressure pumps via the inlet of the first clean fluid conduit.

The apparatus may comprise a mixer operable to produce a dirty fluid, and the outlet of the second clean fluid conduit may be in detachable fluid connection with an inlet of the mixer.

The apparatus may comprise a mixer operable to produce a dirty fluid, and the inlet of the first dirty fluid conduit may be in detachable fluid connection with an outlet of the mixer.

In such implementations, among others within the scope of the present disclosure, the dirty fluid may comprise treatment fluid for an oil and/or gas well.

The outlet of the second dirty fluid conduit may be in detachable fluid connection with a wellbore.

The manifold assembly may comprise a plurality of manifold segments mounted on a mobile trailer, and each of ones of the manifold segments may comprise: at least one of the pressure exchangers; the first clean fluid conduit; the second clean fluid conduit; the first dirty fluid conduit; and the second dirty fluid conduit.

The manifold assembly may comprise a plurality of manifold segments mounted on a mobile trailer, and each of ones of the manifold segments may comprise: at least one of the pressure exchangers; a segment of the first clean fluid conduit; a segment of the second clean fluid conduit fluidly connected with the clean fluid outlet of the at least one of the pressure exchangers; a segment of the first dirty fluid conduit fluidly connected with the dirty fluid inlet of the at least one of the pressure exchangers; and a segment of the second dirty fluid conduit fluidly connected with the dirty fluid outlet of the at least one of the pressure exchangers. The segments of the first clean fluid conduit of the ones of the manifold segments may be detachably coupled to collectively form the first clean fluid conduit, the segments of the second clean fluid conduit of the ones of the manifold segments may be detachably coupled to collectively form the second clean fluid conduit, the segments of the first dirty fluid conduit of the ones of the manifold segments may be detachably coupled to collectively form the first dirty fluid conduit, and the segments of the second dirty fluid conduit of the ones of the manifold segments may be detachably coupled to collectively form the second dirty fluid conduit. At least one of the ones of the manifold segments may comprise two, four, or six of the pressure exchangers. Each of the ones of the manifold segments may further comprise a valve fluidly connected to one or more of the clean fluid inlet, the clean fluid outlet, the dirty fluid inlet, and the dirty fluid outlet of the at least one of the pressure exchangers.

The present disclosure also introduces an apparatus comprising a fluid manifold segment operable for detachably coupling with another instance of the fluid manifold segment to form a fluid manifold assembly, wherein the fluid manifold segment comprises: a plurality of pressure exchangers each comprising a clean fluid inlet, a clean fluid outlet, a dirty fluid inlet, and a dirty fluid outlet; a first fluid conduit comprising opposing end ports and intermediate ports; a second fluid conduit comprising opposing end ports and intermediate ports each fluidly connected with the clean fluid outlet of a corresponding pressure exchanger; a third fluid conduit comprising opposing end ports and intermediate ports each fluidly connected with the dirty fluid inlet of a corresponding pressure exchanger; and a fourth fluid conduit comprising opposing end ports and intermediate ports each fluidly connected with the dirty fluid outlet of a corresponding pressure exchanger.

Each pressure exchanger may comprise a rotor, at least one chamber may extend through the rotor, and each pressure exchanger may be operable to: receive dirty fluid at a first pressure into the at least one chamber via the dirty fluid inlet; receive clean fluid at a second pressure into the at least one chamber via the clean fluid inlet to pressurize the dirty fluid to a third pressure, wherein the second and third pressures may be substantially greater than the first pressure; discharge the dirty fluid at the third pressure from the at least one chamber via the dirty fluid outlet; and discharge the clean fluid at a fourth pressure from the at least one chamber via the clean fluid outlet. In such implementations, among others within the scope of the present disclosure, each fluid manifold segment may comprise a plurality of electric motors each operatively connected with and operable to rotate the rotor of a corresponding one of the pressure exchangers.

At least one of the opposing end ports of the first fluid conduit of the fluid manifold segment may be operable for detachably coupling with an end port of a first fluid conduit of the another instance of the fluid manifold segment to form a first fluid conduit assembly of the fluid manifold assembly; at least one of the opposing end ports of the second fluid conduit of the fluid manifold segment may be operable for detachably coupling with an end port of a second fluid conduit of the another instance of the fluid manifold segment to form a second fluid conduit assembly of the fluid manifold assembly; at least one of the opposing end ports of the third fluid conduit of the fluid manifold segment may be operable for detachably coupling with an end port of a third fluid conduit of the another instance of the fluid manifold segment to form a third fluid conduit assembly of the fluid manifold assembly; and at least one of the opposing end ports of the fourth fluid conduit of the fluid manifold segment may be operable for detachably coupling with an end port of a fourth fluid conduit of the another instance of the fluid manifold segment to form a fourth fluid conduit assembly of the fluid manifold assembly. In such implementations, among others within the scope of the present disclosure, each intermediate port of the first fluid conduit may be operable to fluidly connect with a fluid inlet of a corresponding high-pressure pump, and the first fluid conduit assembly may be operable to receive clean fluid from a source of clean fluid via at least one of the opposing end ports. Each clean fluid inlet of the pressure exchangers may be operable to fluidly connect with a fluid outlet of a corresponding high-pressure pump. Each intermediate port of the first fluid conduit may be fluidly connected with the clean fluid inlet of a corresponding pressure exchanger, and the first fluid conduit assembly may be operable to receive pressurized clean fluid via at least one of the opposing end ports. An end port of the second fluid conduit assembly may be operable to fluidly connect with an inlet of a mixer operable to produce a dirty fluid. An end port of the third fluid conduit assembly may be operable to fluidly connect with an outlet of a mixer operable to produce a dirty fluid. The dirty fluid may comprise treatment fluid for an oil and/or gas well. An end port of the fourth fluid conduit assembly may be operable to fluidly connect with a wellbore.

The fluid manifold segment may be mounted on a mobile trailer.

The fluid manifold segment may comprise two, four, or six pressure exchangers.

The manifold segment may further comprise a plurality of valves each fluidly connected at one or more of the clean fluid inlet, the clean fluid outlet, the dirty fluid inlet, and the dirty fluid outlet of a corresponding one of the pressure exchangers.

The present disclosure also introduces a method comprising: (A) coupling a plurality of fluid manifold segments together to form a fluid manifold assembly, wherein each fluid manifold segment comprises: (i) a plurality of pressure exchangers each comprising a clean fluid inlet, a clean fluid outlet, a dirty fluid inlet, and a dirty fluid outlet; (ii) a first fluid conduit comprising opposing end ports and intermediate ports; (iii) a second fluid conduit comprising opposing end ports and intermediate ports each fluidly connected with the clean fluid outlet of a corresponding pressure exchanger;

(iv) a third fluid conduit comprising opposing end ports and intermediate ports each fluidly connected with the dirty fluid inlet of a corresponding pressure exchanger; and (v) a fourth fluid conduit comprising opposing end ports and intermediate ports each fluidly connected with the dirty fluid outlet of a corresponding pressure exchanger; (B) fluidly connecting the fluid manifold assembly with clean fluid pumps; (C) fluidly connecting the fluid manifold assembly with a source of a dirty fluid; and (D) fluidly connecting the fluid manifold assembly with a wellbore located at an oil and/or gas wellsite.

Coupling the fluid manifold segments together to form the fluid manifold assembly may comprise: coupling the opposing end ports of the first fluid conduits of the plurality of fluid manifold segments to form a first fluid conduit assembly of the fluid manifold assembly; coupling the opposing end ports of the second fluid conduits of the plurality of fluid manifold segments to form a second fluid conduit assembly of the fluid manifold assembly; coupling the opposing end ports of the third fluid conduits of the plurality of fluid manifold segments to form a third fluid conduit assembly of the fluid manifold assembly; and coupling the opposing end ports of the fourth fluid conduits of the plurality of fluid manifold segments to form a fourth fluid conduit assembly of the fluid manifold assembly. In such implementations, among others within the scope of the present disclosure, fluidly connecting the fluid manifold assembly with the clean fluid pumps may comprise fluidly connecting intermediate ports of the first fluid conduit assembly with inlets of corresponding clean fluid pumps. In such implementations, among others within the scope of the present disclosure, the method may further comprise fluidly connecting the clean fluid inlets of the plurality of pressure exchangers with outlets of corresponding clean fluid pumps. Each of the intermediate ports of the first fluid conduit may be fluidly connected with the clean fluid inlet of a corresponding pressure exchanger, and fluidly connecting the fluid manifold assembly with the clean fluid pumps may comprise fluidly connecting at least one of the opposing end ports of the first fluid conduit assembly with outlets of the clean fluid pumps. Fluidly connecting the fluid manifold assembly with the source of the dirty fluid may comprise fluidly connecting the third fluid conduit assembly with an outlet of the source of the dirty fluid. In such implementations, among others within the scope of the present disclosure, the method may further comprise fluidly connecting the second fluid conduit assembly with an inlet of the source of the dirty fluid. Fluidly connecting the fluid manifold assembly with the wellbore may comprise fluidly connecting the fourth fluid conduit assembly with the wellbore.

The source of the dirty fluid may be or comprise a mixer operable to produce the dirty fluid.

The dirty fluid may comprise well treatment fluid.

Each pressure exchanger may comprise a rotor, at least one chamber may extend through the rotor, and the method may further comprise operating each of the pressure exchangers to: receive the dirty fluid at a first pressure into the at least one chamber via the dirty fluid inlet; receive clean fluid at a second pressure into the at least one chamber via the clean fluid inlet to pressurize the dirty fluid to a third pressure, wherein the second and third pressures may be substantially greater than the first pressure; discharge the dirty fluid at the third pressure from the at least one chamber via the dirty fluid outlet; and discharge the clean fluid at a fourth pressure from the at least one chamber via the clean fluid outlet.

The method may further comprise, before coupling the plurality of fluid manifold segments together, transporting each of the fluid manifold segments to the wellsite.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to allow the reader to quickly ascertain the nature of the technical disclosure. It is submitted with the understanding that it will not be used to interpret or limit the scope or meaning of the claims.

What is claimed is:

1. An apparatus comprising:
    a manifold assembly comprising:
        a plurality of pressure exchangers each comprising a clean fluid inlet, a clean fluid outlet, a dirty fluid inlet, and a dirty fluid outlet;
        a first clean fluid conduit comprising an inlet and a plurality of outlets;
        a second clean fluid conduit comprising:
            a plurality of inlets each in detachable fluid connection with the clean fluid outlet of a corresponding one of the pressure exchangers; and
            an outlet;
        a first dirty fluid conduit comprising:
            an inlet; and
            a plurality of outlets each in detachable fluid connection with the dirty fluid inlet of a corresponding one of the pressure exchangers; and
        a second dirty fluid conduit comprising:
            a plurality of inlets each in detachable fluid connection with the dirty fluid outlet of a corresponding one of the pressure exchangers; and
            an outlet and
        a plurality of manifold segments mounted on a mobile trailer, and wherein each of ones of the manifold segments comprises:
            at least one of the pressure exchangers;
            a segment of the first clean fluid conduit
            a segment of the second clean fluid conduit fluidly connected with the clean fluid outlet of the at least one of the pressure exchangers;
            a segment of the first dirty fluid conduit fluidly connected with the dirty fluid inlet of the at least one of the pressure exchangers; and
            a segment of the second dirty fluid conduit fluidly connected with the dirty fluid outlet of the at least one of the pressure exchangers.

2. The apparatus of claim 1 wherein each pressure exchanger comprises a rotor, wherein at least one chamber extends through the rotor, and wherein each pressure exchanger is operable to:
    receive dirty fluid at a first pressure into the at least one chamber via the dirty fluid inlet;
    receive clean fluid at a second pressure into the at least one chamber via the clean fluid inlet to pressurize the dirty fluid to a third pressure, wherein the second and third pressures are substantially greater than the first pressure;

discharge the dirty fluid at the third pressure from the at least one chamber via the dirty fluid outlet; and discharge the clean fluid at a fourth pressure from the at least one chamber via the clean fluid outlet.

3. The apparatus of claim 1 further comprising a plurality of high-pressure pumps and a source of clean fluid, wherein:

each outlet of the first clean fluid conduit is in detachable fluid connection with a fluid inlet of a corresponding one of the high-pressure pumps; and the inlet of the first clean fluid conduit is in detachable fluid connection with the source of clean fluid.

4. The apparatus of claim 3 wherein each clean fluid inlet of the pressure exchangers is in detachable fluid connection with a fluid outlet of a corresponding one of the high-pressure pumps.

5. The apparatus of claim 1 further comprising a plurality of high-pressure pumps, wherein each outlet of the first clean fluid conduit is fluidly connected with the clean fluid inlet of a corresponding pressure exchanger, and wherein the first clean fluid conduit is operable to receive pressurized clean fluid from the high-pressure pumps via the inlet of the first clean fluid conduit.

6. The apparatus of claim 1 further comprising a mixer operable to produce a dirty fluid, wherein the outlet of the second clean fluid conduit is in detachable fluid connection with an inlet of the mixer.

7. The apparatus of claim 1 wherein the outlet of the second dirty fluid conduit is in detachable fluid connection with a wellbore.

8. The apparatus of claim 1 wherein the manifold assembly comprises a plurality of manifold segments mounted on a mobile trailer, and wherein each of ones of the manifold segments comprises the first clean fluid conduit, the second clean fluid conduit, the first dirty fluid conduit, the second dirty fluid conduit, and at least one of the pressure exchangers.

9. The apparatus of claim 1 wherein:

the segments of the first clean fluid conduit of the ones of the manifold segments are detachably coupled to collectively form the first clean fluid conduit;

the segments of the second clean fluid conduit of the ones of the manifold segments are detachably coupled to collectively form the second clean fluid conduit;

the segments of the first dirty fluid conduit of the ones of the manifold segments are detachably coupled to collectively form the first dirty fluid conduit; and the segments of the second dirty fluid conduit of the ones of the manifold segments are detachably coupled to collectively form the second dirty fluid conduit.

10. The apparatus of claim 1 wherein each of the ones of the manifold segments comprises a valve fluidly connected to one or more of the clean fluid inlet, the clean fluid outlet, the dirty fluid inlet, and the dirty fluid outlet of the at least one of the pressure exchangers.

\* \* \* \* \*